(12) United States Patent
Matsumoto et al.

(10) Patent No.: US 11,467,410 B2
(45) Date of Patent: Oct. 11, 2022

(54) DISPLAY APPARATUS WITH NON-OVERLAP IMAGE REGION

(71) Applicant: Sony Corporation, Tokyo (JP)

(72) Inventors: Mitsuharu Matsumoto, Tokyo (JP); Mamoru Suzuki, Tokyo (JP); Susumu Ichikawa, Tokyo (JP); Takatoshi Matsuyama, Tokyo (JP); Masatoshi Nakamura, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 17/259,377

(22) PCT Filed: Jul. 11, 2019

(86) PCT No.: PCT/JP2019/027499
§ 371 (c)(1),
(2) Date: Jan. 11, 2021

(87) PCT Pub. No.: WO2020/026749
PCT Pub. Date: Feb. 6, 2020

(65) Prior Publication Data
US 2021/0199975 A1   Jul. 1, 2021

(30) Foreign Application Priority Data

Jul. 31, 2018   (JP) .............................. JP2018-143854
Feb. 26, 2019   (JP) .............................. JP2019-032308

(51) Int. Cl.
*G09G 1/06*      (2006.01)
*G02B 27/01*     (2006.01)
*G02B 25/00*     (2006.01)

(52) U.S. Cl.
CPC ....... *G02B 27/0172* (2013.01); *G02B 25/001* (2013.01); *G02B 2027/011* (2013.01); *G02B 2027/0132* (2013.01)

(58) Field of Classification Search
CPC ............ G02B 25/001; G02B 2027/011; G02B 2027/0132
(Continued)

(56) References Cited

U.S. PATENT DOCUMENTS 5,805,341 A * 9/1998 Kuba ................. G02B 27/0172
                                                         359/630
5,986,816 A   11/1999 Shinsuke
(Continued)

FOREIGN PATENT DOCUMENTS

CN   106501943 A   3/2017
JP   H06-038246 A  2/1994
(Continued)

OTHER PUBLICATIONS

International Search Report issued in International Patent Application No. PCT/JP2019/027499 dated Oct. 8, 2019 and English translation of same. 7 pages.

(Continued)

*Primary Examiner* — Jonathan M Blancha
(74) *Attorney, Agent, or Firm* — K&L Gates LLP

(57) ABSTRACT

A display apparatus of the present disclosure includes: a left eyepiece display unit including a left-eye image display device and a left eyepiece optical system guiding a displayed left-eye display image to a left eye; and a right eyepiece display unit including a right-eye image display device and a right eyepiece optical system guiding a displayed right-eye display image to a right eye, and an image magnification upon observation by both eyes is twice or more. The left eyepiece optical system and the right eyepiece optical system each include a plurality of single lenses, and at least one of the single lenses is a free-form surface lens including a resin material. At least one of the single lenses is arranged in at least one of an eccentric state or a rotated state with (Continued)

respect to an optical axis of the left-eye image display device or the right-eye image display device.

16 Claims, 65 Drawing Sheets

(58) Field of Classification Search
USPC .......................................................... 345/11
See application file for complete search history.

(56) References Cited

U.S. PATENT DOCUMENTS

| 7,369,327 | B1 | 5/2008 | Nishioka |
| 2002/0118464 | A1 | 8/2002 | Noshioka et al. |
| 2006/0119951 | A1 | 6/2006 | McGuire |
| 2008/0055193 | A1* | 3/2008 | Tsuyuki ................ G02B 17/045 345/7 |
| 2015/0205091 | A1 | 7/2015 | Matsuo et al. |
| 2017/0343818 | A1 | 11/2017 | Espie et al. |
| 2018/0081151 | A1* | 3/2018 | Bone .................. G02B 27/0025 |
| 2018/0120545 | A1* | 5/2018 | Aihara .................. G02B 13/18 |

FOREIGN PATENT DOCUMENTS

| JP | H07-244246 | A | 9/1995 |
| JP | H08-36143 | A | 2/1996 |
| JP | H09-83908 | A | 3/1997 |
| JP | H09-113823 | A | 5/1997 |
| JP | H09-146038 | A | 6/1997 |
| JP | H10-253899 | A | 1/1998 |
| JP | H11-023984 | A | 1/1999 |
| JP | H11-352453 | A | 12/1999 |
| JP | 2002-214545 | A | 7/2002 |
| JP | 2008-511874 | A | 4/2008 |
| JP | 2017-535814 | A | 11/2017 |
| WO | WO2014054297 | A1 | 4/2014 |
| WO | WO2018117025 | A | 6/2018 |

OTHER PUBLICATIONS

Written Opinion issued in International Patent Application No. PCT/JP2019/027499 dated Oct. 8, 2019. 7 pages.

* cited by examiner

[ FIG. 1 ]
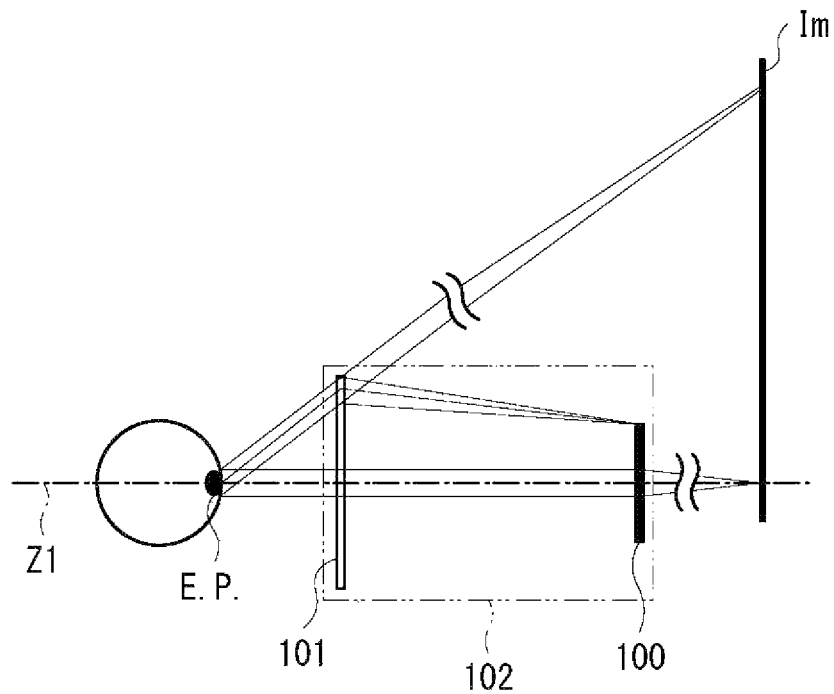
[ FIG. 2 ]
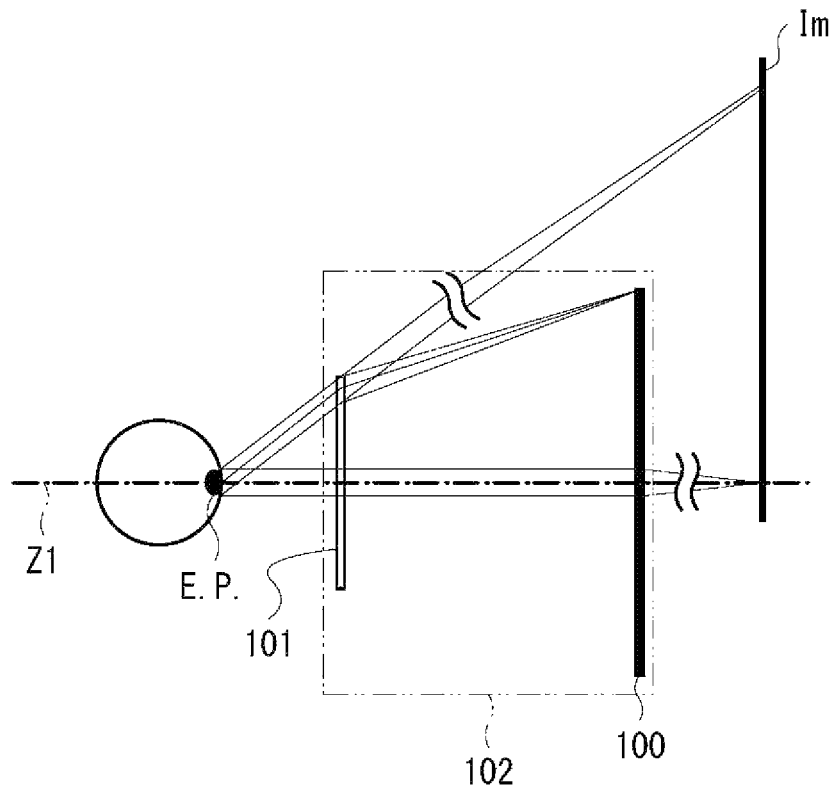

[FIG. 3]
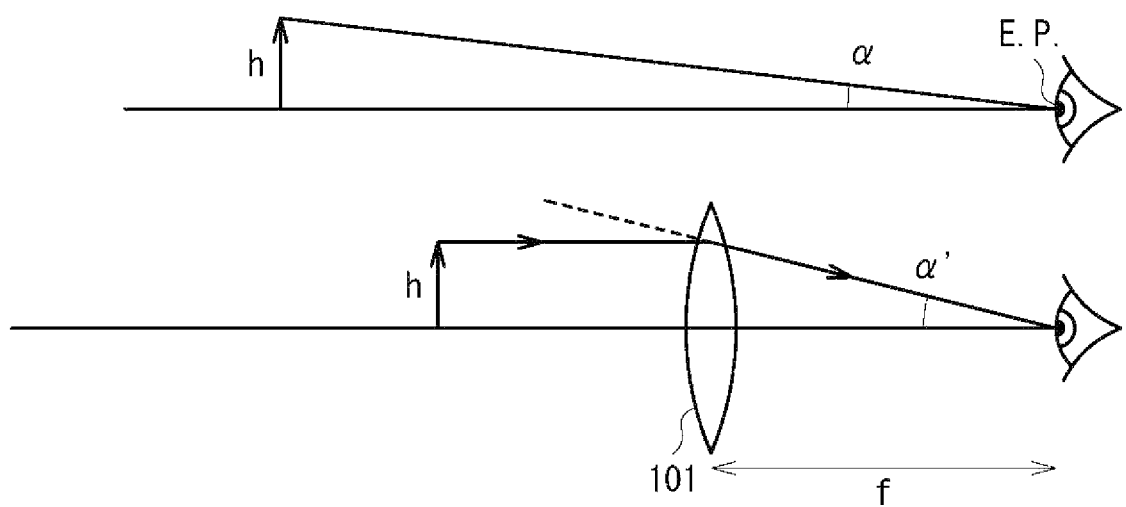

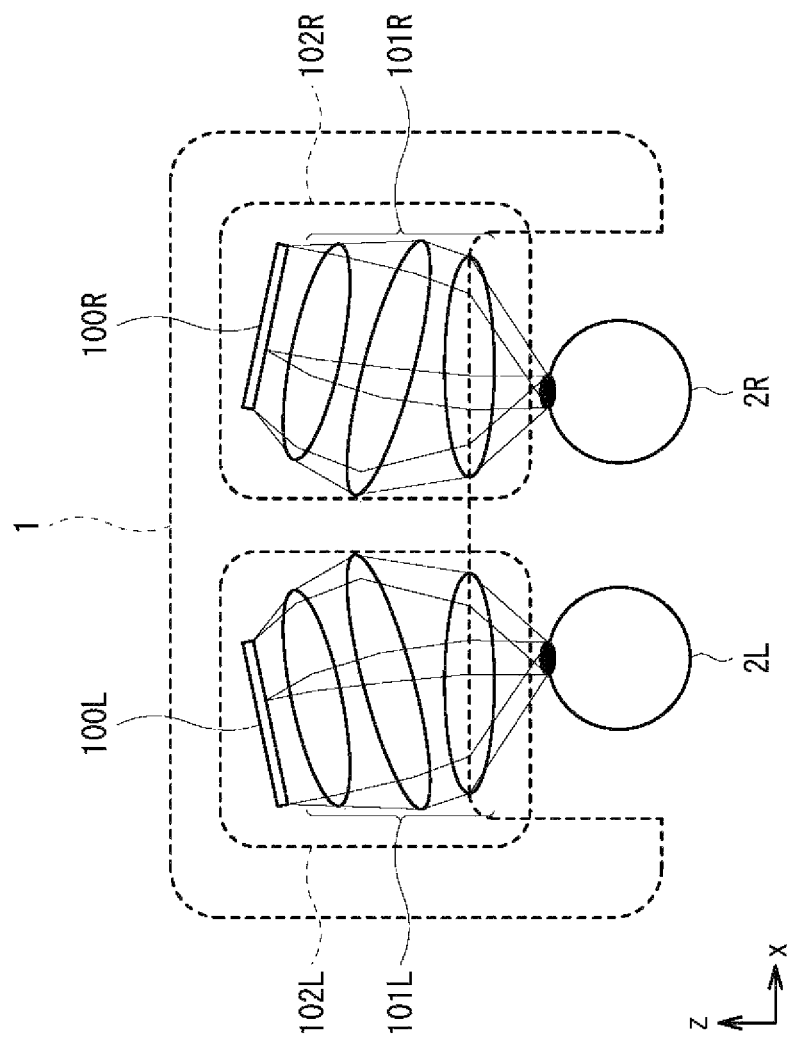
[ FIG. 4 ]

[ FIG. 5 ]
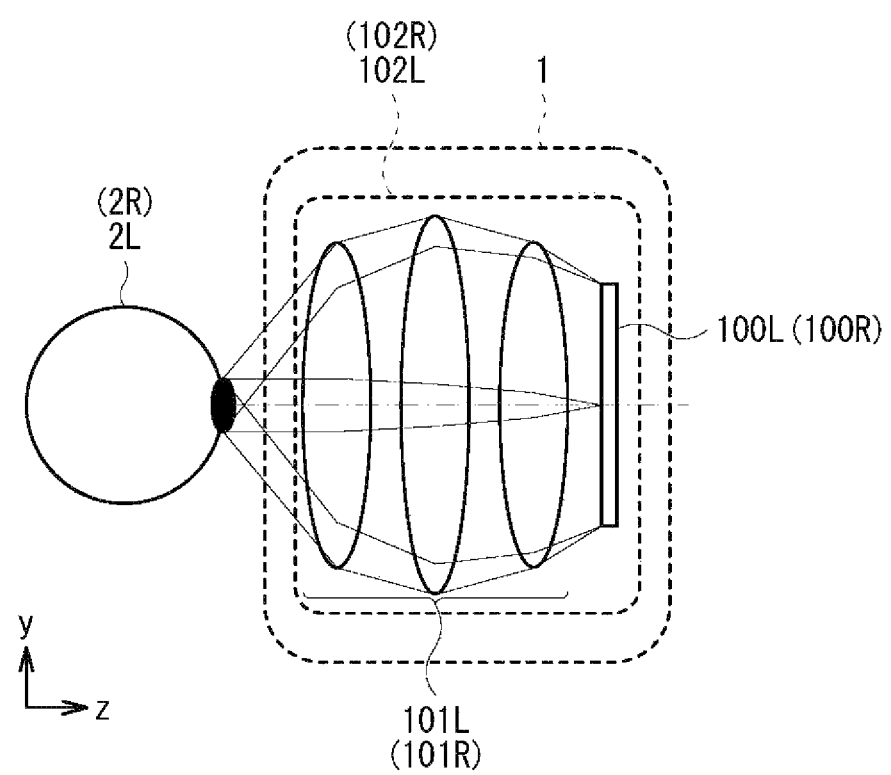

[ FIG. 6 ]
COMPARATIVE EXAMPLE
IDENTICAL IMAGE BETWEEN RIGHT AND LEFT
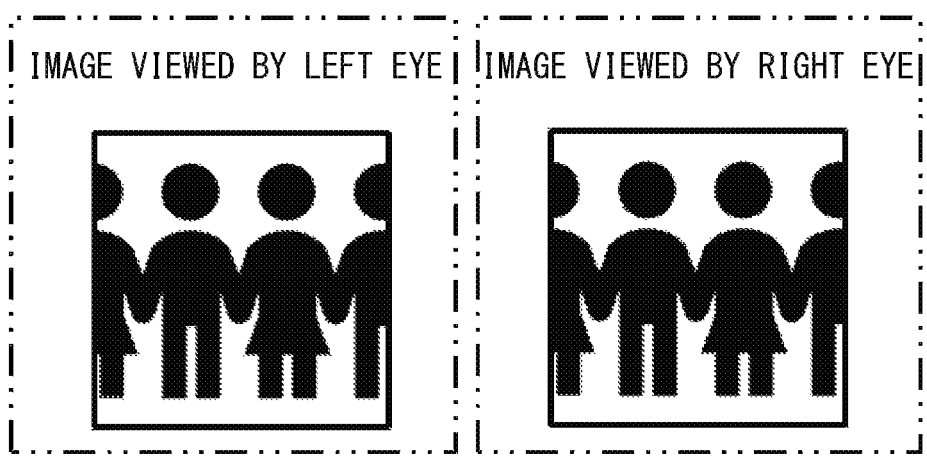
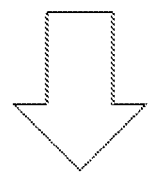
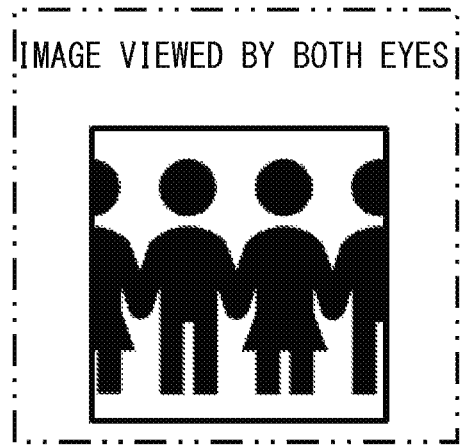

[ FIG. 7 ]
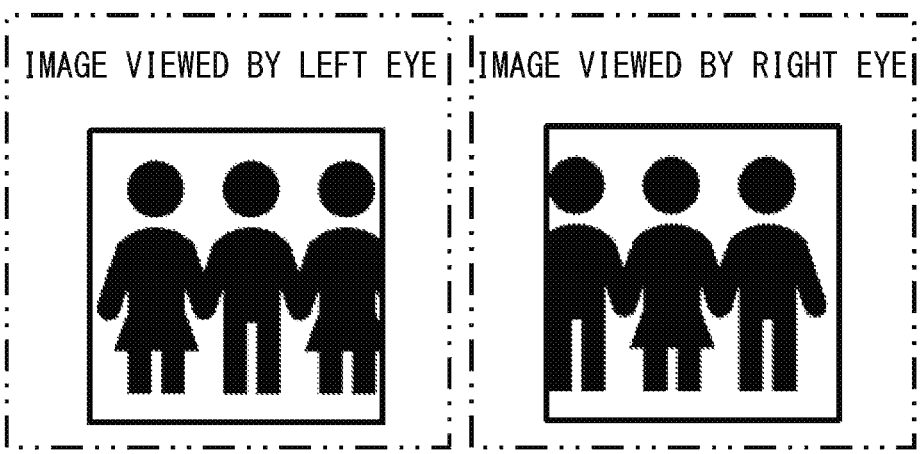
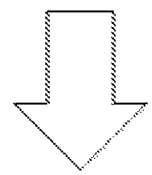
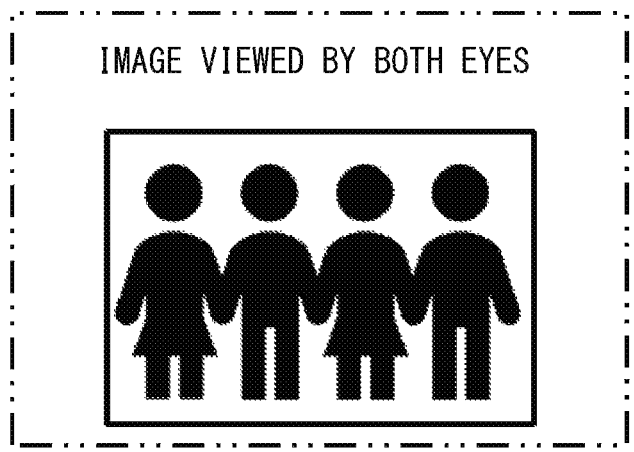

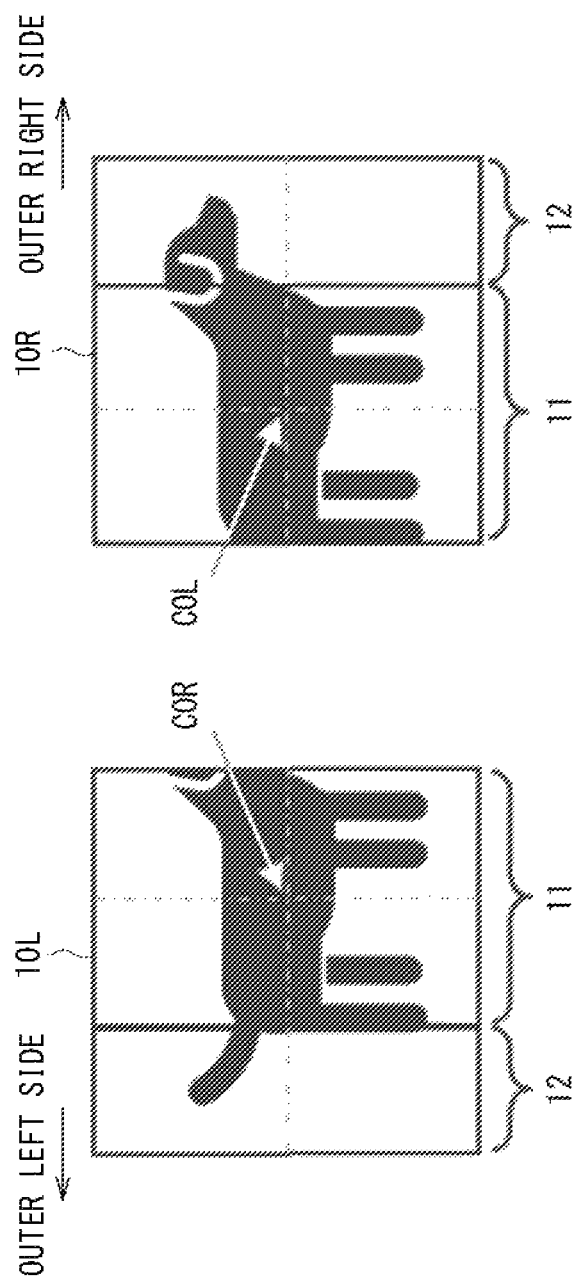

[ FIG. 9 ]
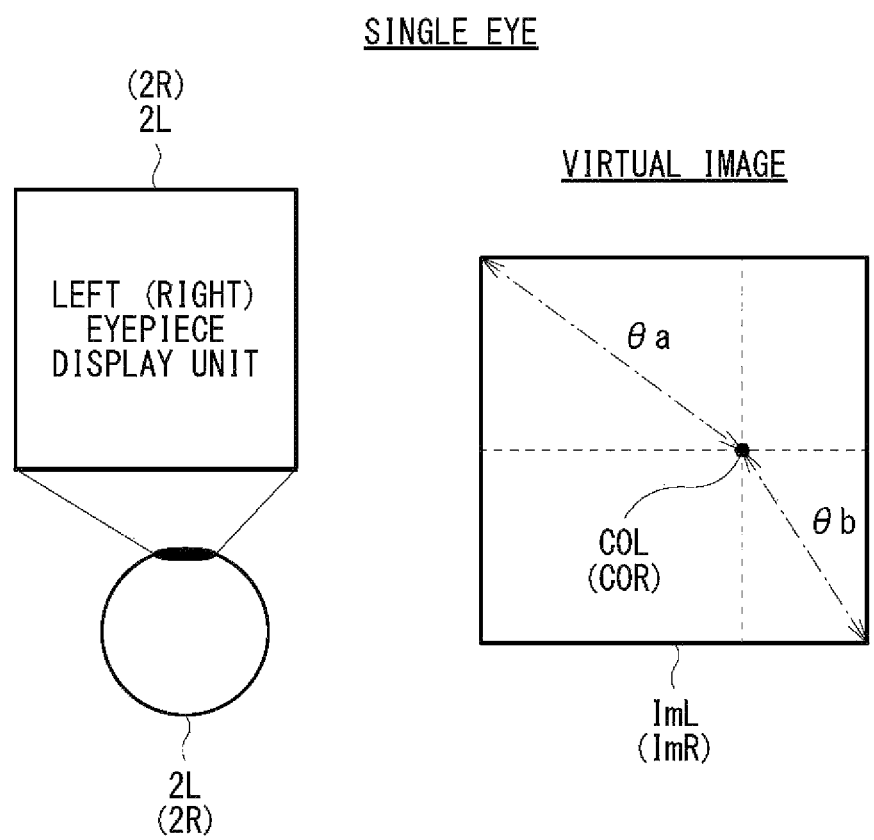

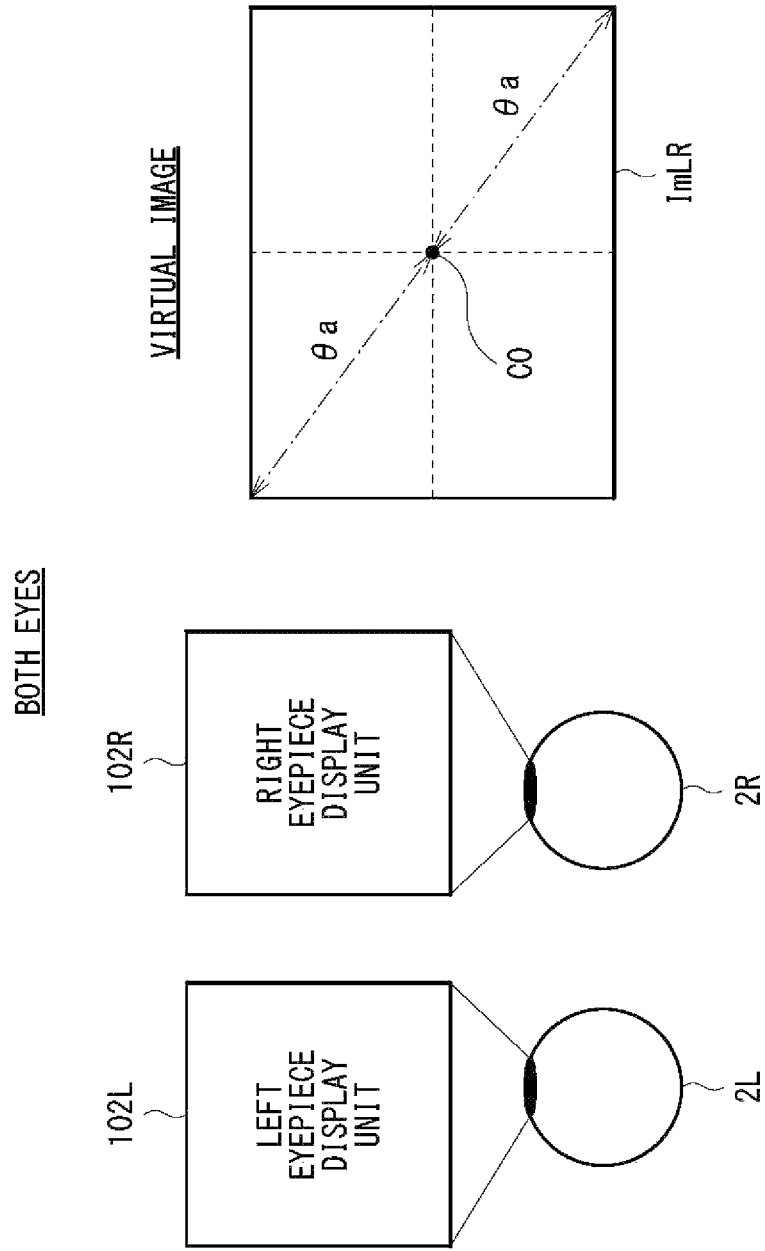
[ FIG. 10 ]

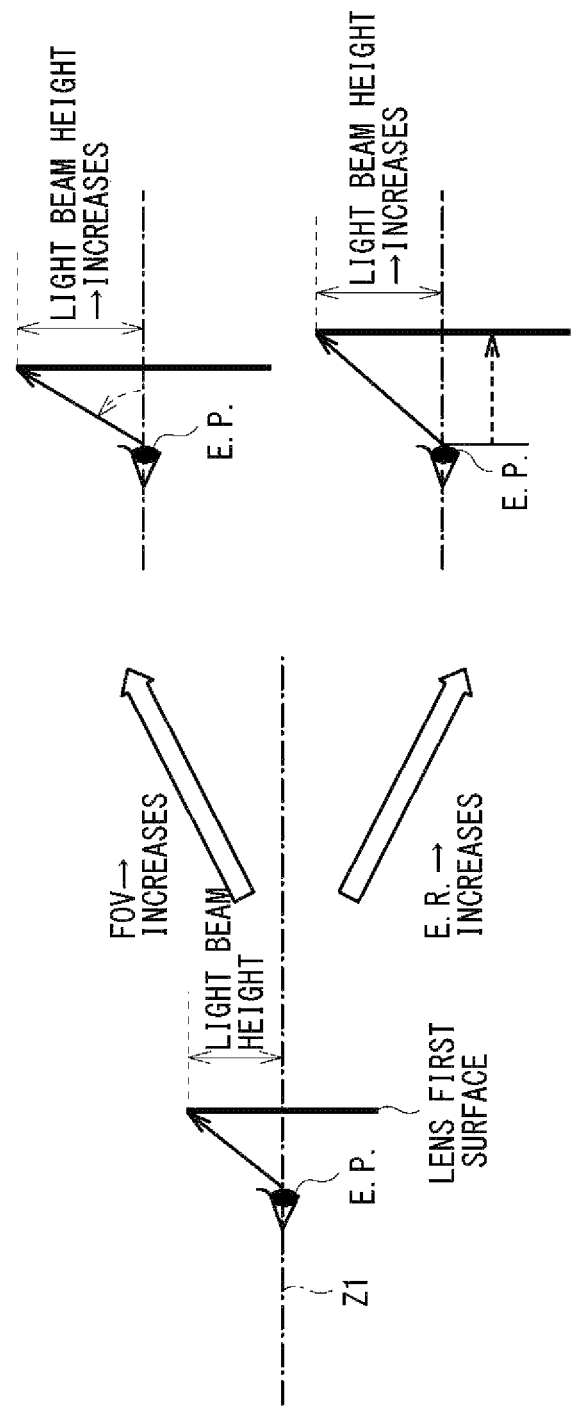
[ FIG. 11 ]

[ FIG. 12 ]
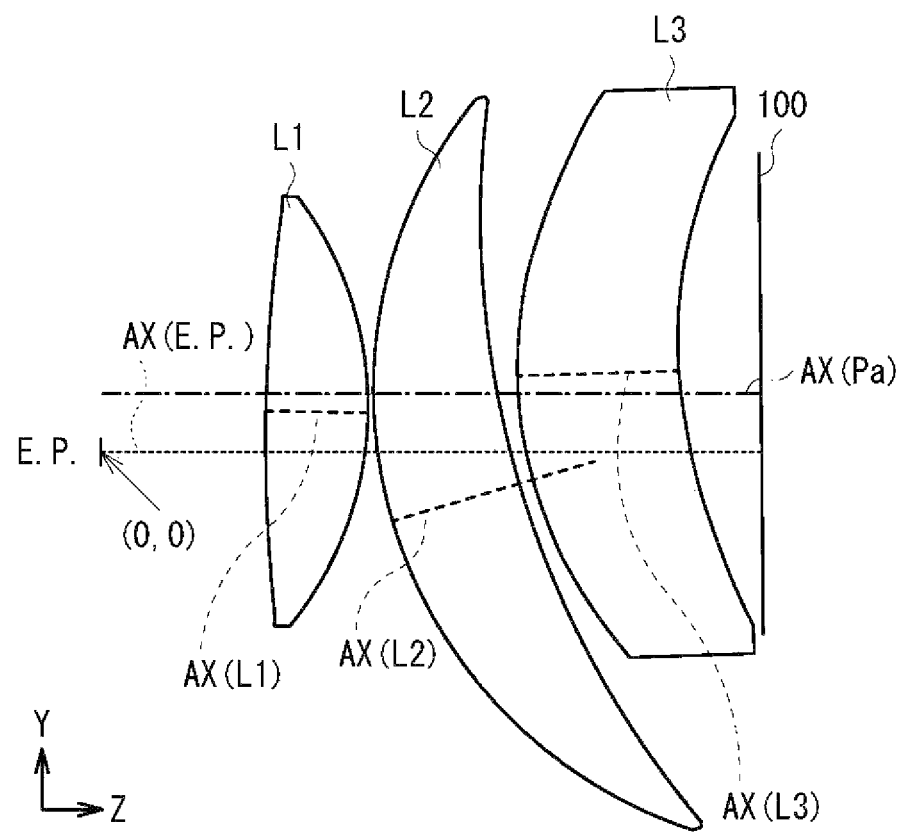

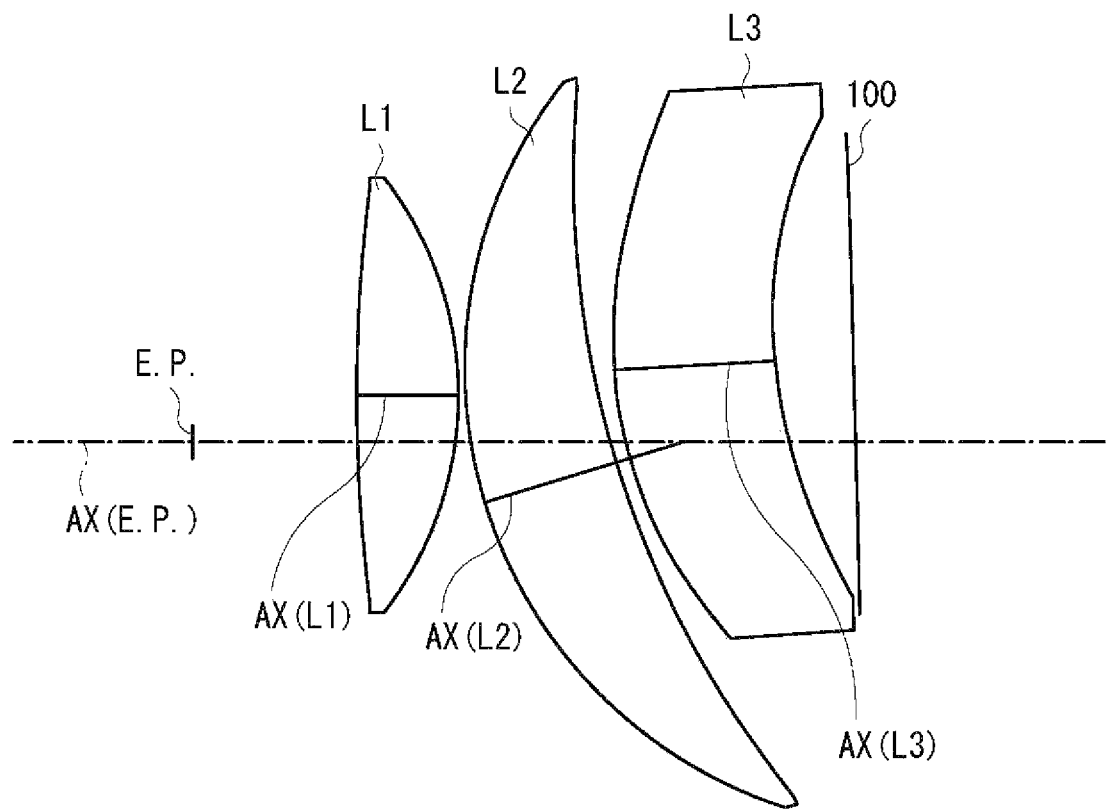

[ FIG. 14 ]
EXAMPLE 1
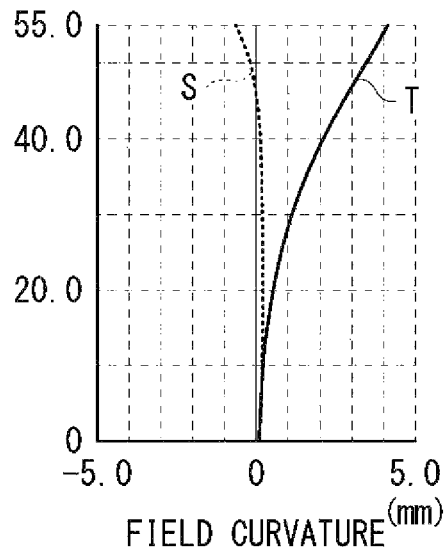
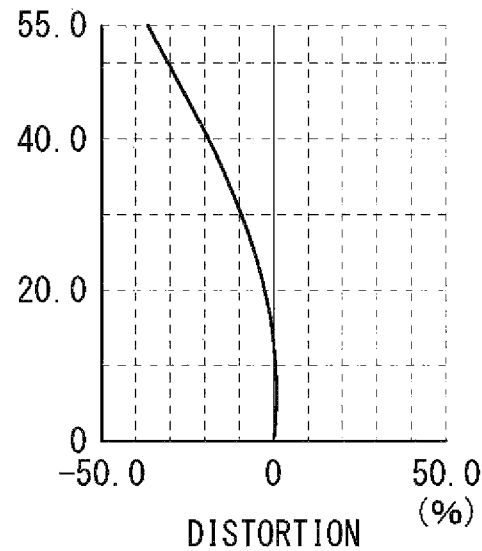
[ FIG. 15 ]
EXAMPLE 1
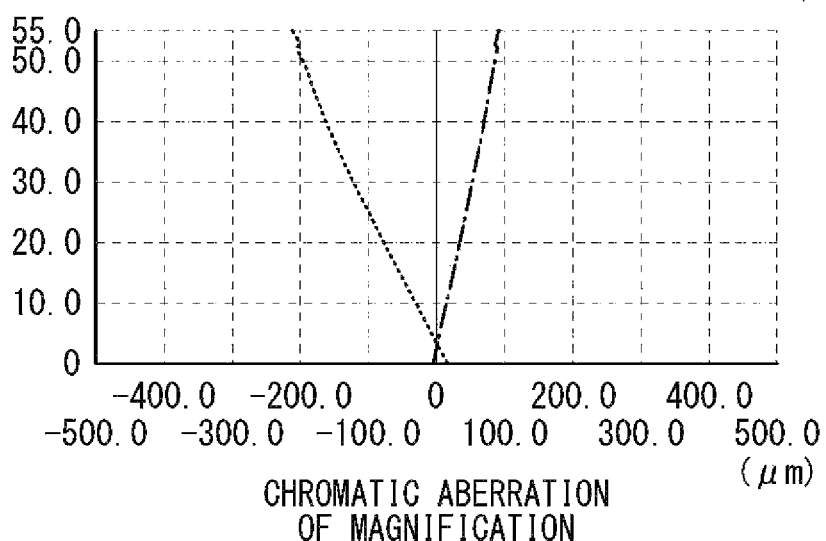

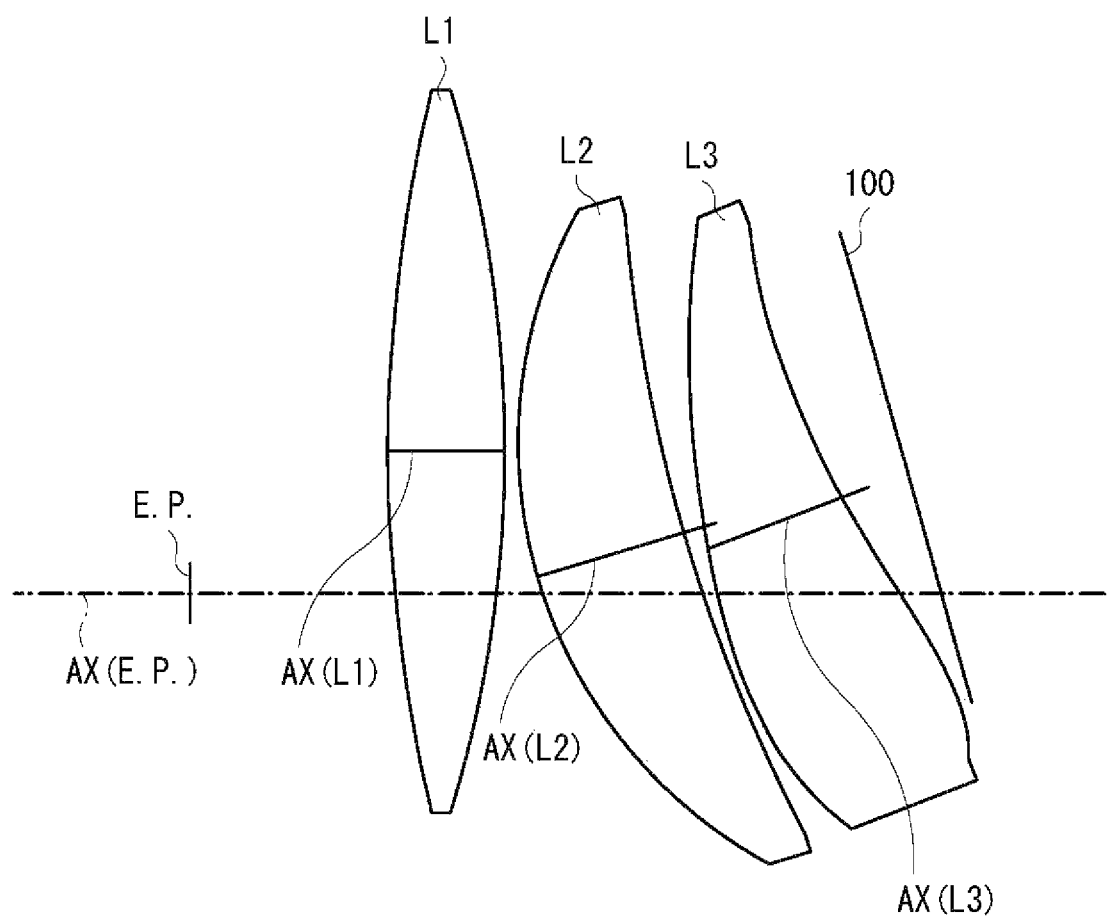
[FIG. 16]

[ FIG. 17 ]
EXAMPLE 2
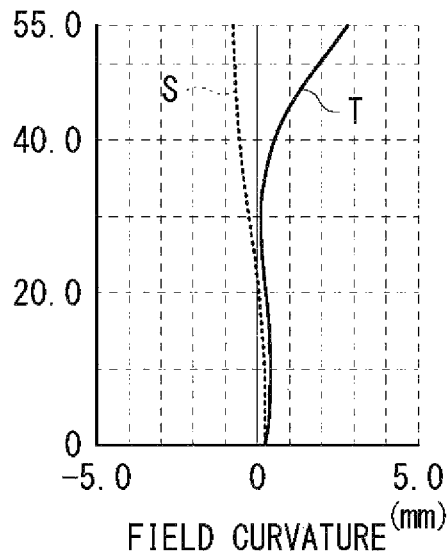
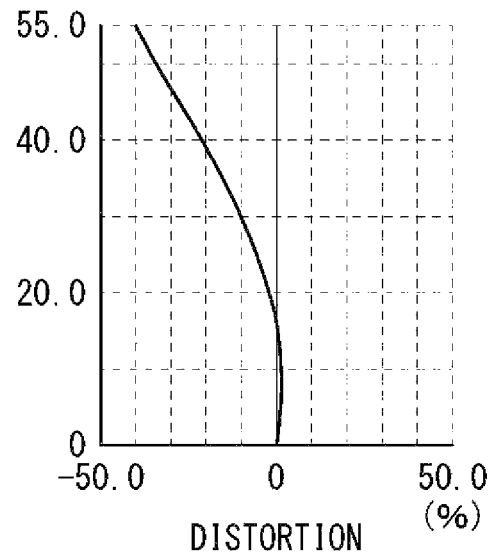
[ FIG. 18 ]
EXAMPLE 2
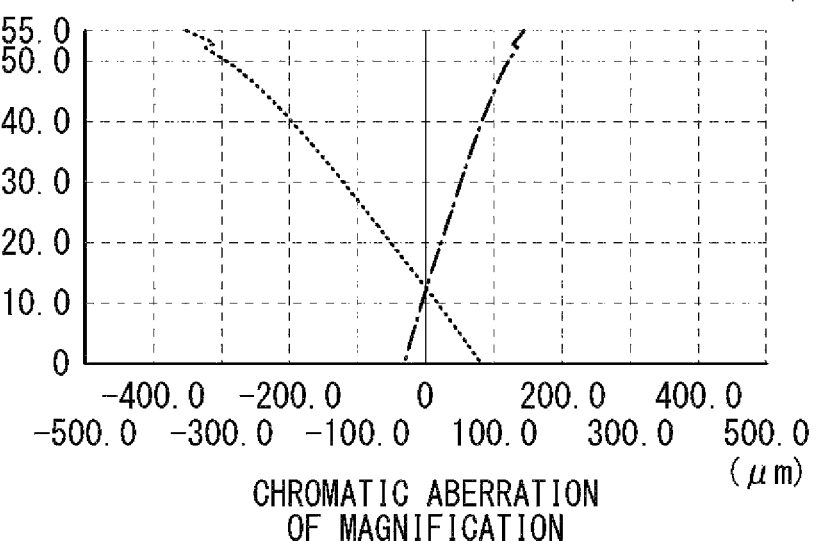

[ FIG. 19 ]
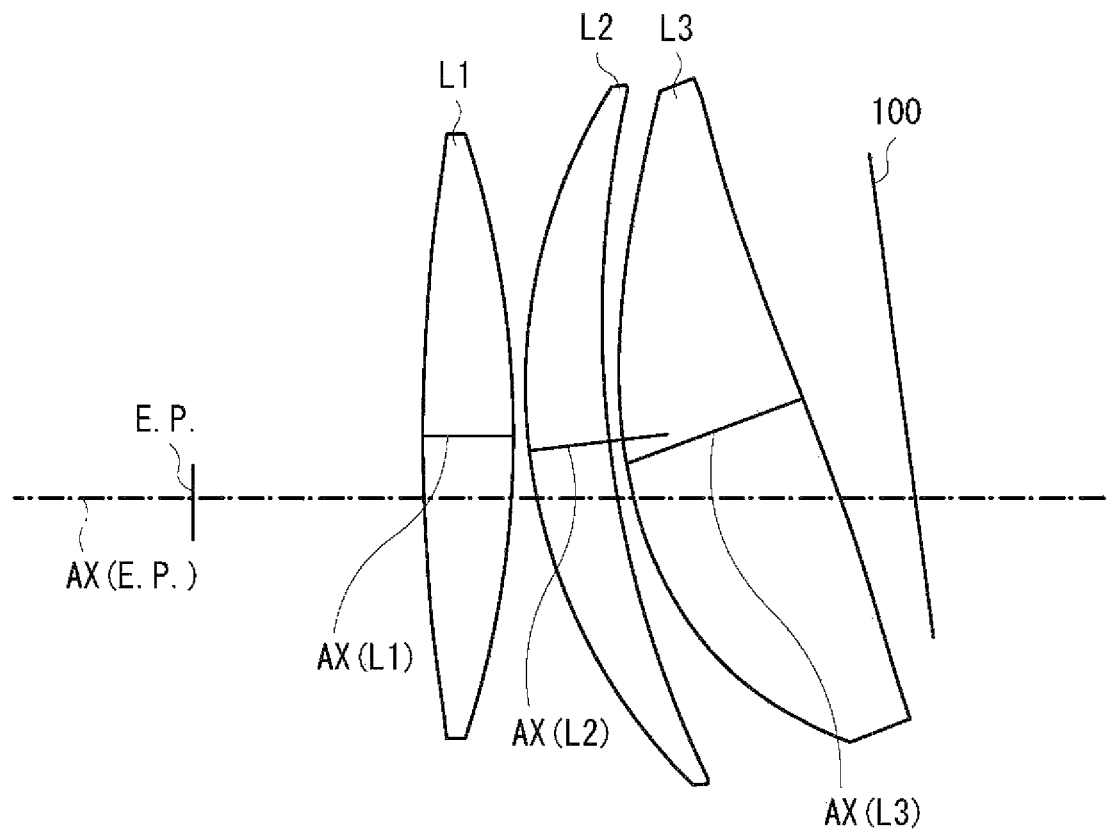

[ FIG. 20 ]
EXAMPLE 3
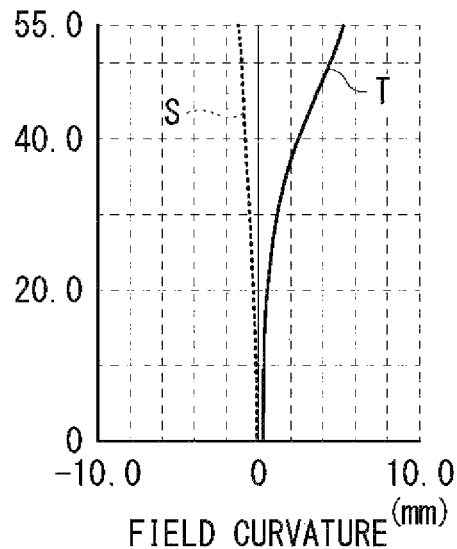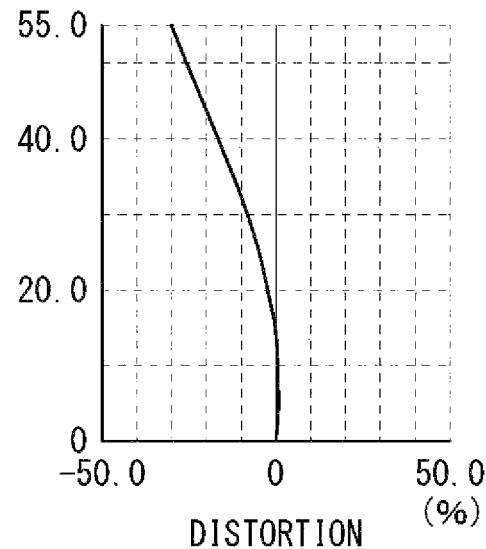
[ FIG. 21 ]
EXAMPLE 3
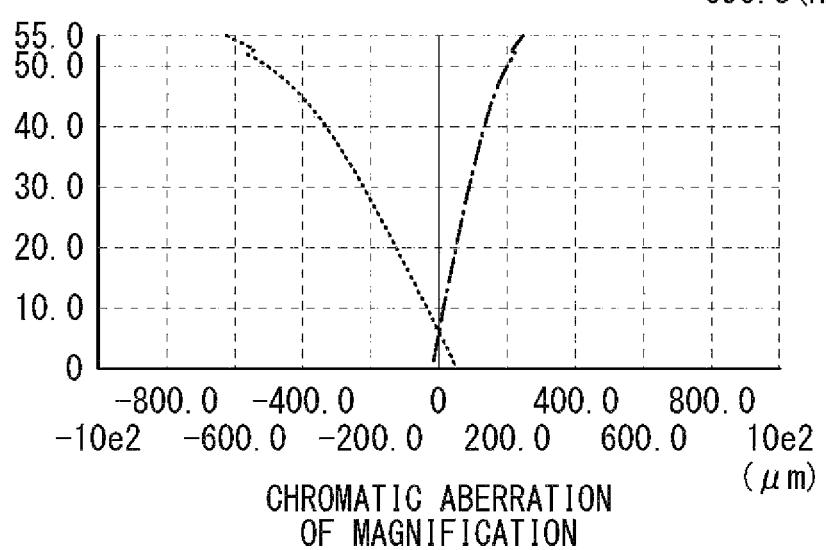

[ FIG. 22 ]
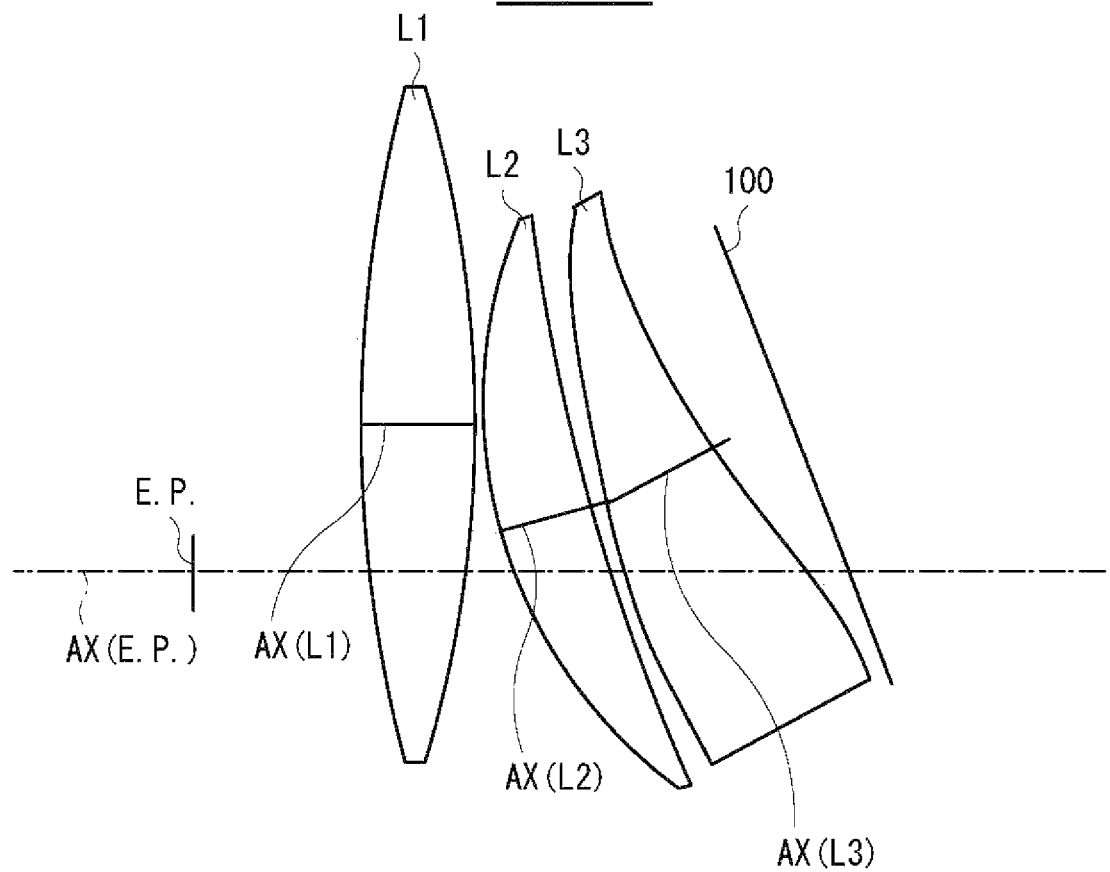

[ FIG. 23 ]
EXAMPLE 4
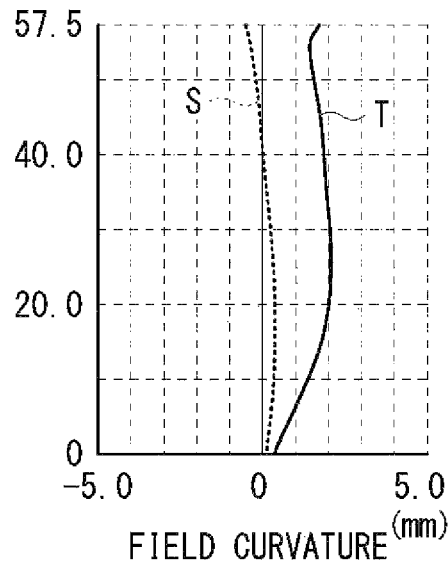
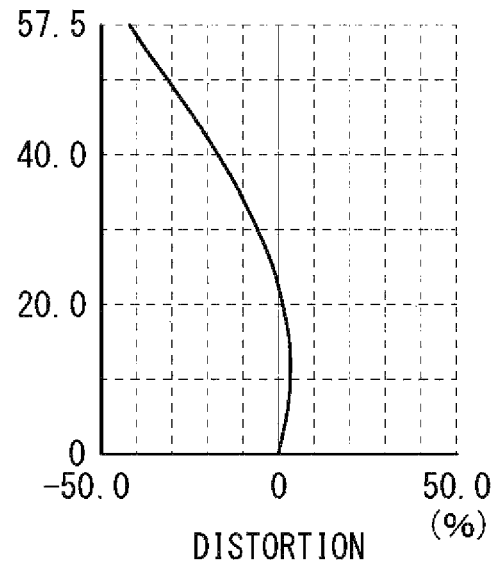
[ FIG. 24 ]
EXAMPLE 4
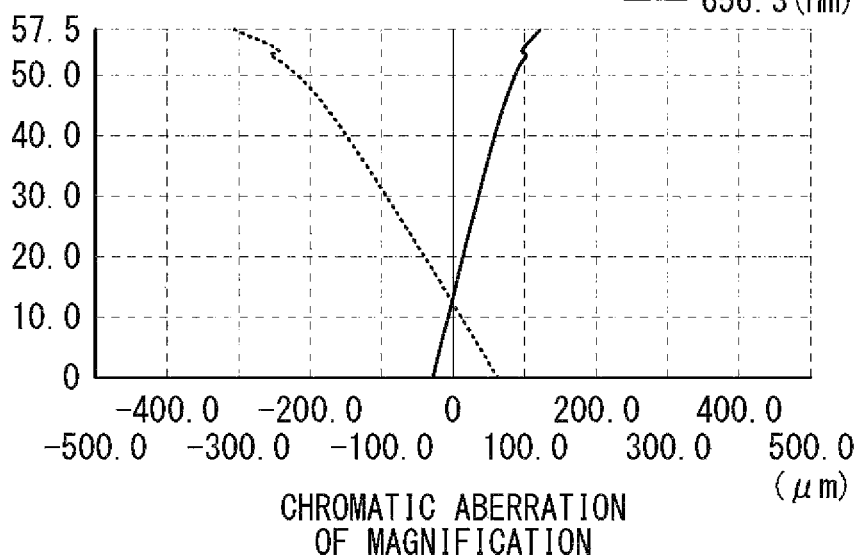

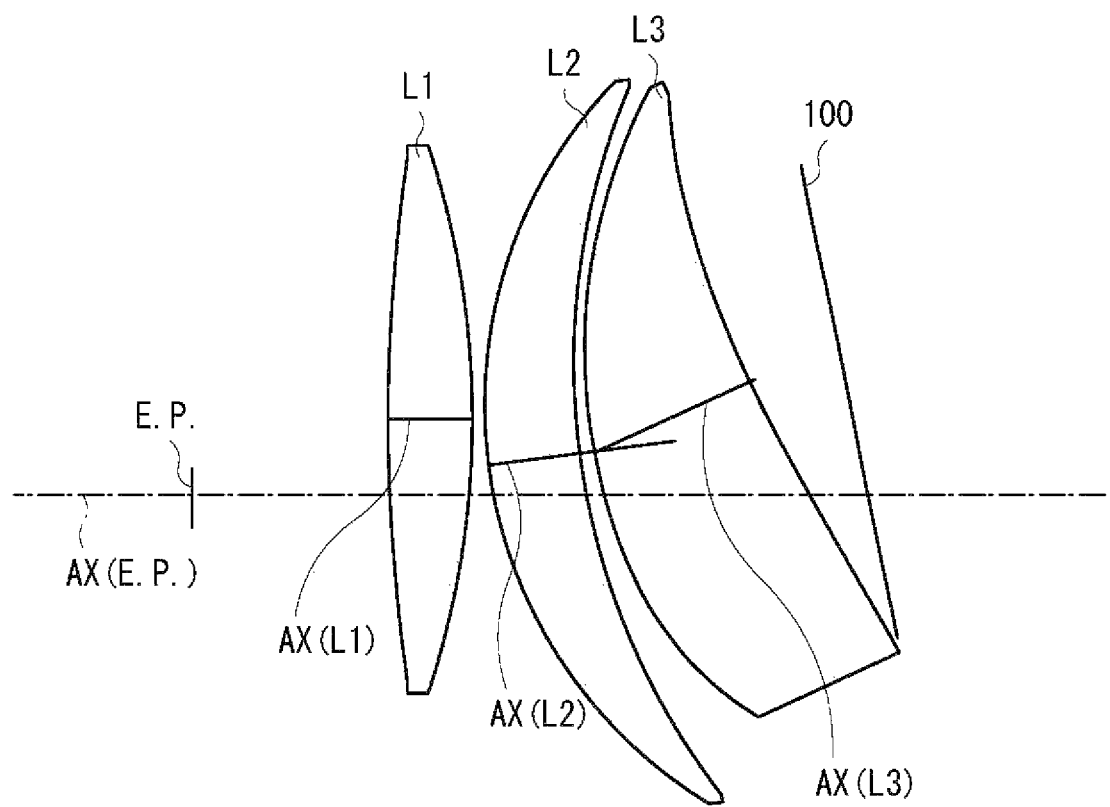

[ FIG. 26 ]
EXAMPLE 5
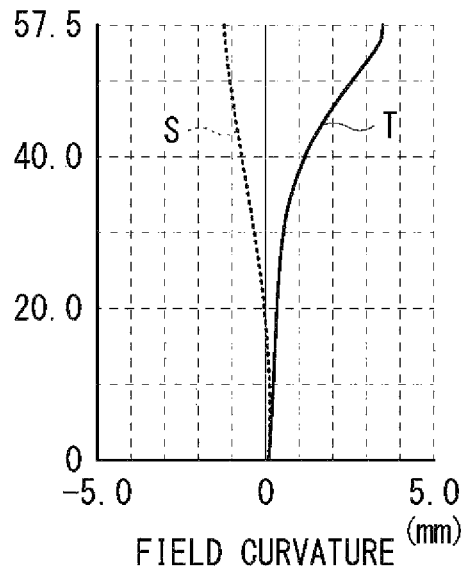
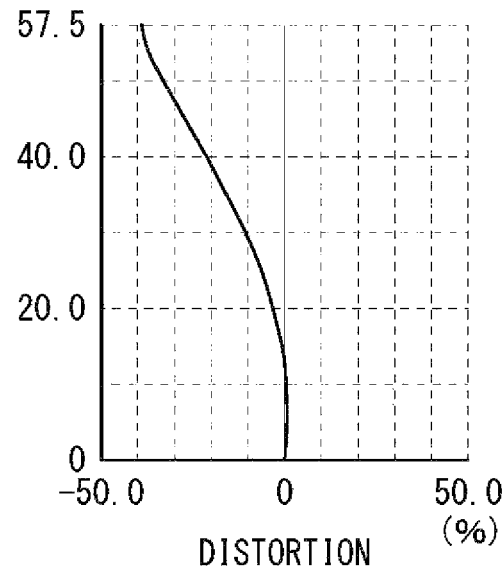
[ FIG. 27 ]
EXAMPLE 5
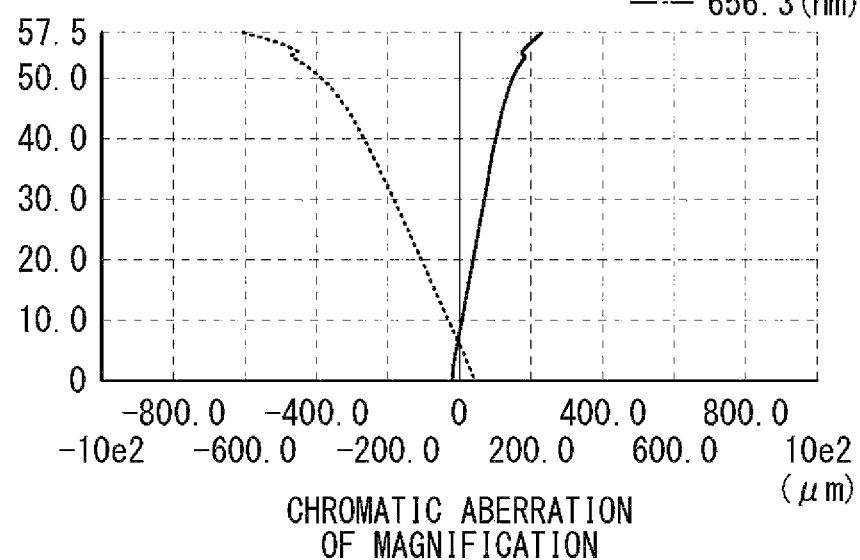

[FIG. 28]
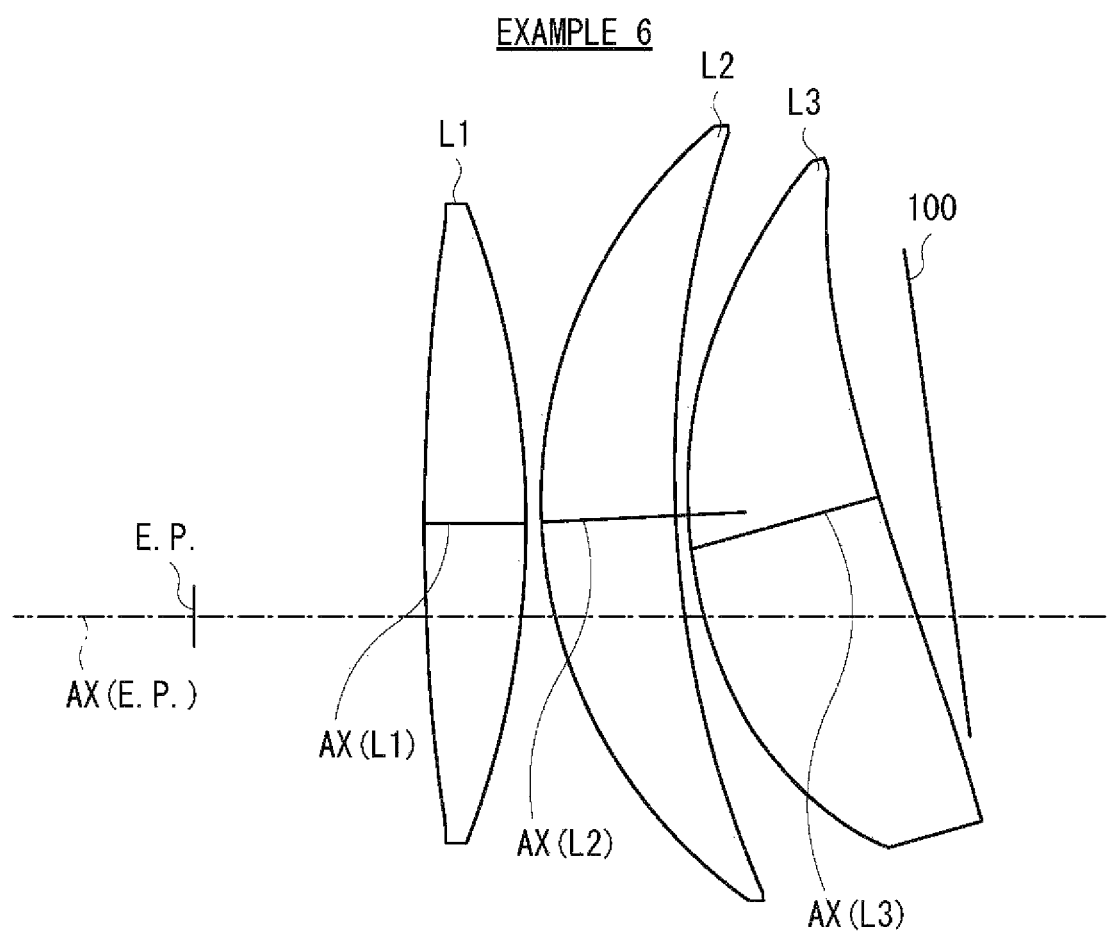

[ FIG. 29 ]
EXAMPLE 6
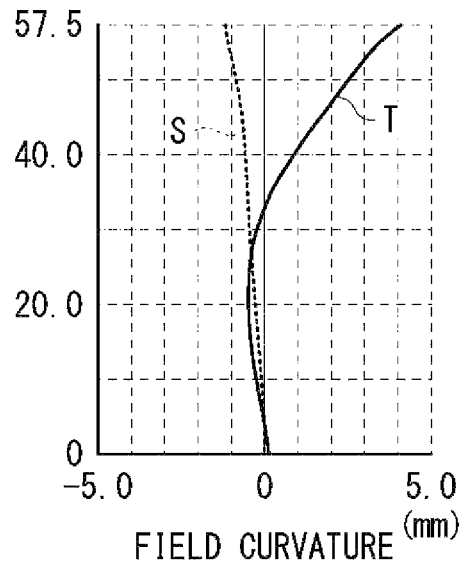
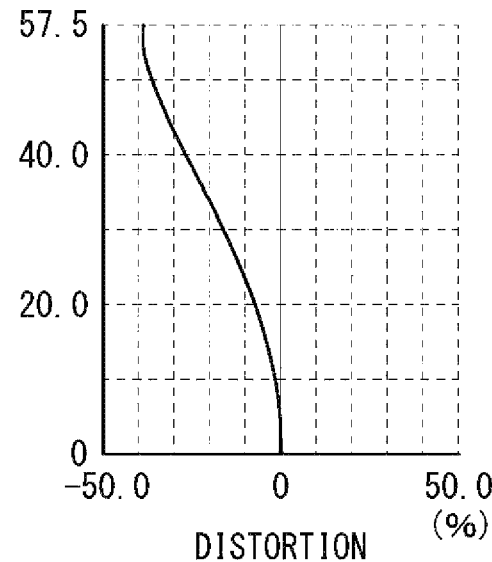
[ FIG. 30 ]
EXAMPLE 6
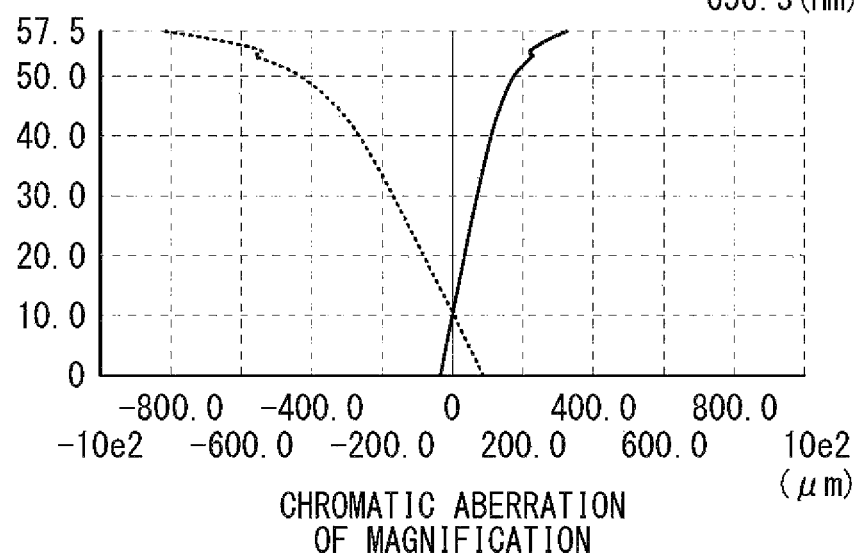

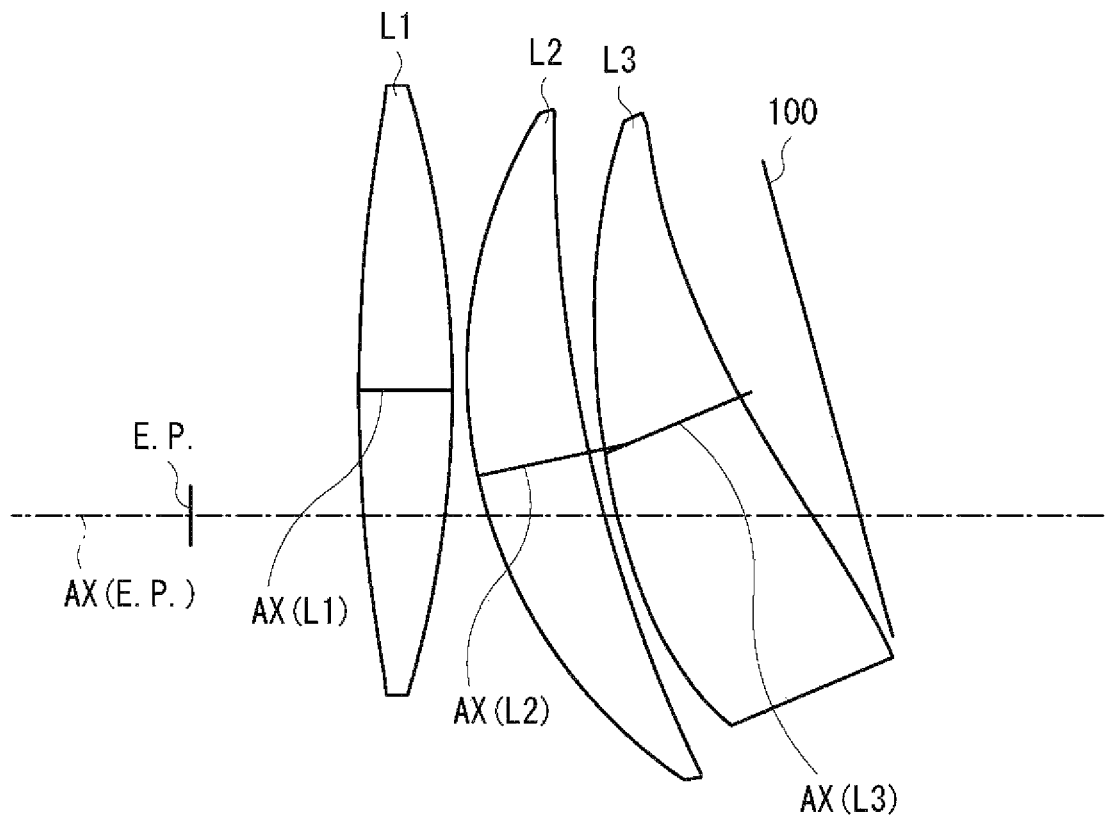
[ FIG. 31 ]
EXAMPLE 7

[ FIG. 32 ]
EXAMPLE 7
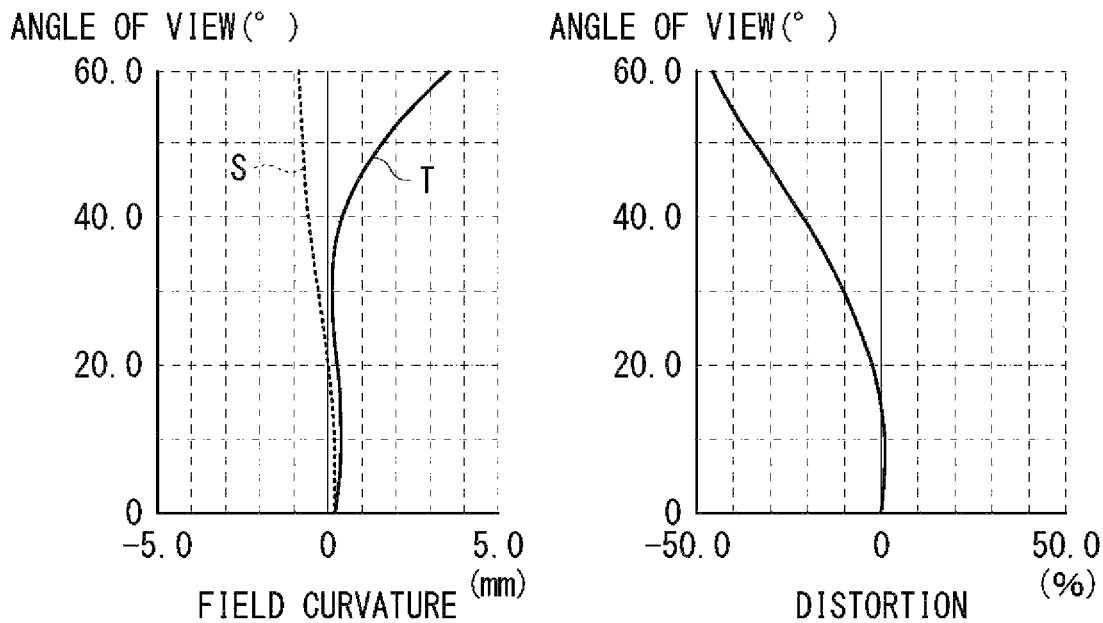
[ FIG. 33 ]
EXAMPLE 7
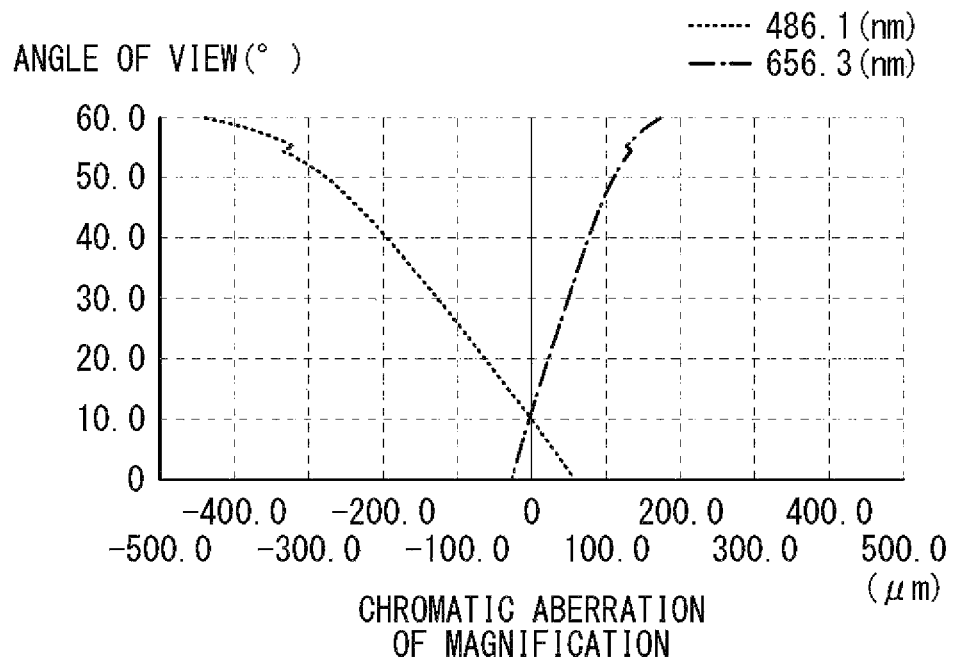

[ FIG. 34 ]
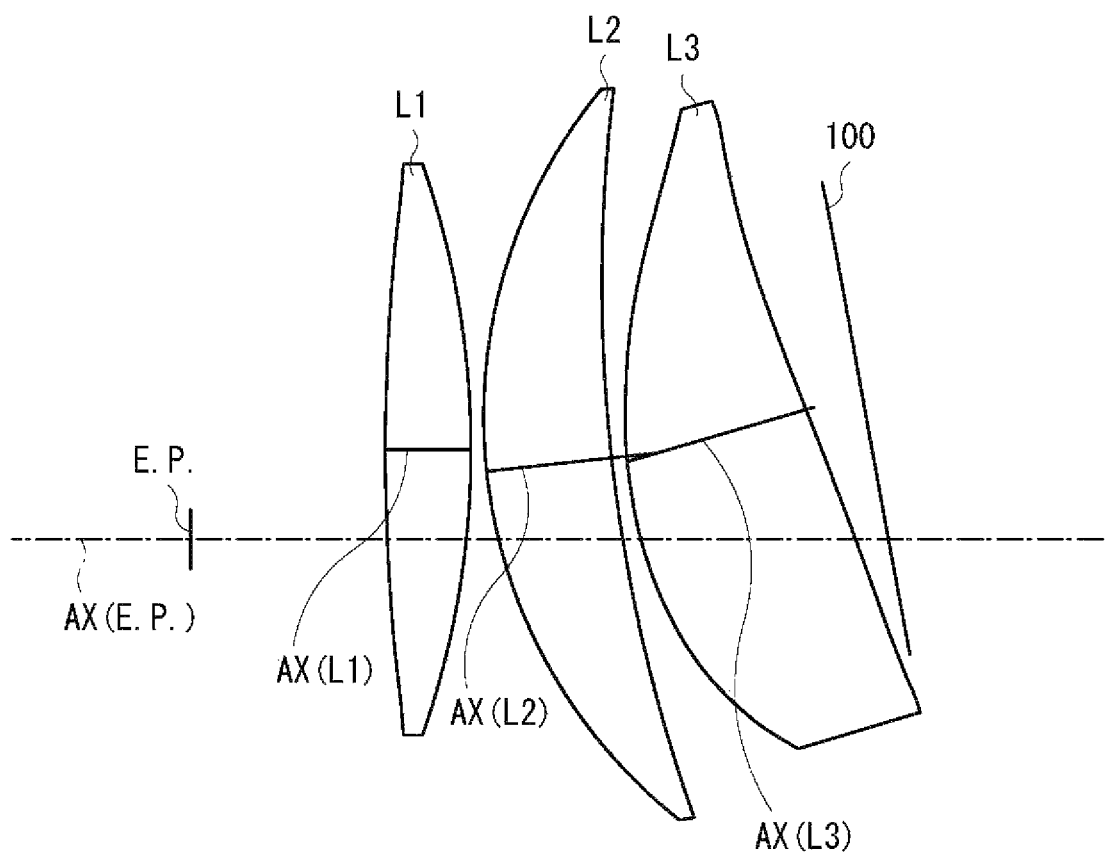

[ FIG. 35 ]
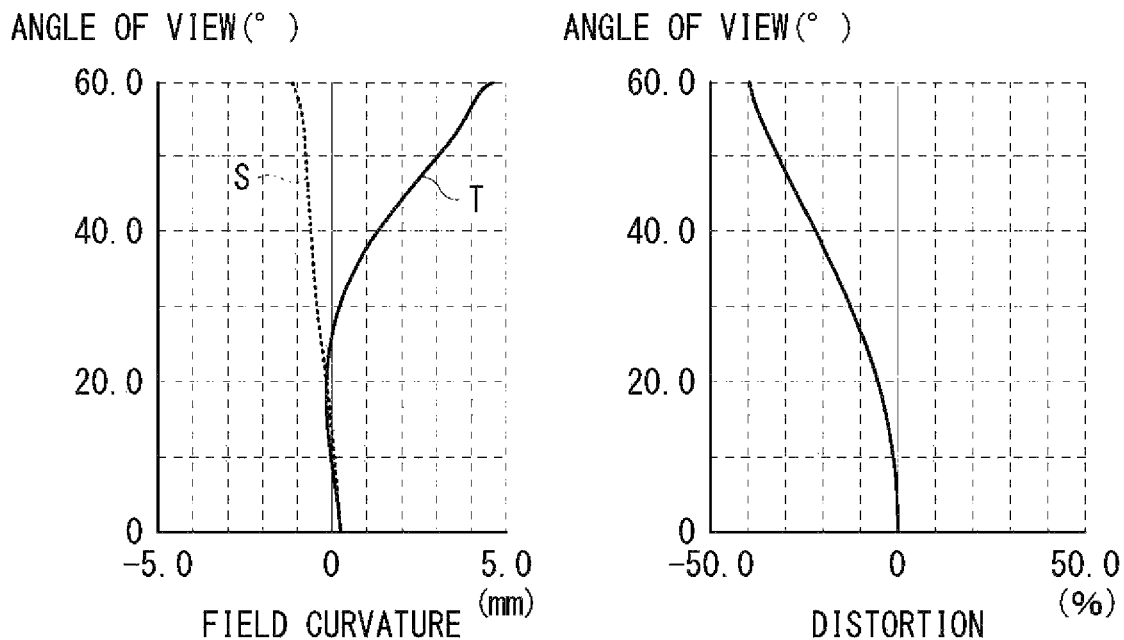
[ FIG. 36 ]
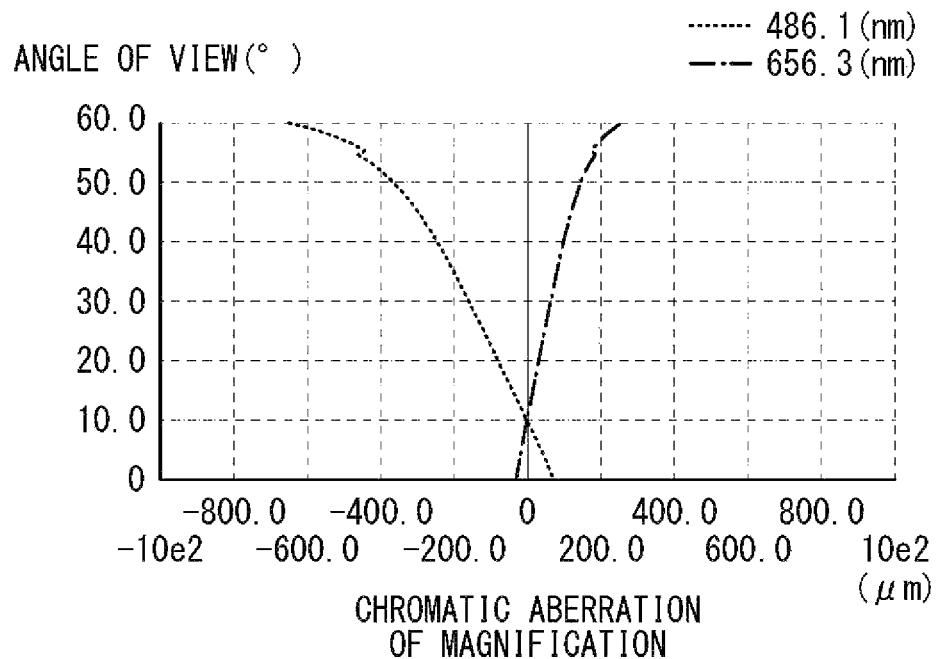

[ FIG. 37 ]
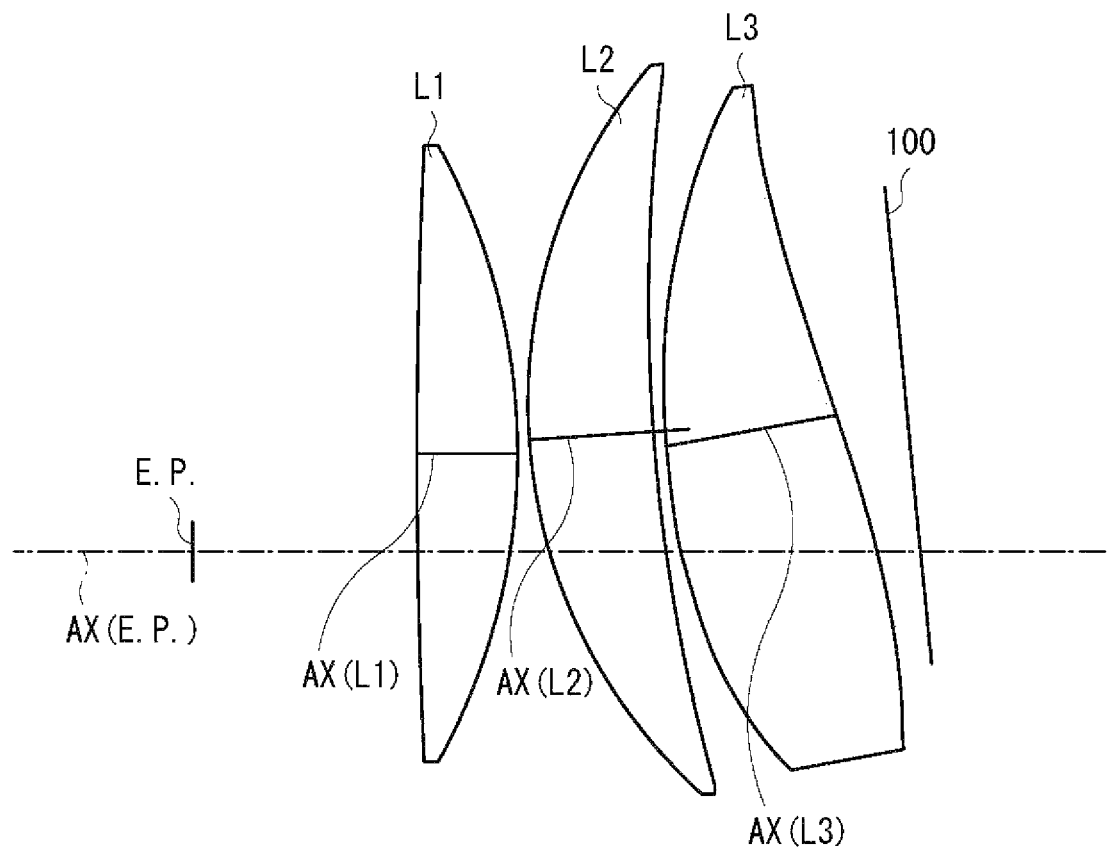

[ FIG. 38 ]
EXAMPLE 9
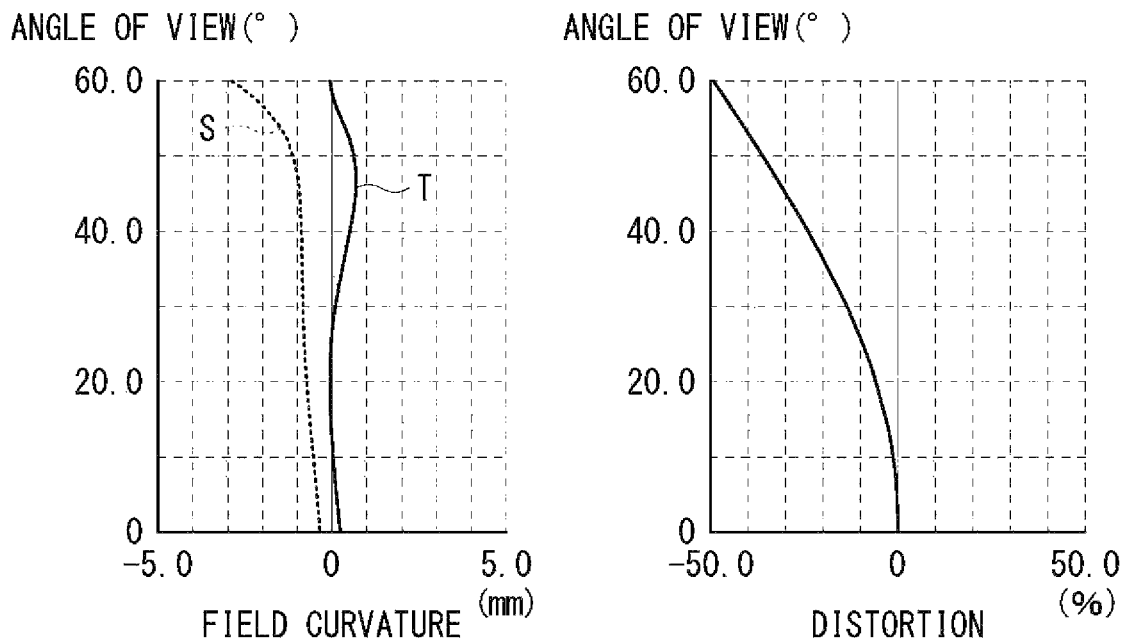
[ FIG. 39 ]
EXAMPLE 9
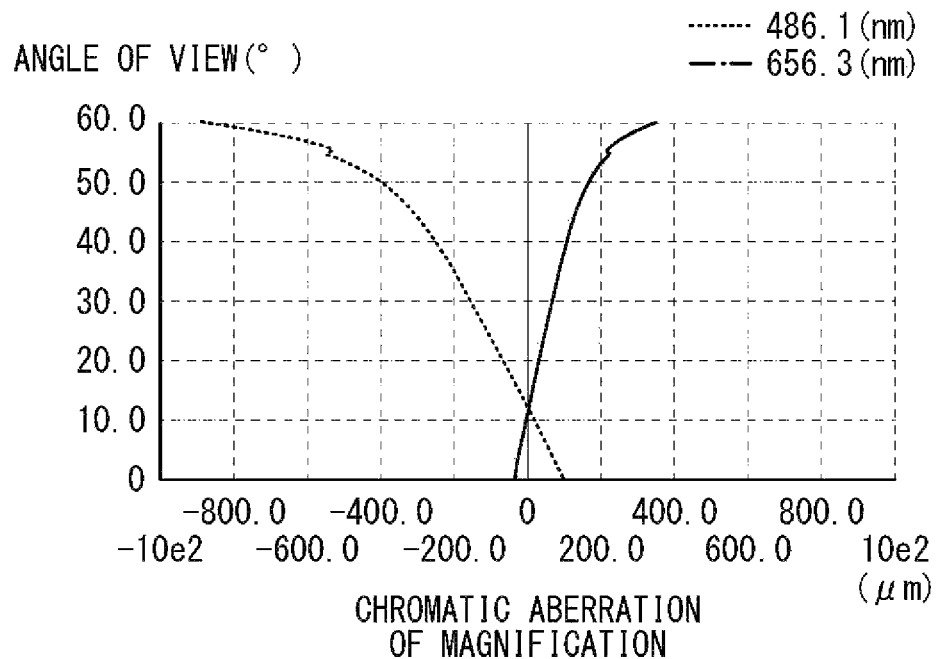

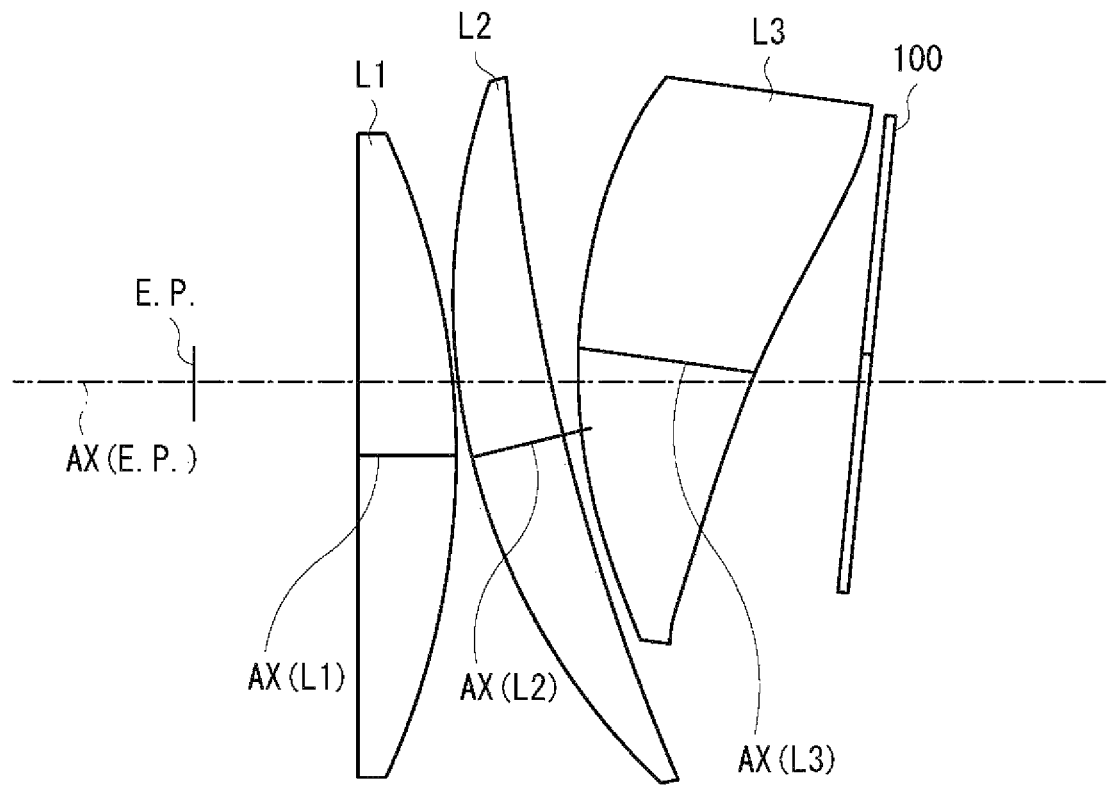
[FIG. 40]
EXAMPLE 10

[ FIG. 41 ]
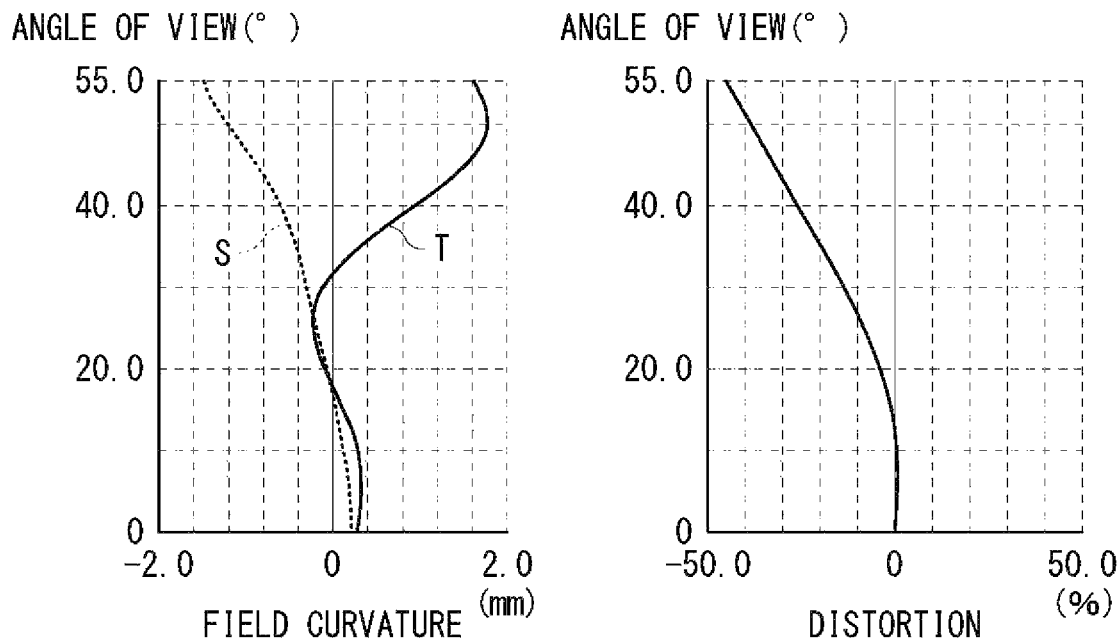
[ FIG. 42 ]
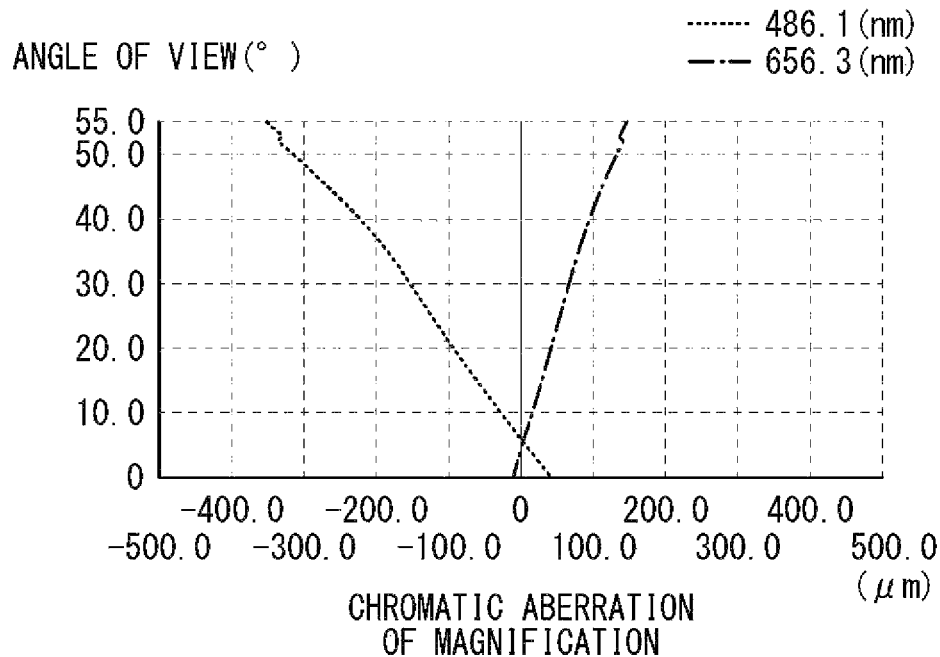

[ FIG. 43 ]
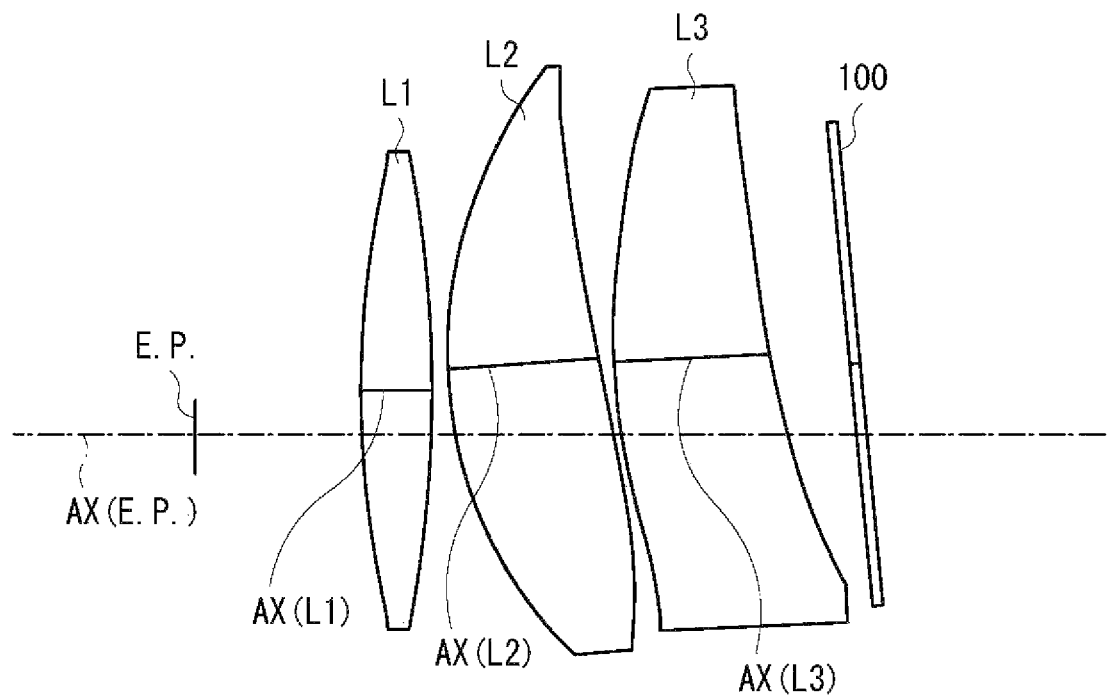

[ FIG. 44 ]
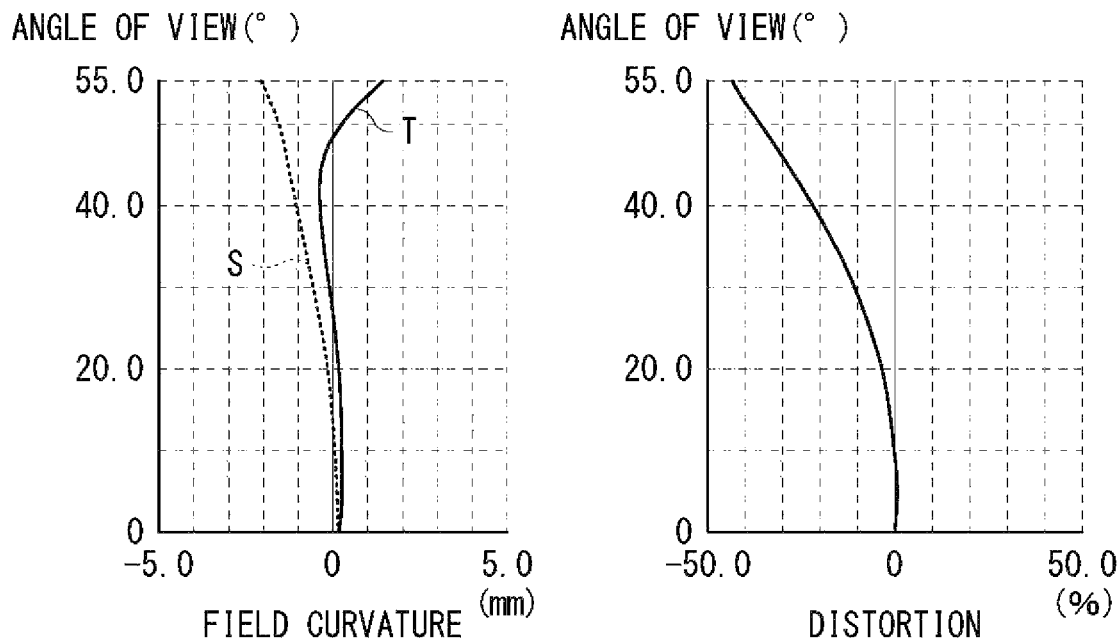
[ FIG. 45 ]
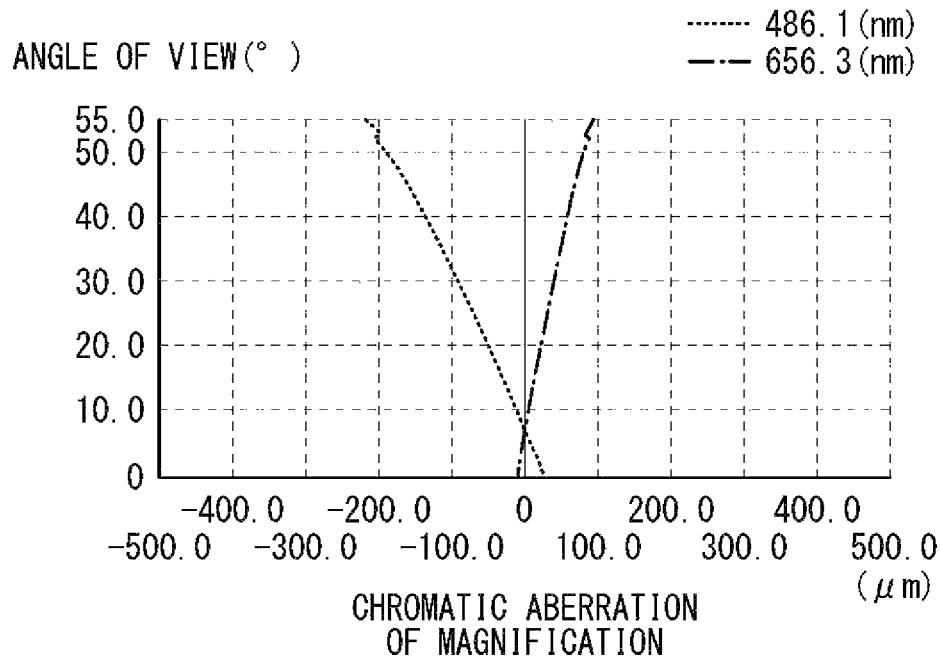

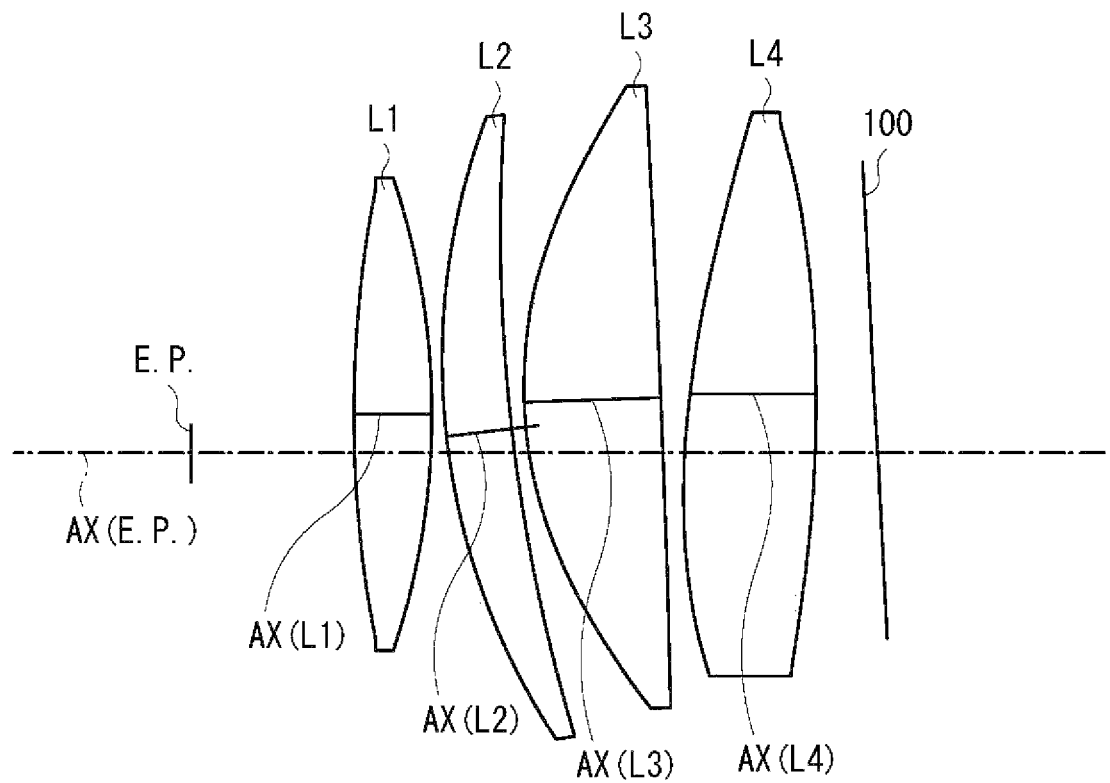

[ FIG. 47 ]
EXAMPLE 12
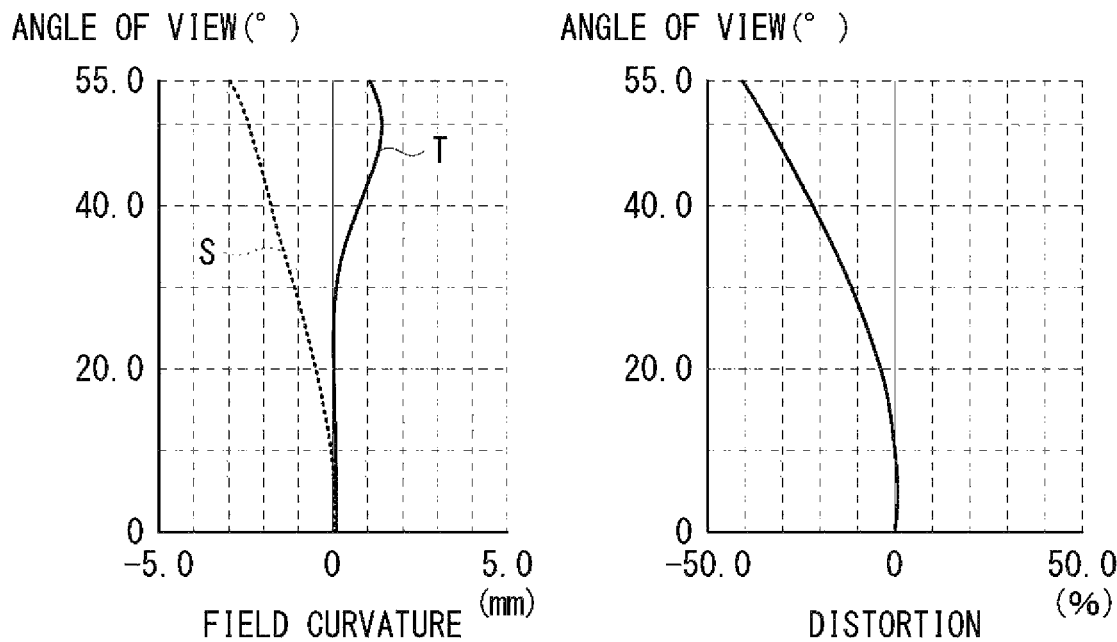
[ FIG. 48 ]
EXAMPLE 12
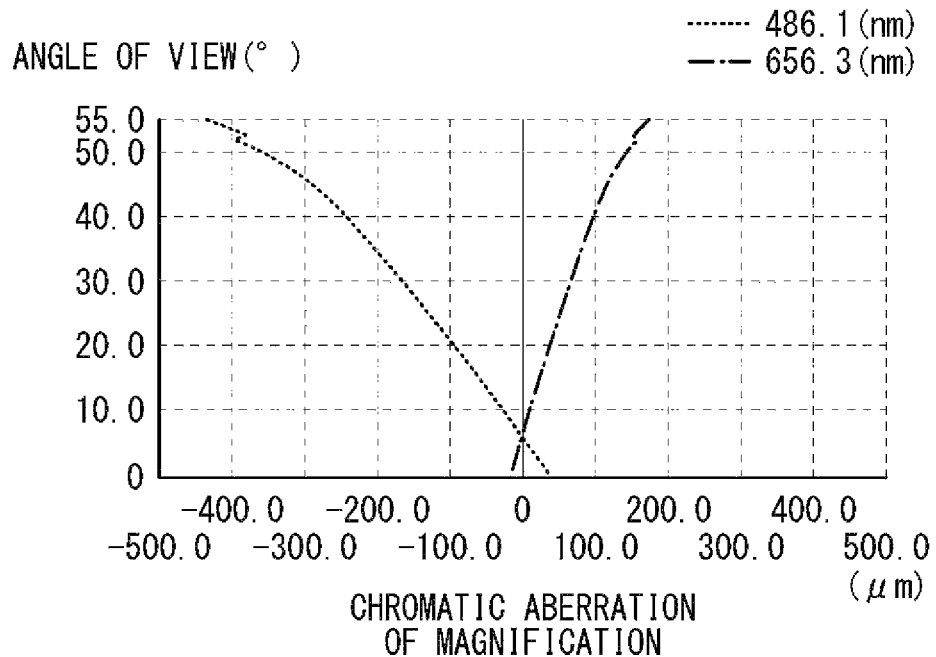

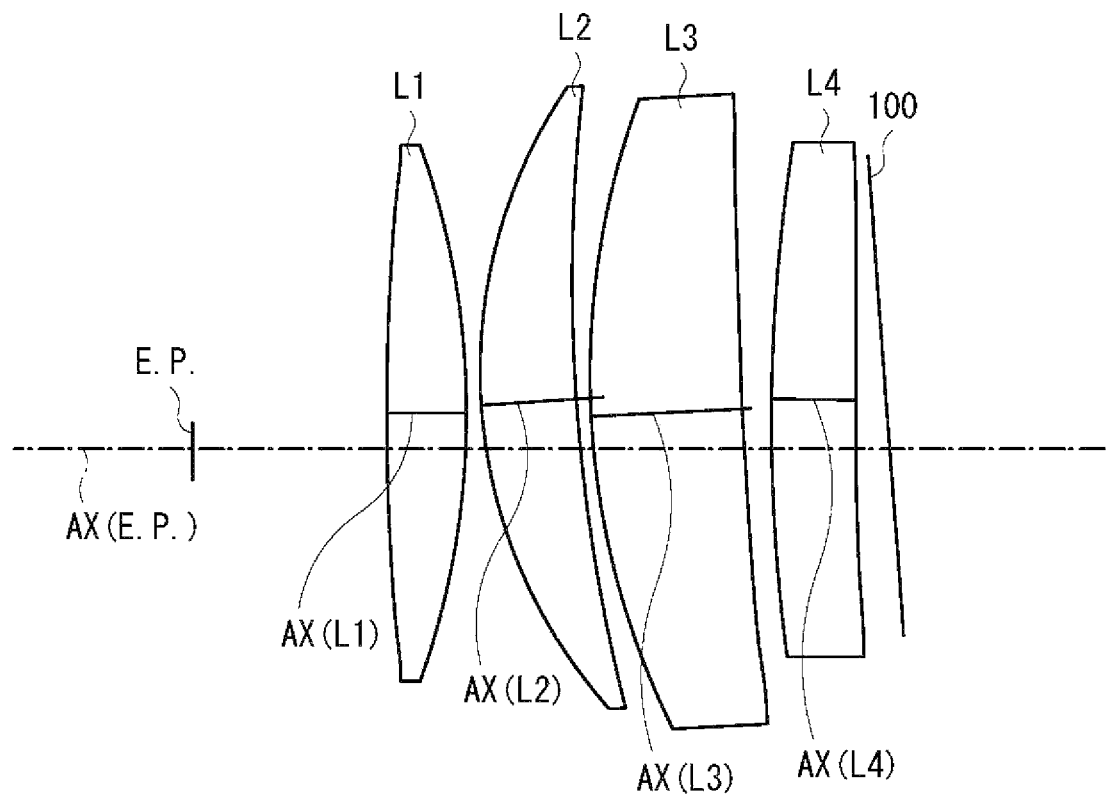
[ FIG. 49 ]

[ FIG. 50 ]
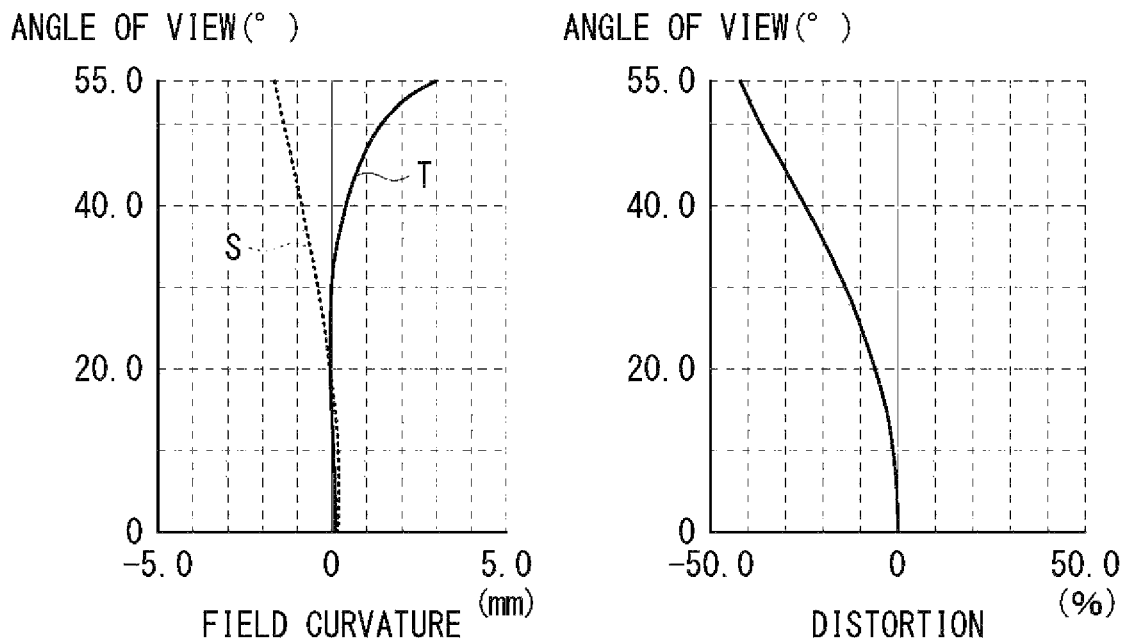
[ FIG. 51 ]
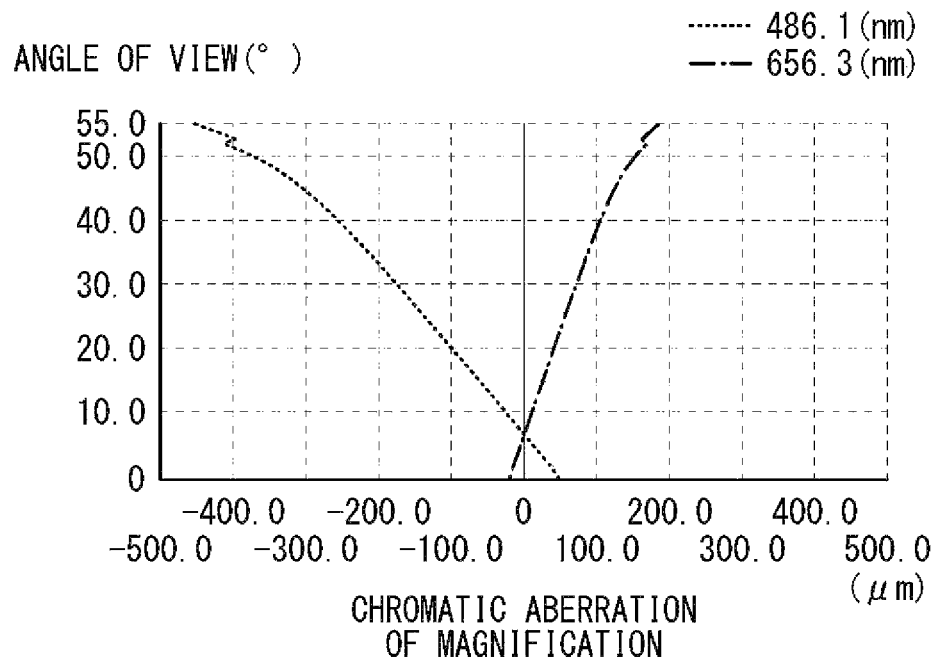

[ FIG. 52 ]
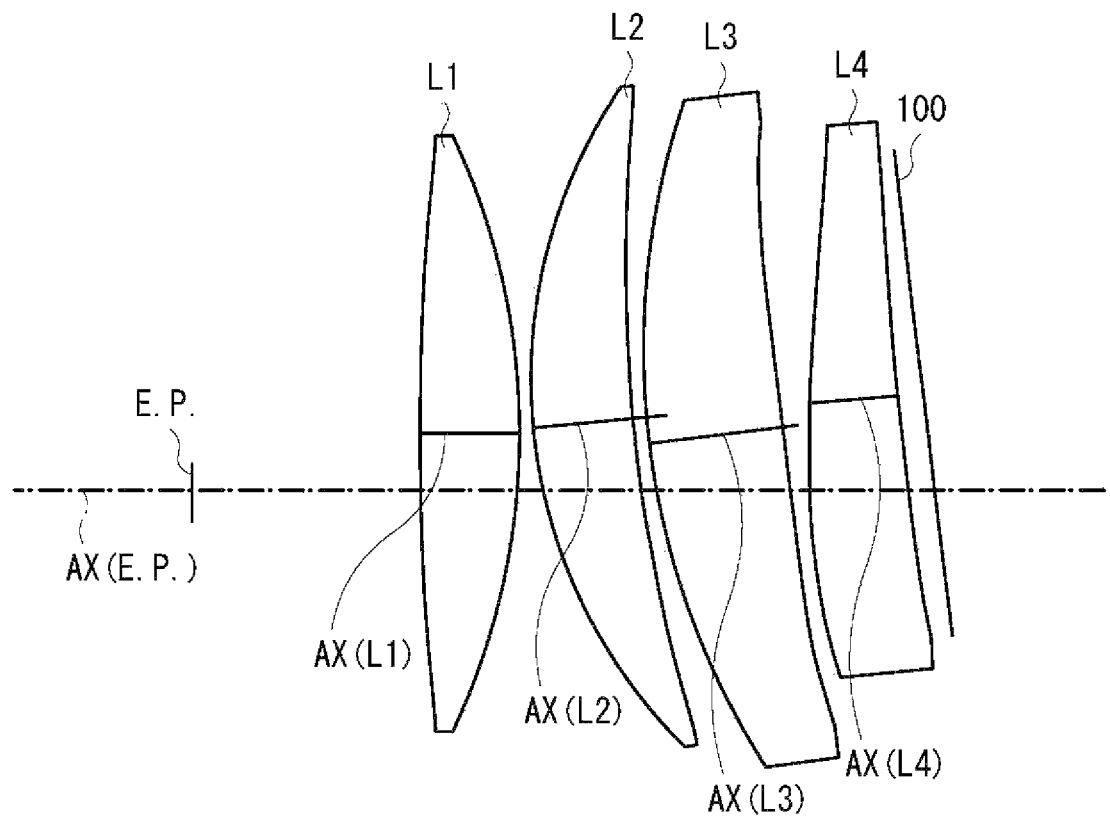

[ FIG. 53 ]
EXAMPLE 14
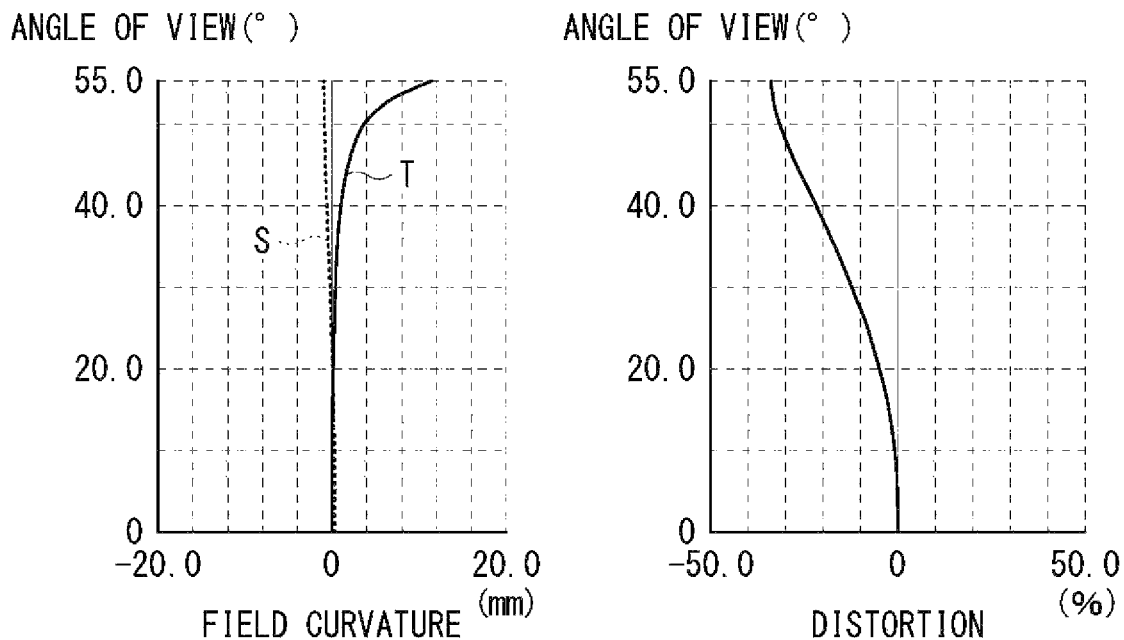
[ FIG. 54 ]
EXAMPLE 14
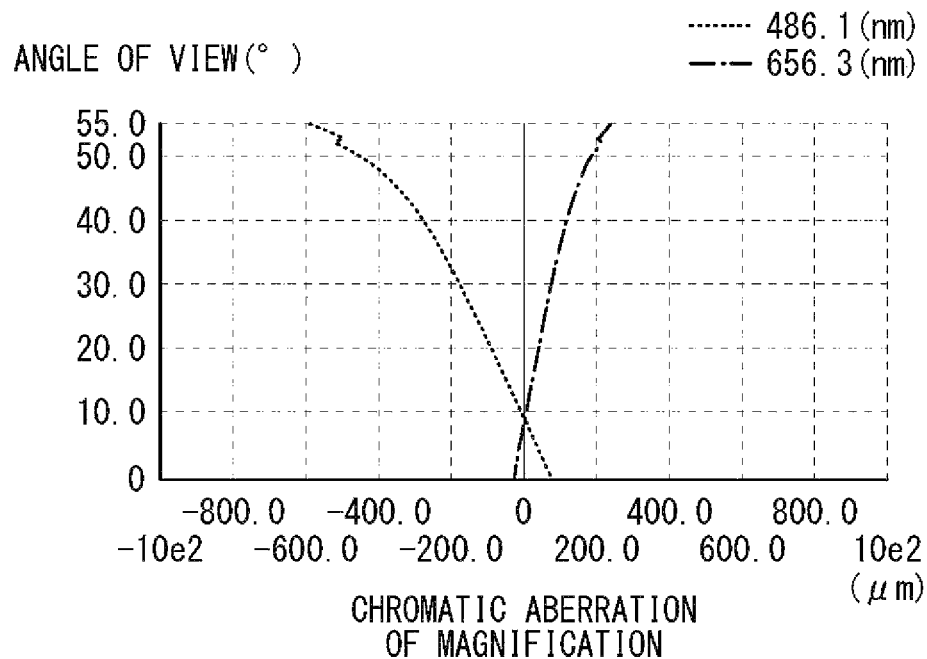

[ FIG. 55 ]
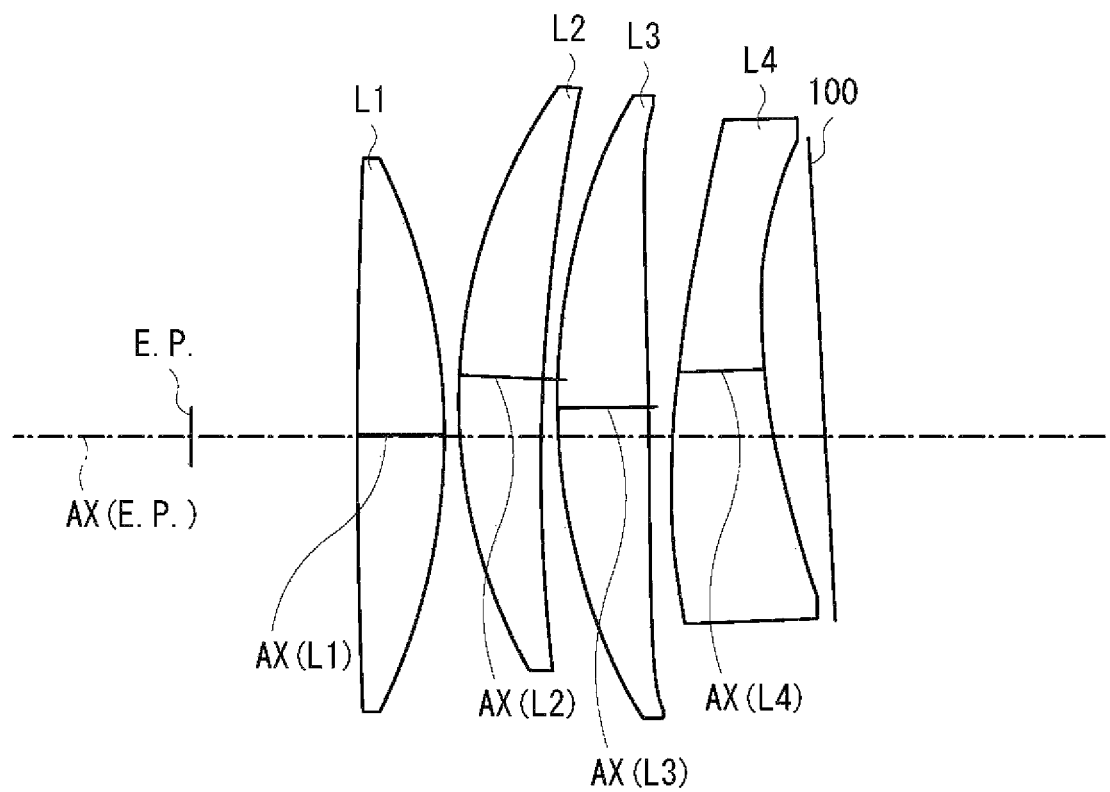

[ FIG. 56 ]
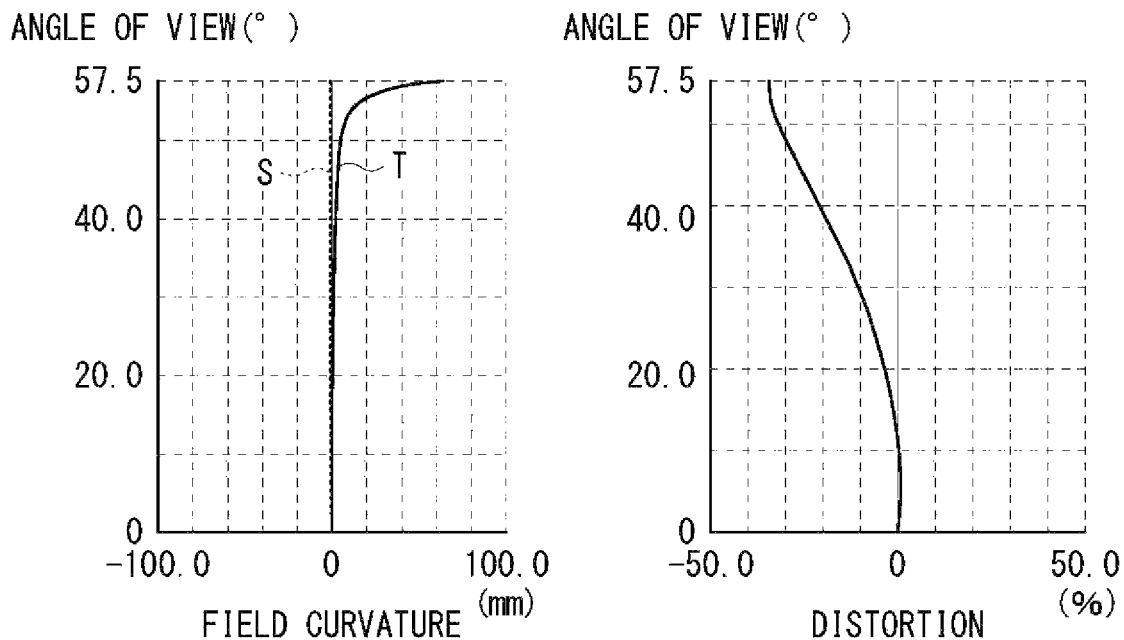
[ FIG. 57 ]
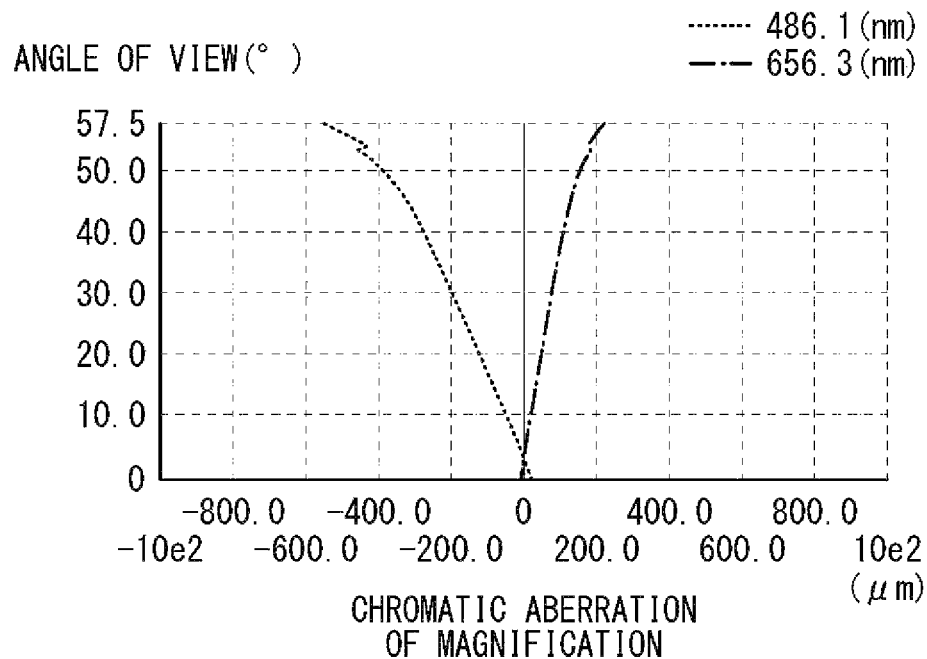

[ FIG. 58 ]
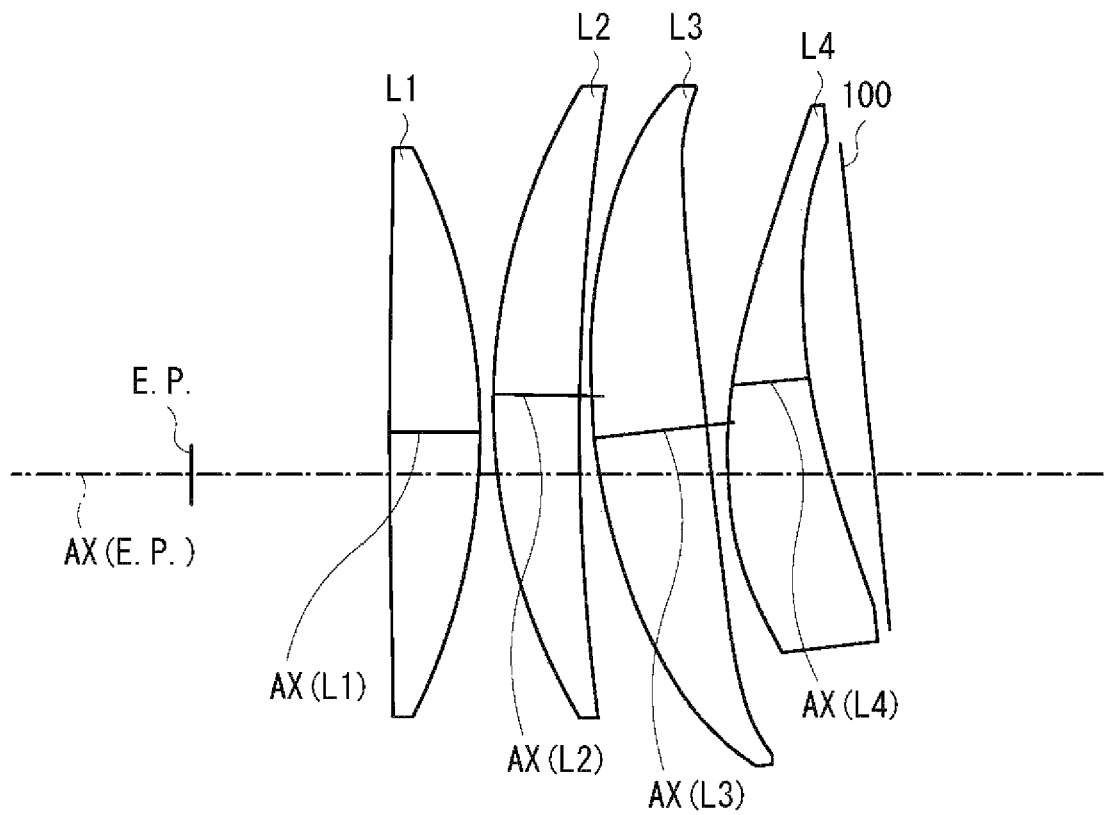

[ FIG. 59 ]
EXAMPLE 16
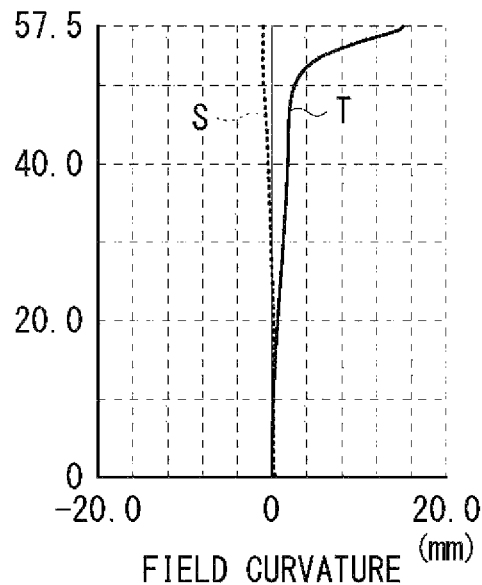
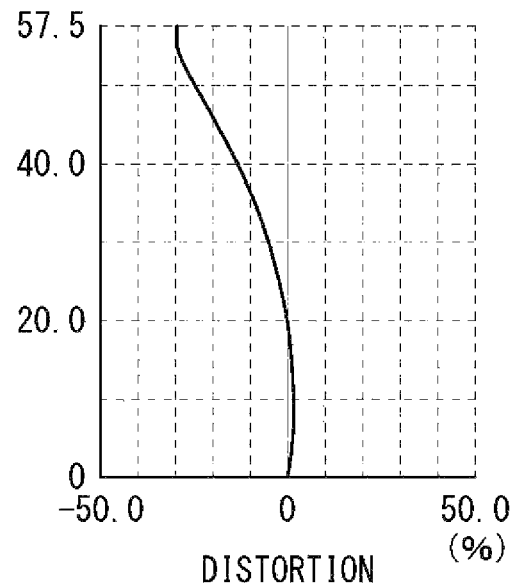
[ FIG. 60 ]
EXAMPLE 16
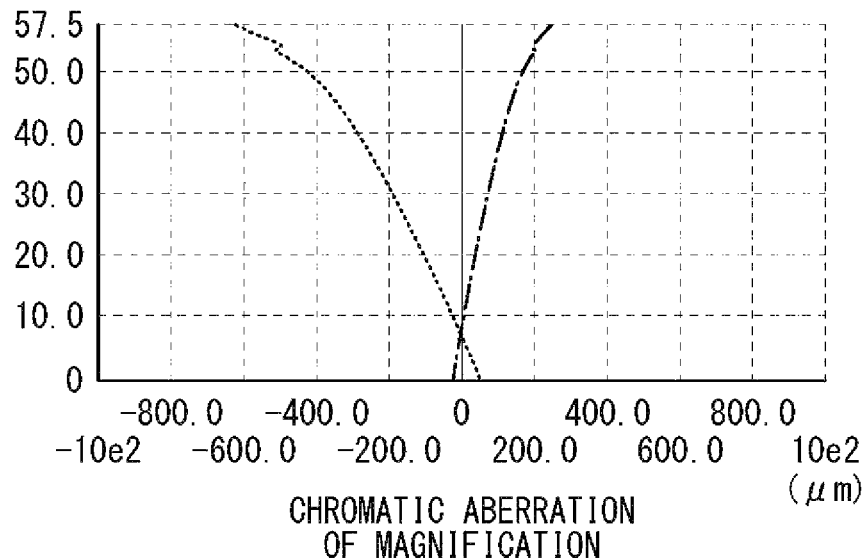

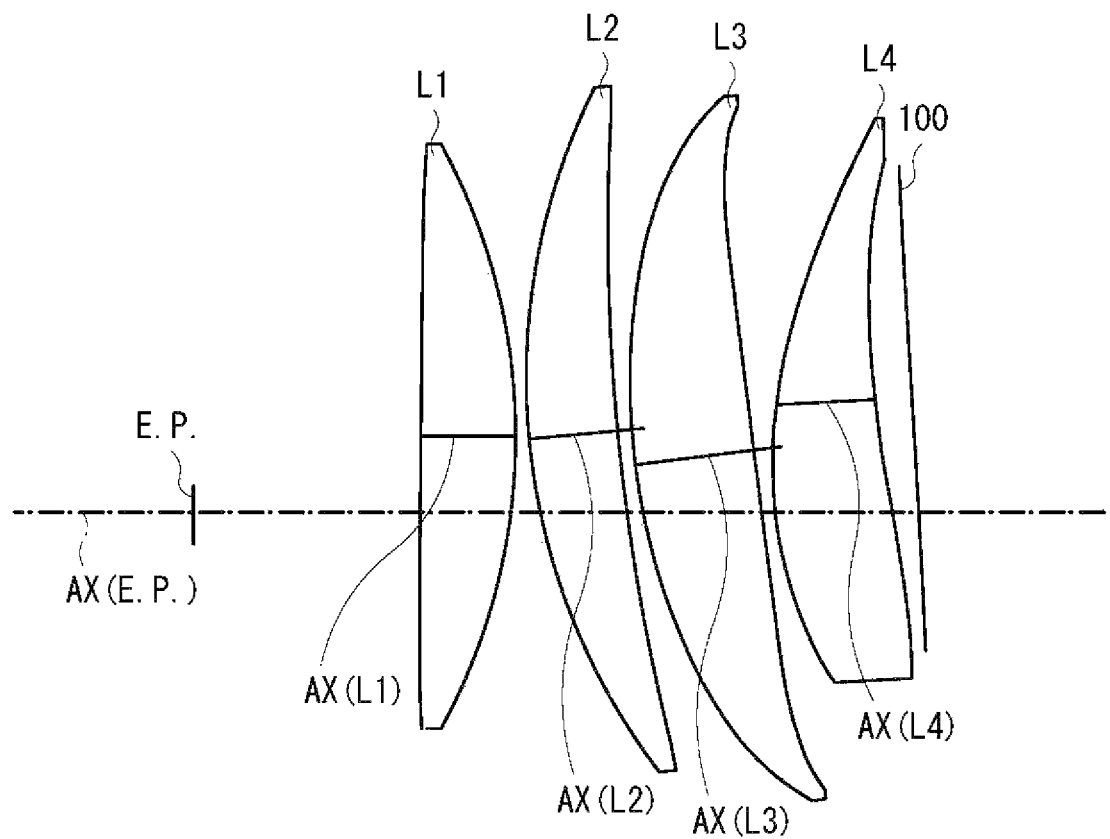

[ FIG. 62 ]
EXAMPLE 17
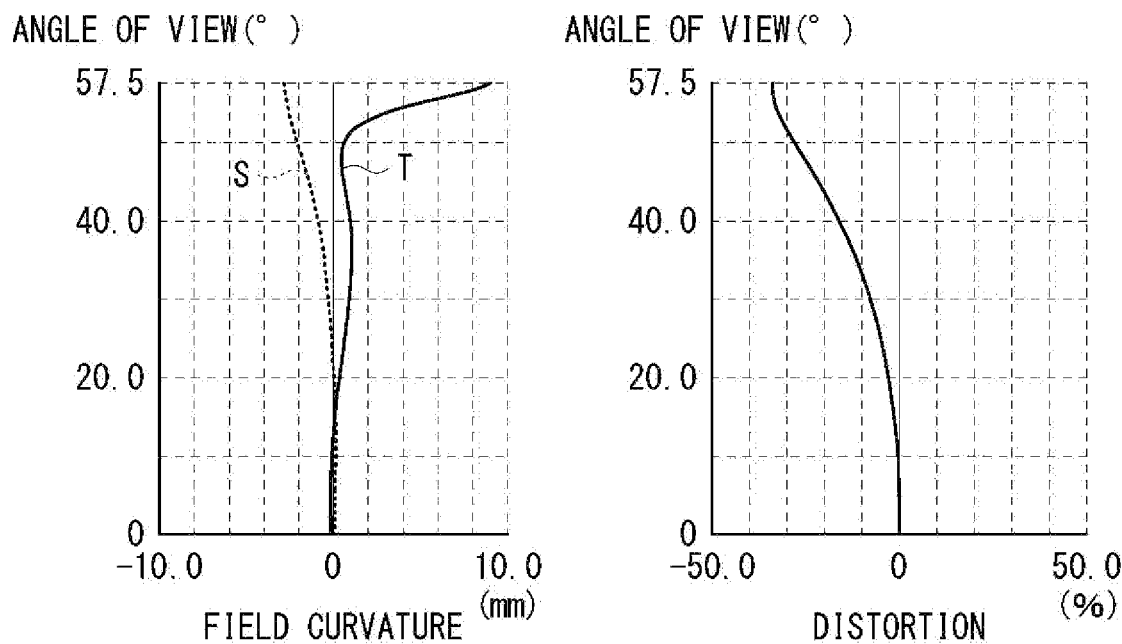
[ FIG. 63 ]
EXAMPLE 17
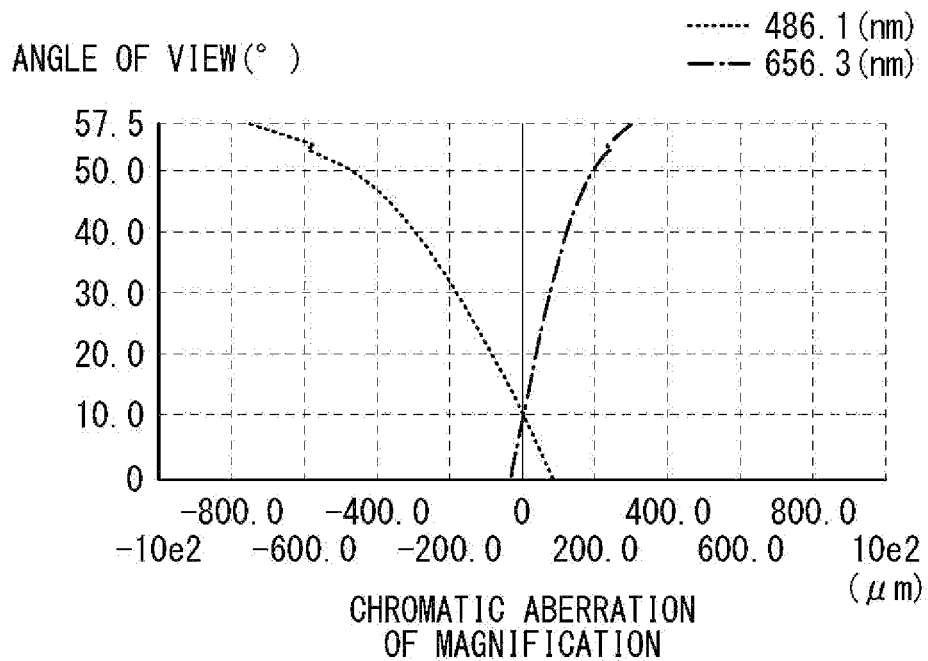

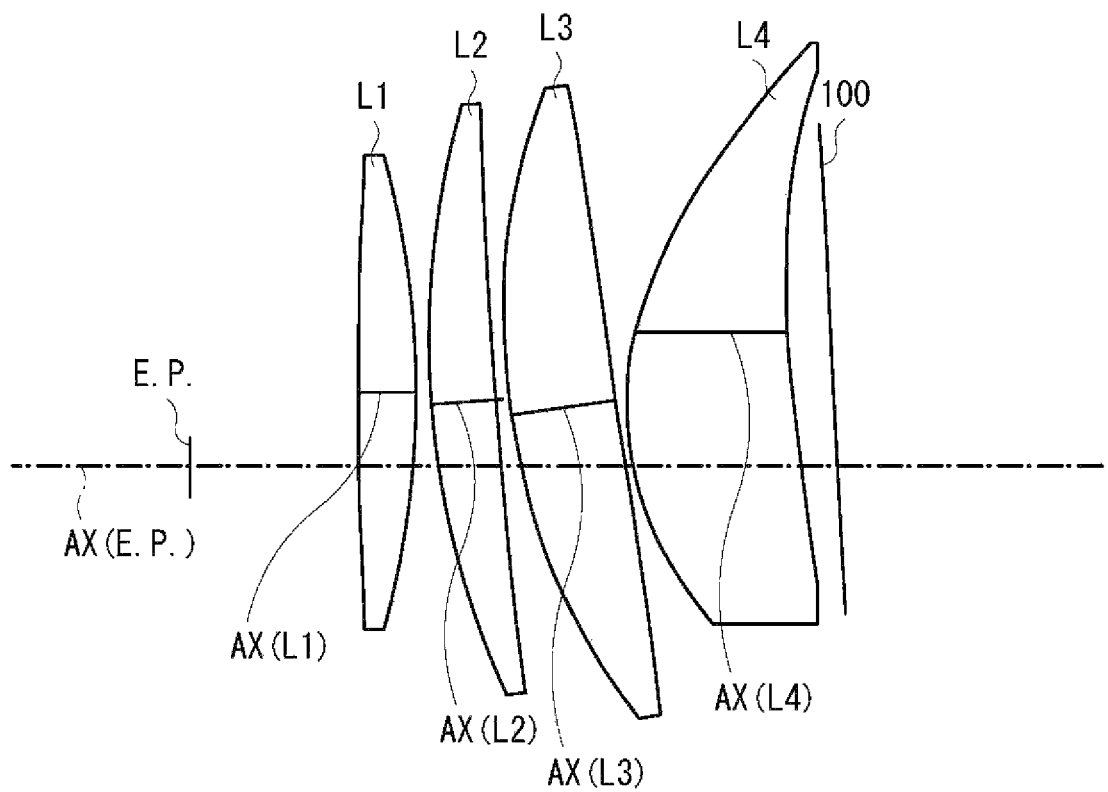
[ FIG. 64 ]
EXAMPLE 18

[ FIG. 65 ]
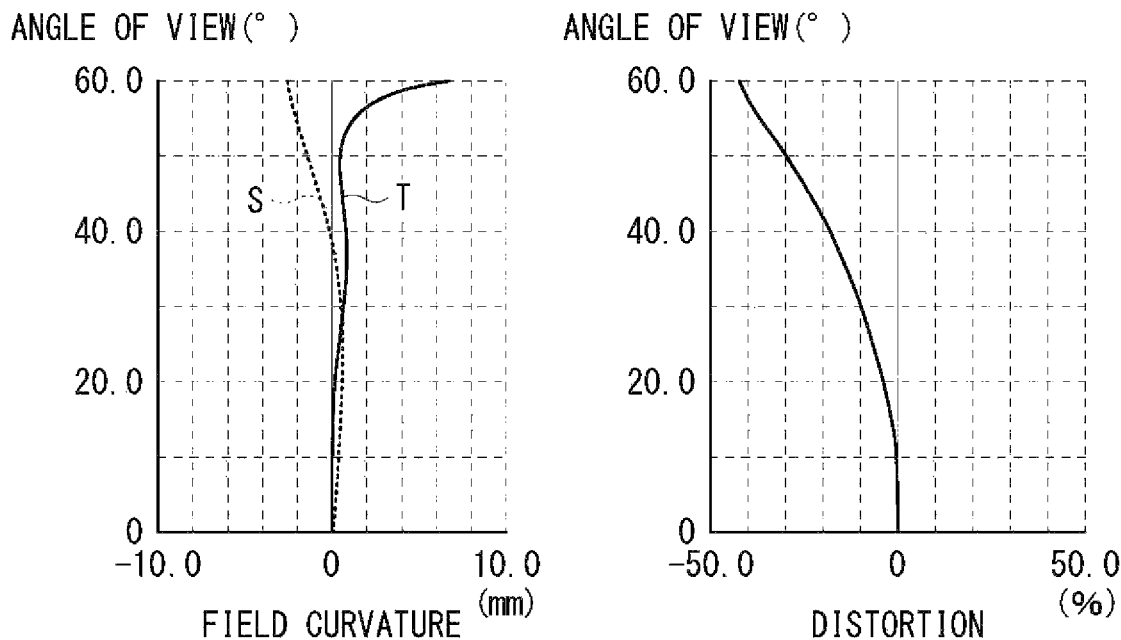
[ FIG. 66 ]
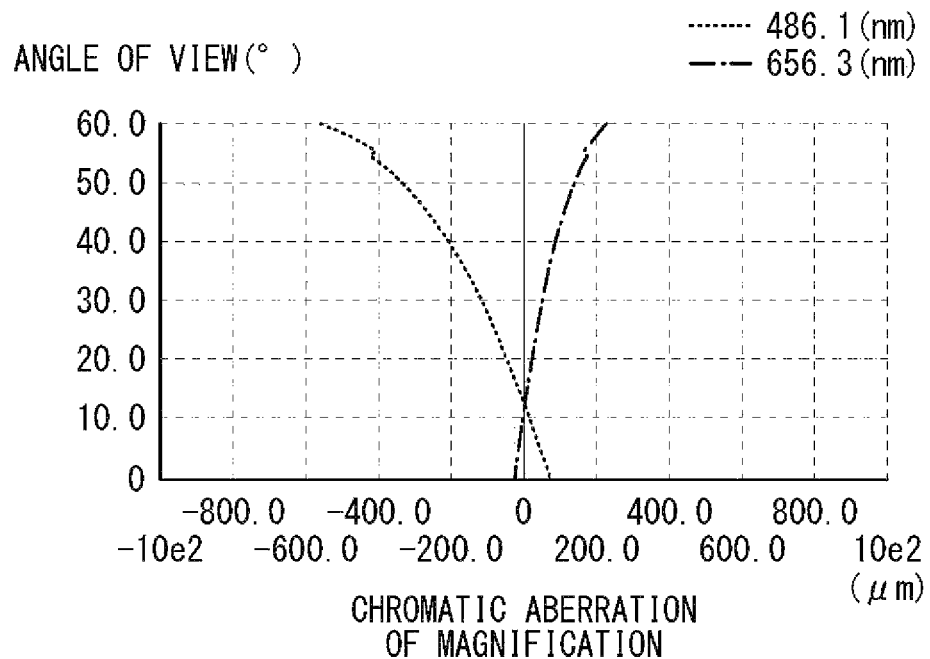

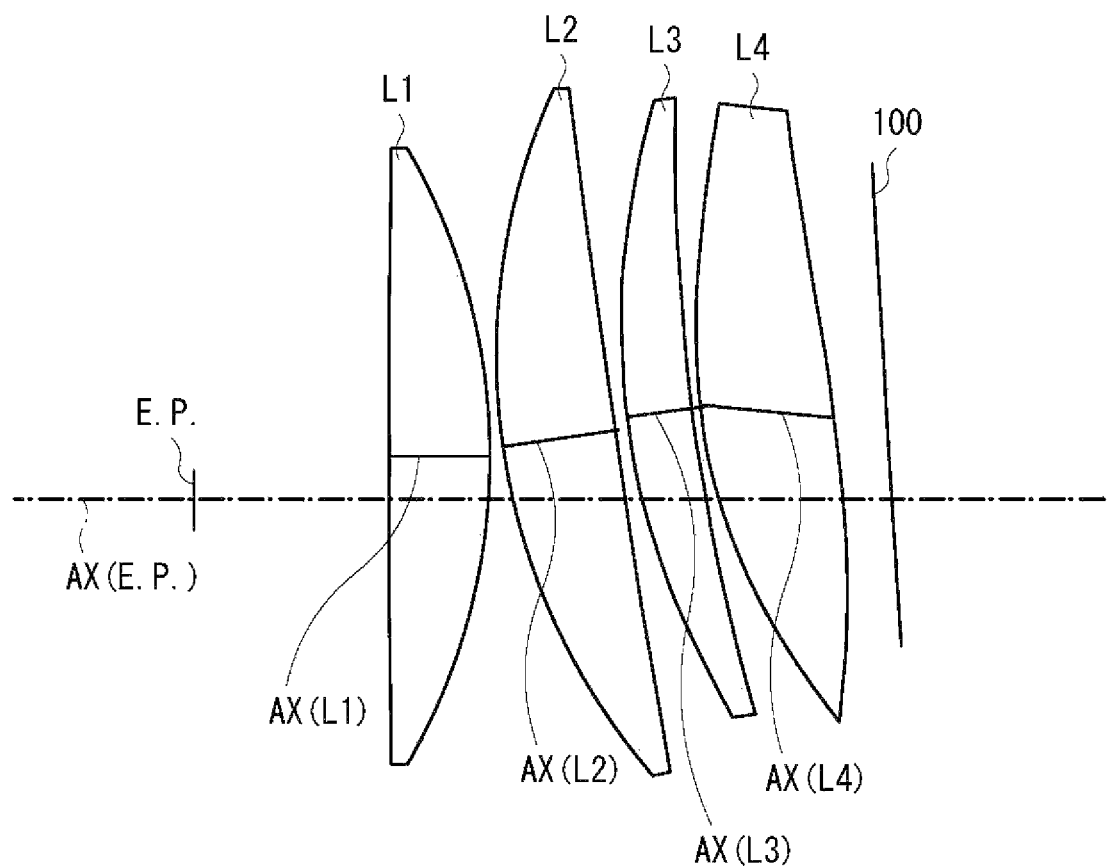
[FIG. 67]

[ FIG. 68 ]
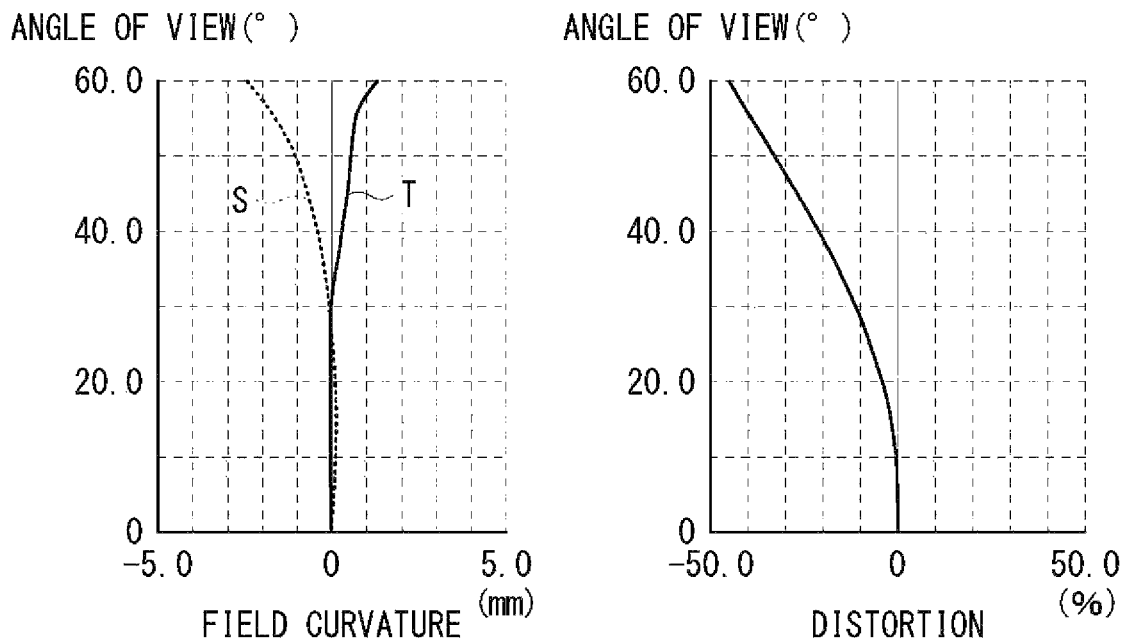
[ FIG. 69 ]
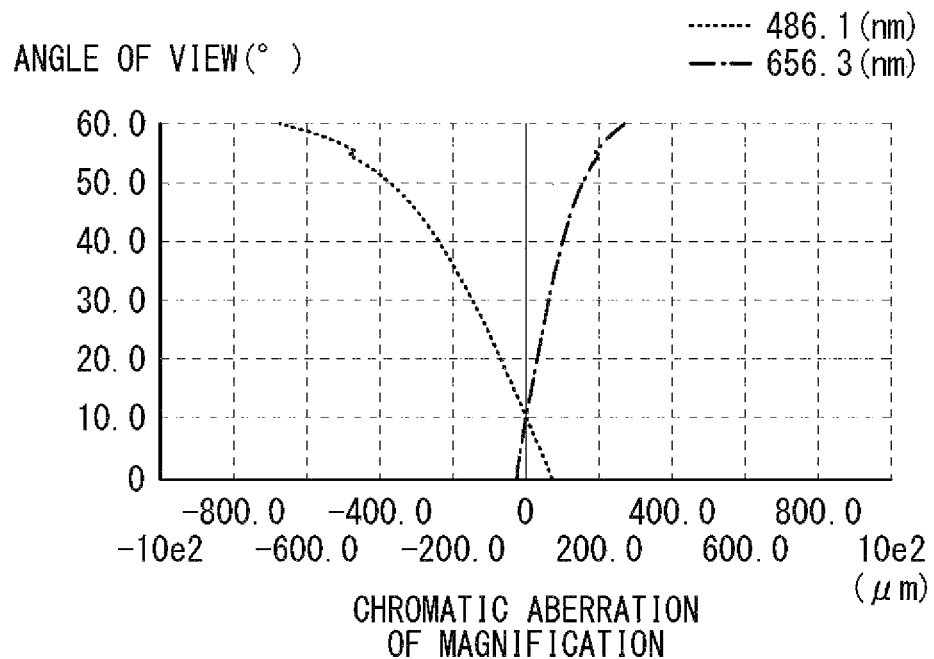

[ FIG. 70 ]
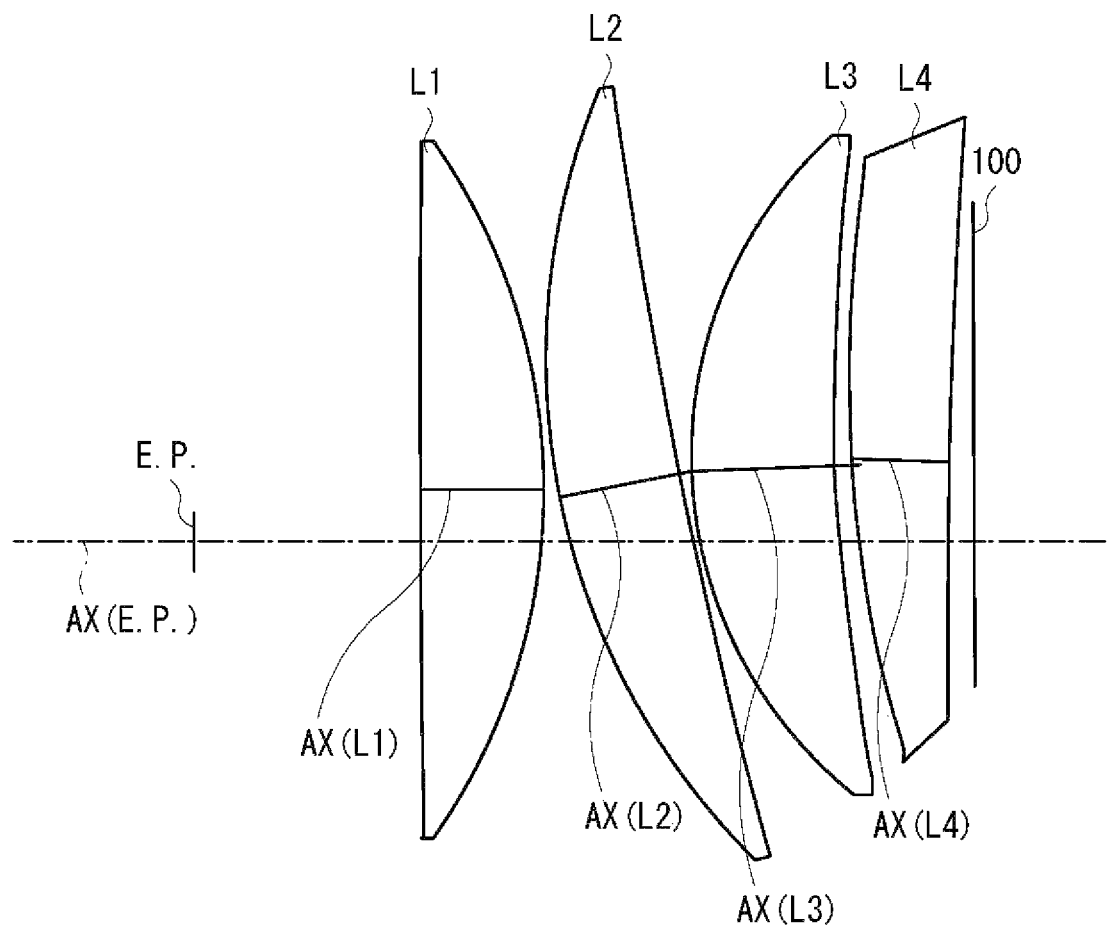

[ FIG. 71 ]
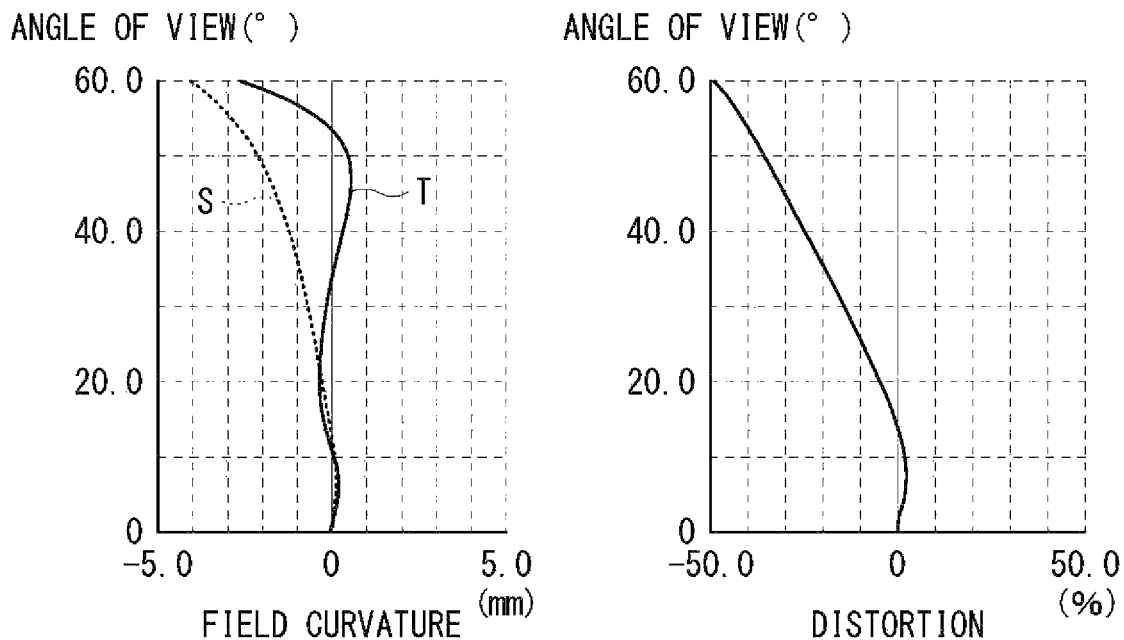
[ FIG. 72 ]
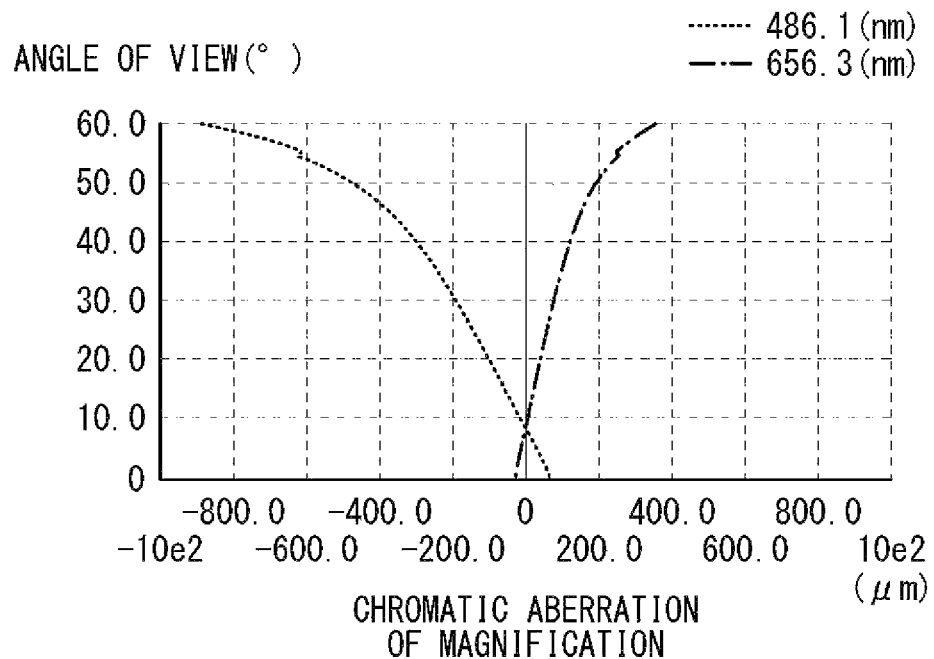

[FIG. 73]
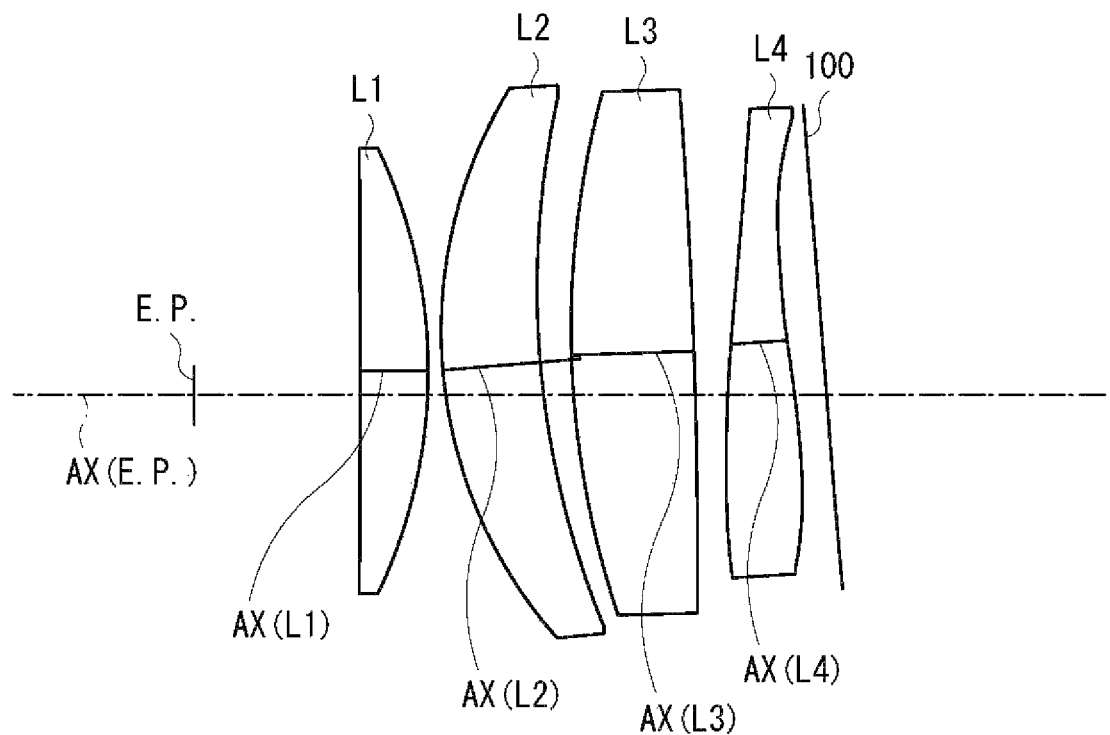
EXAMPLE 21

[ FIG. 74 ]
EXAMPLE 21
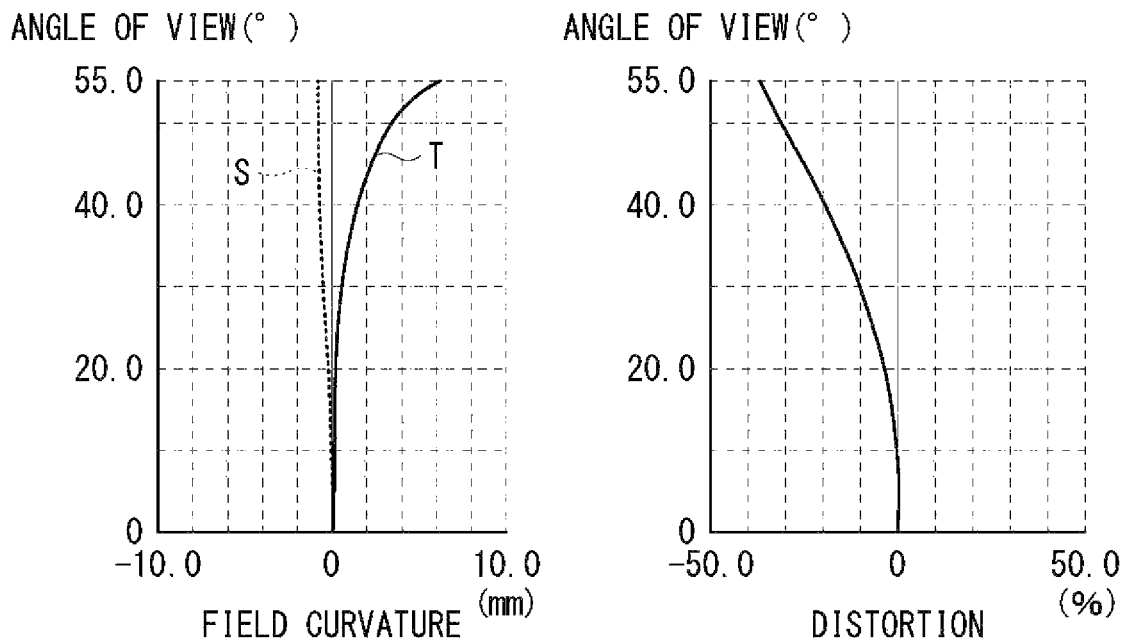
[ FIG. 75 ]
EXAMPLE 21
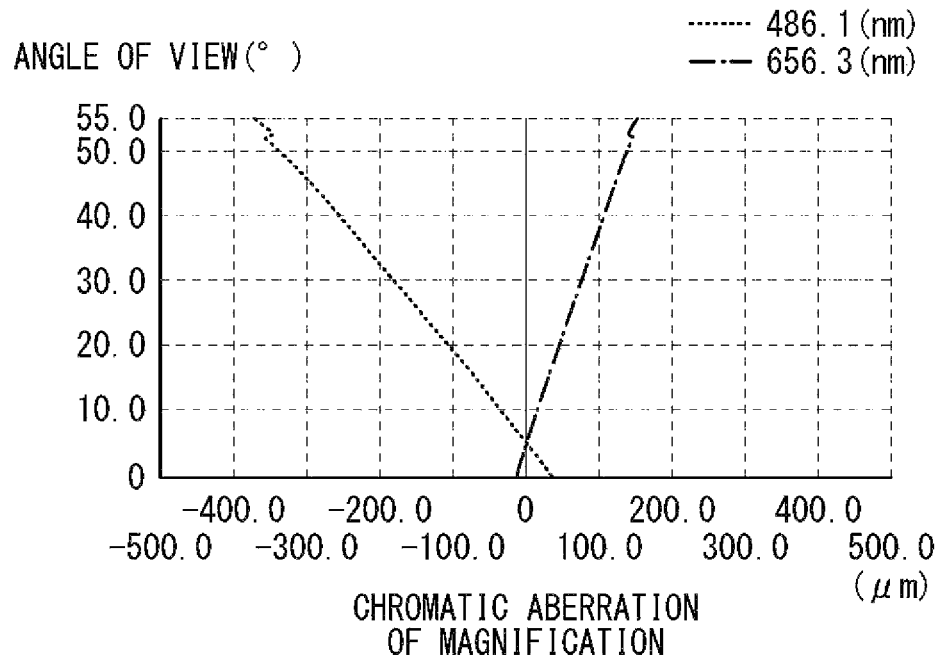

[ FIG. 76 ]
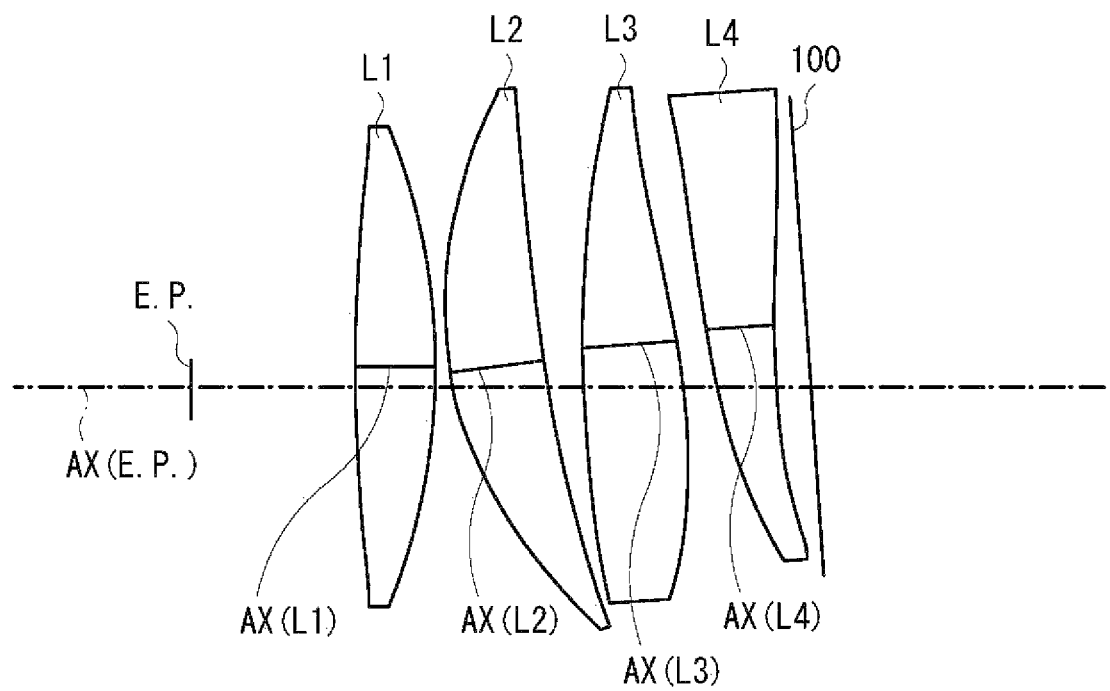

[ FIG. 77 ]
EXAMPLE 22
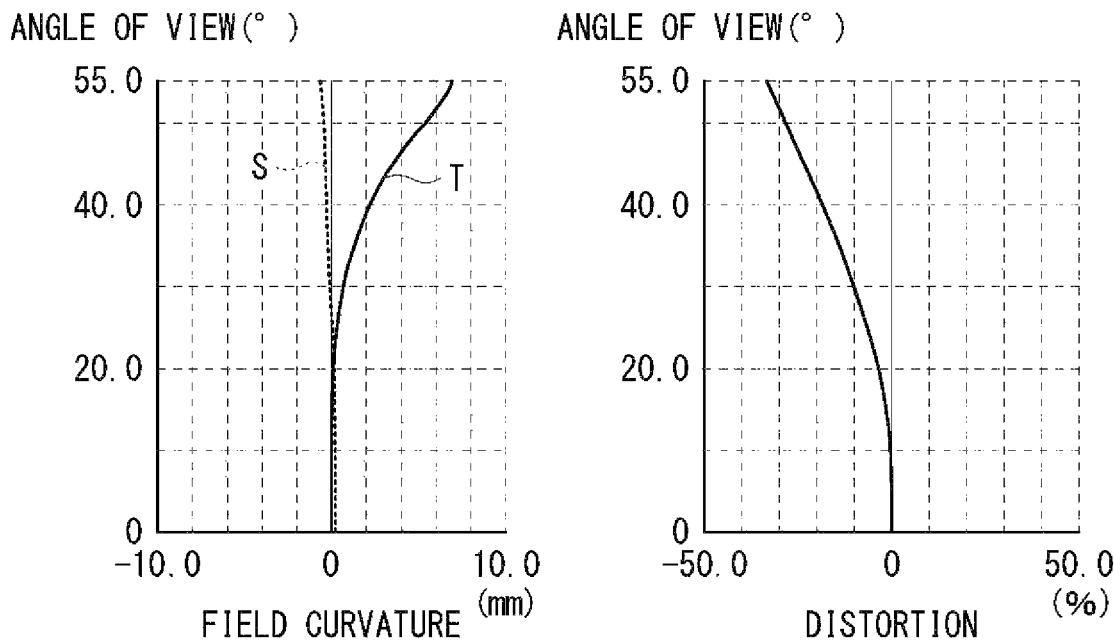
[ FIG. 78 ]
EXAMPLE 22
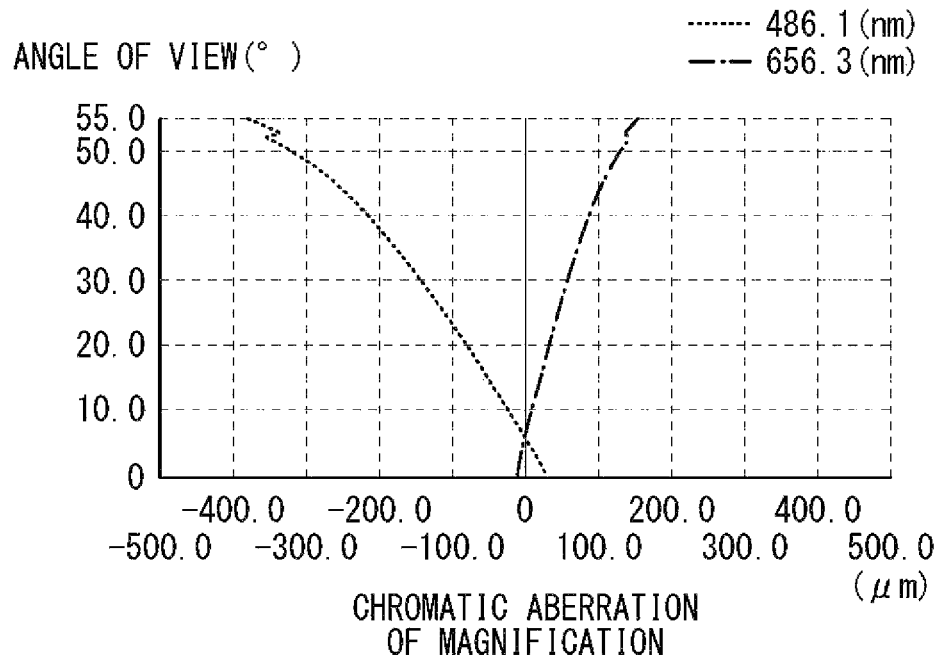

[FIG. 79]
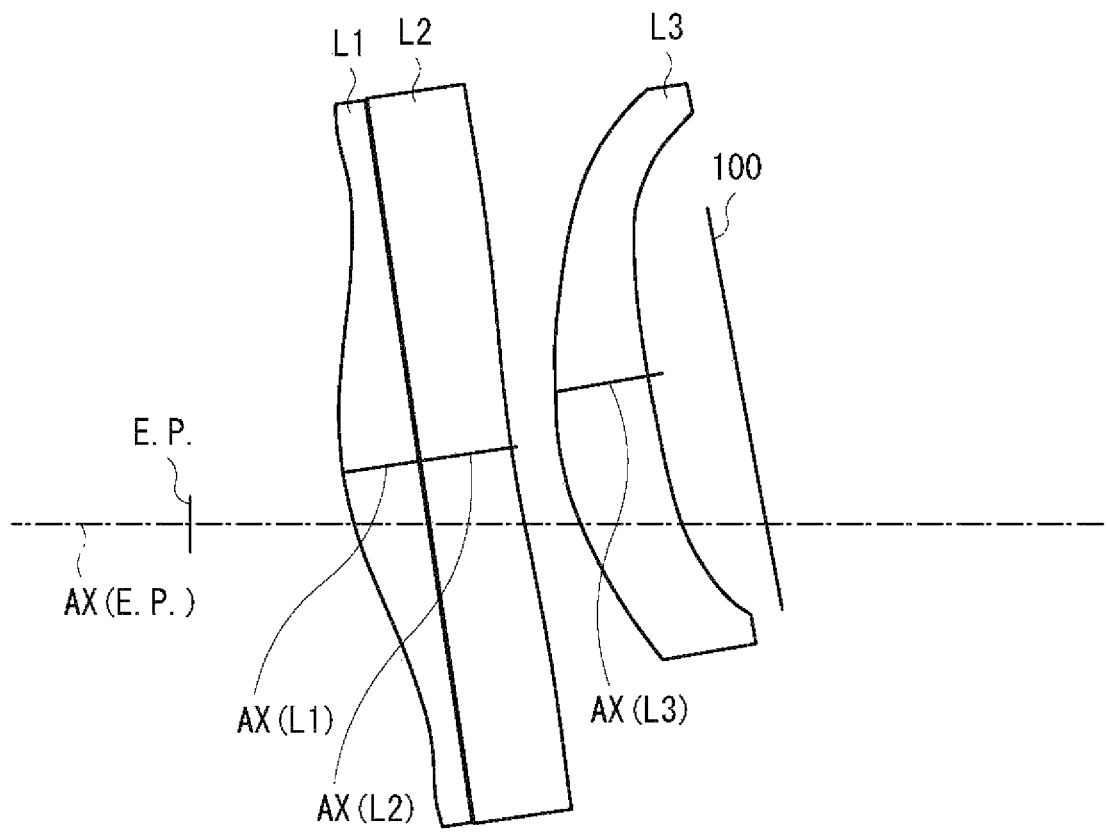

[ FIG. 80 ]
EXAMPLE 23
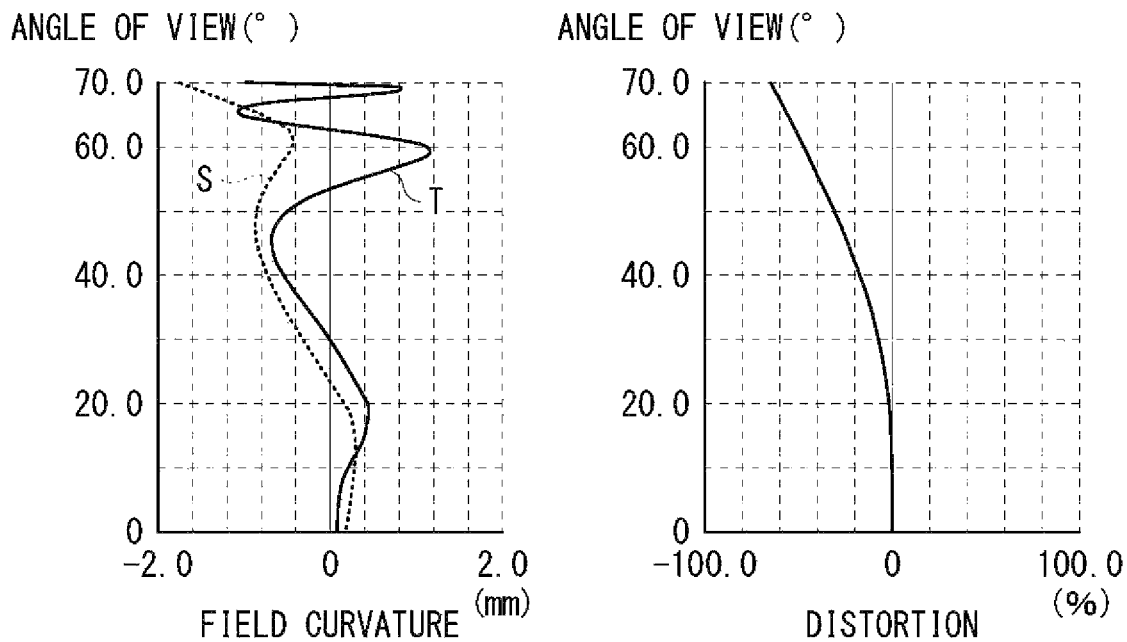
[ FIG. 81 ]
EXAMPLE 23
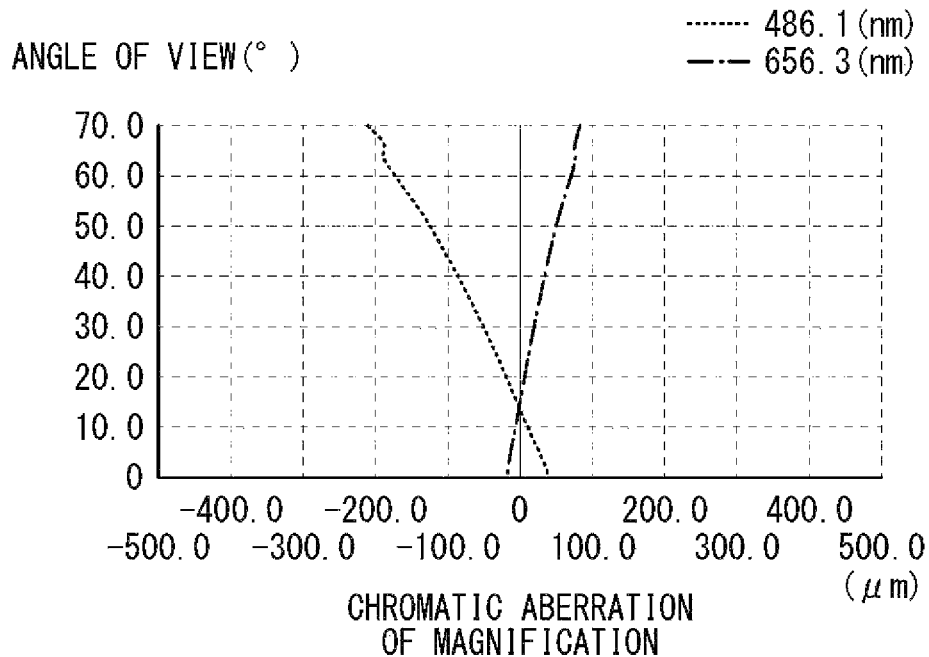

[ FIG. 82 ]
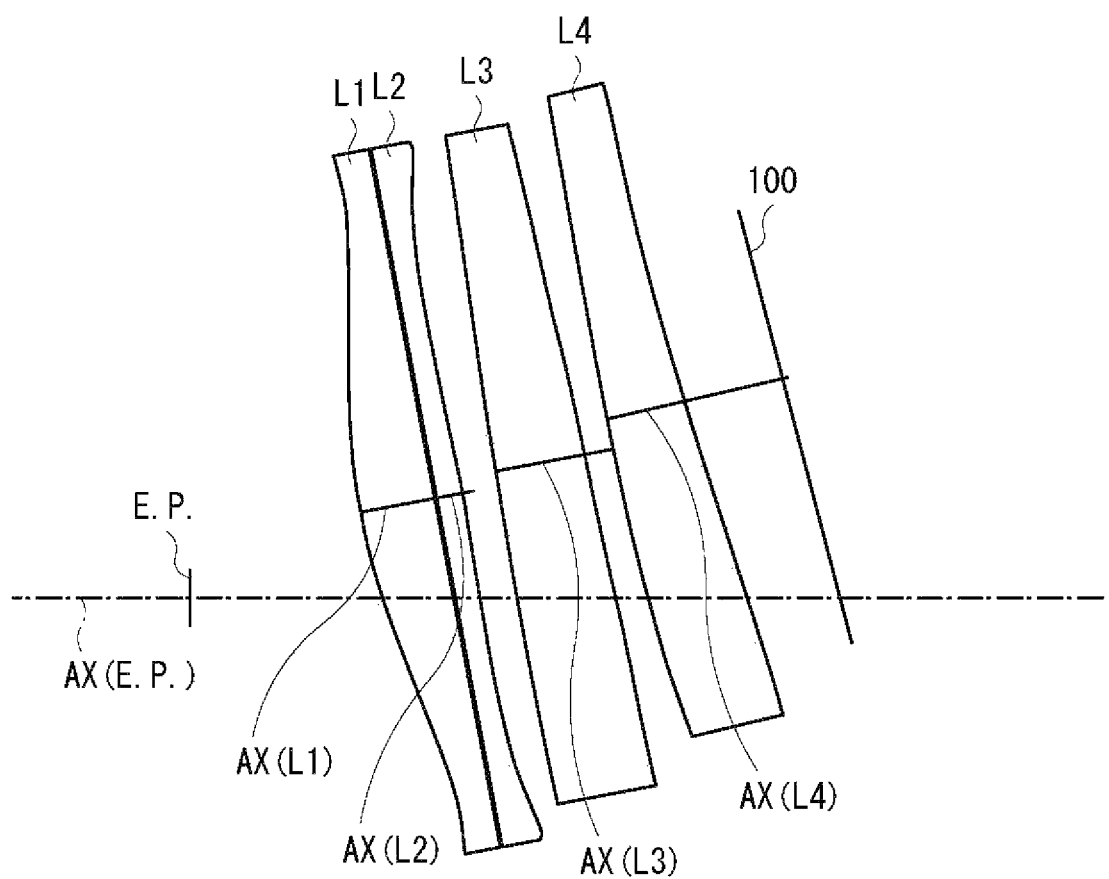

[ FIG. 83 ]
EXAMPLE 24
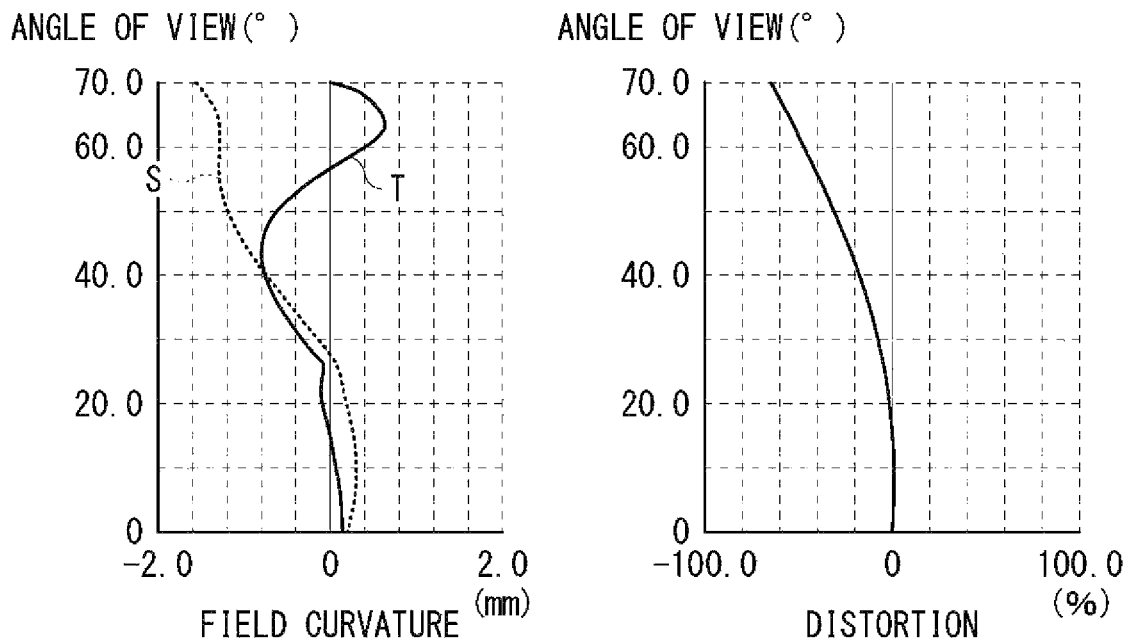
[ FIG. 84 ]
EXAMPLE 24
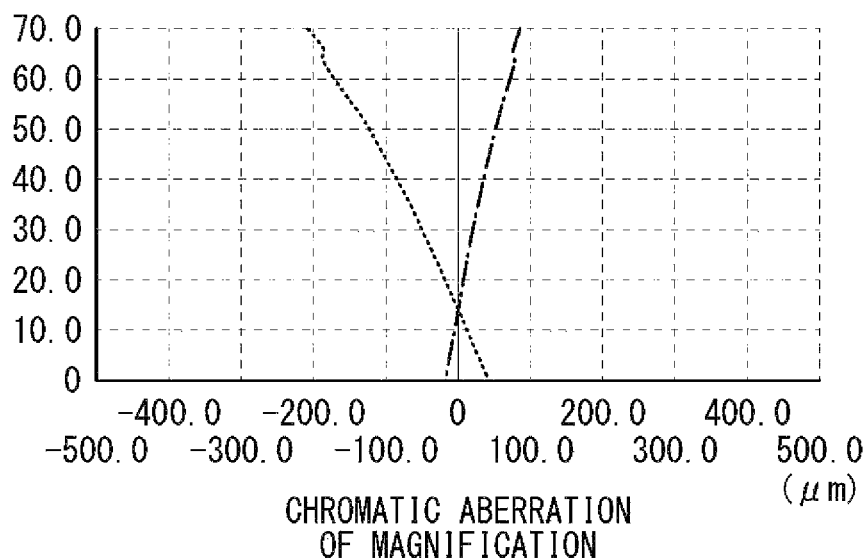

[ FIG. 85 ]
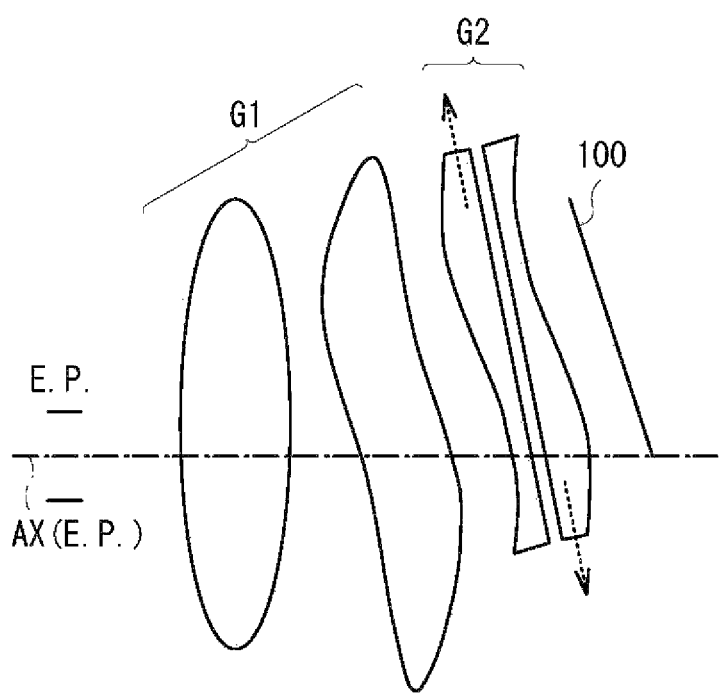

[FIG. 86]
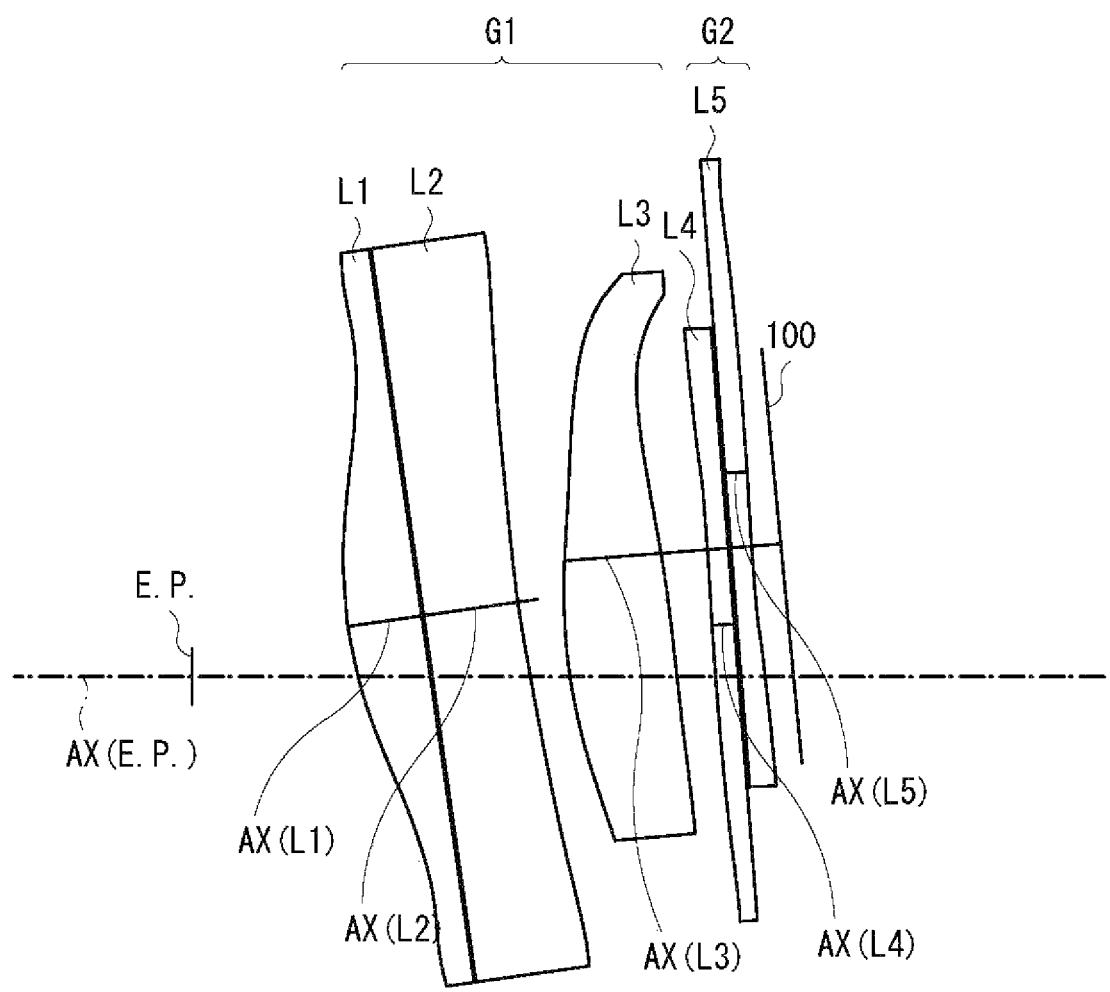

[ FIG. 87 ]
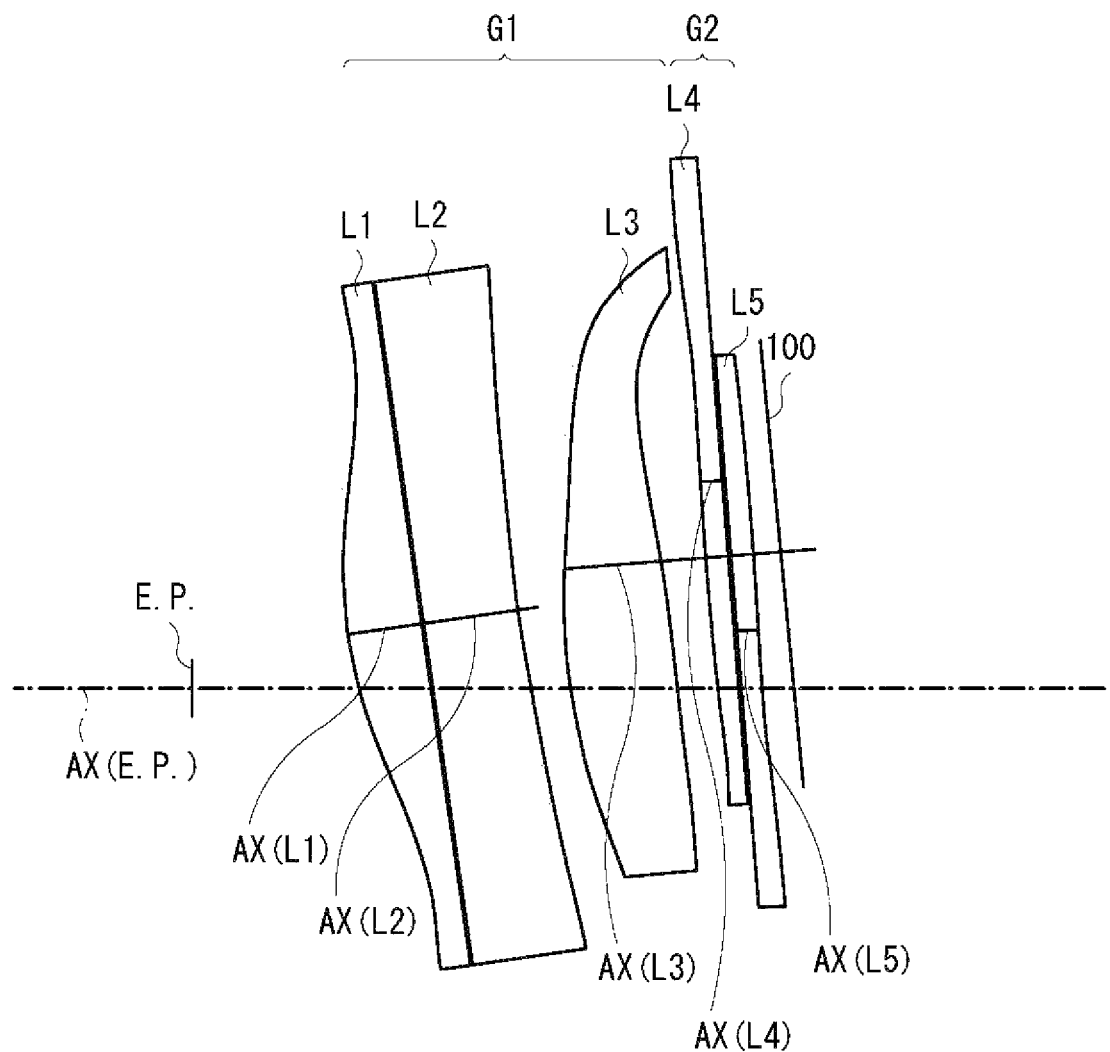

[ FIG. 88 ]
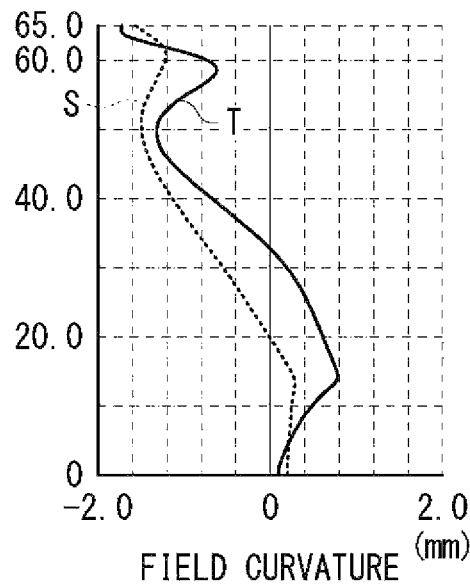
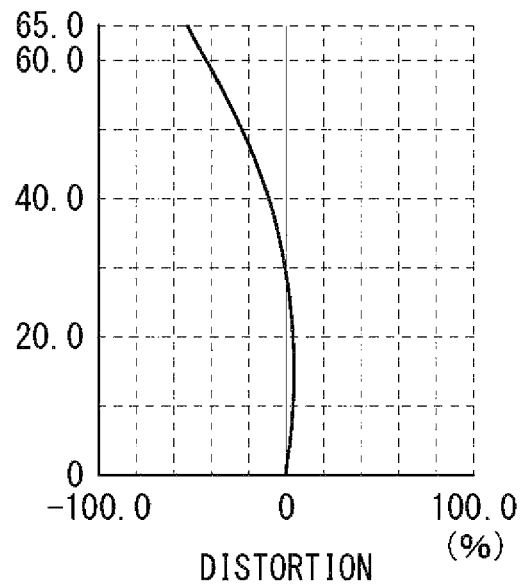
[ FIG. 89 ]
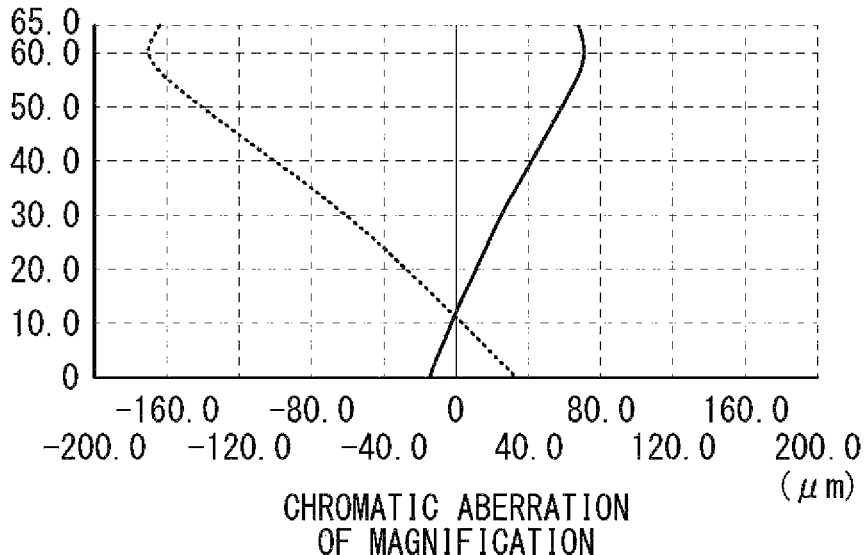

[ FIG. 90 ]
EXAMPLE 25 (VISUAL ACUITY 0.2)
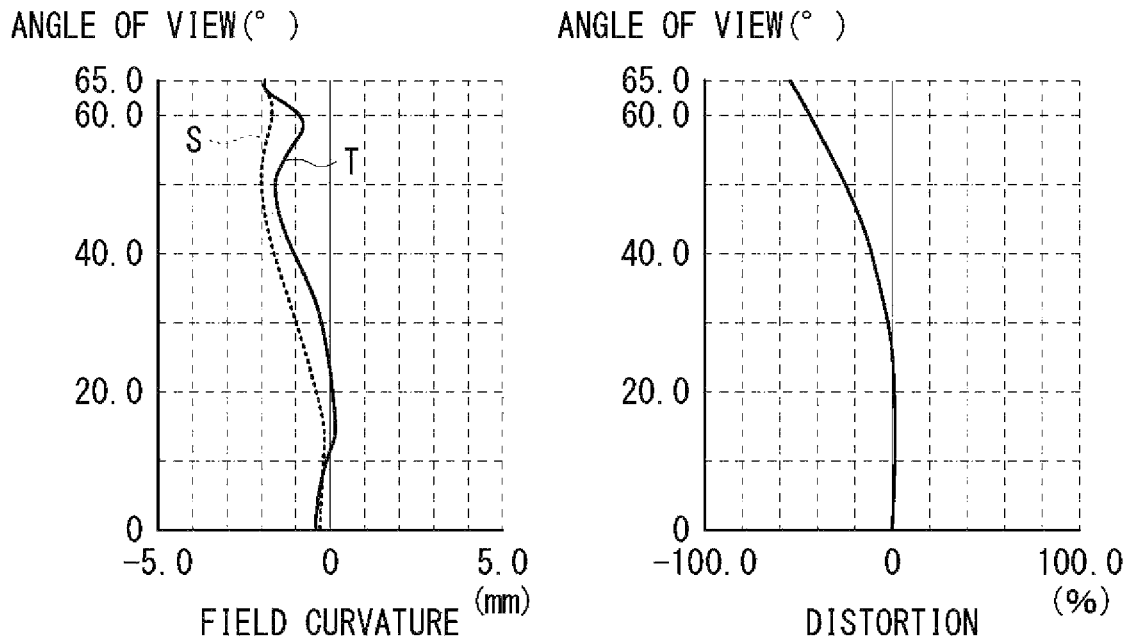
[ FIG. 91 ]
EXAMPLE 25 (VISUAL ACUITY 0.2)
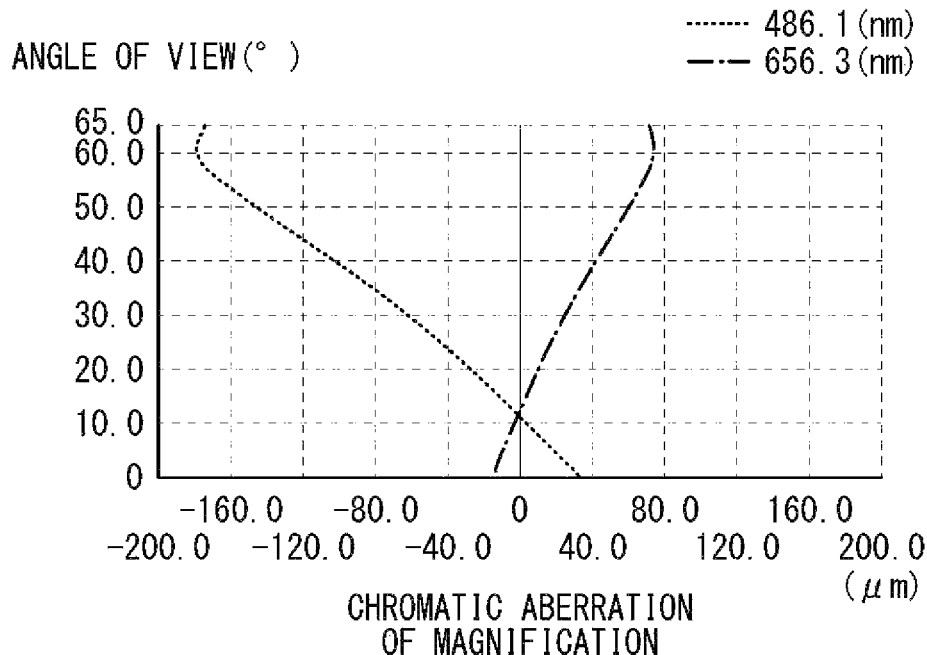

[ FIG. 92 ]
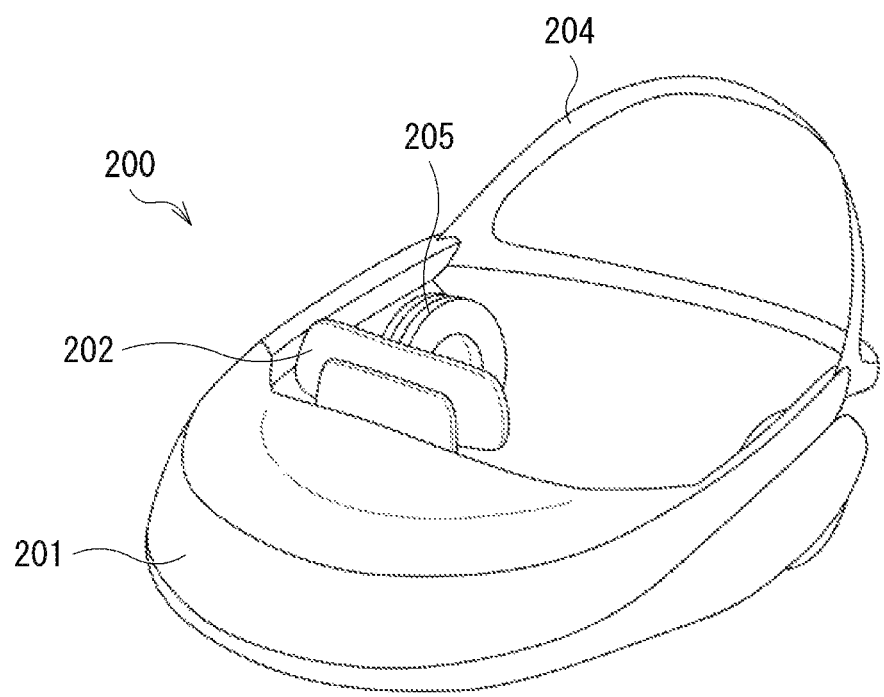
[ FIG. 93 ]
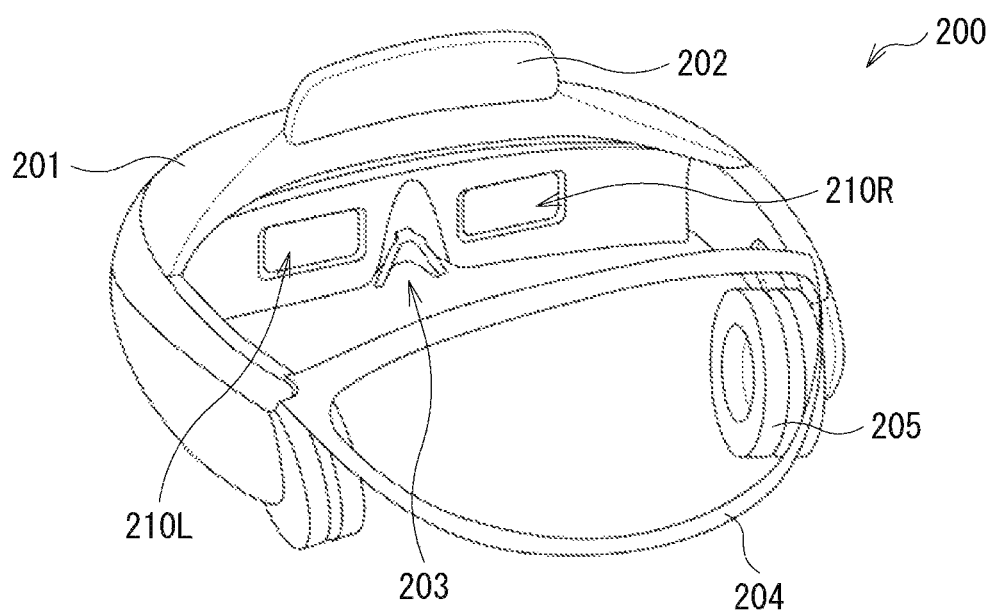

DISPLAY APPARATUS WITH NON-OVERLAP IMAGE REGION

TECHNICAL FIELD

The present disclosure relates to a display apparatus suitable for a head-mounted display, etc.

BACKGROUND ART

As a display apparatus using an image display device, an electronic viewfinder, an electronic binocular, a head-mounted display (HMD), etc. are known. In particular, the head-mounted display is used for a long period of time with a body of the display apparatus being worn in front of one's eyes. It is therefore required that an eyepiece optical system and the body of the display apparatus be small-sized and light-weighted. In addition, it is required that an image be observable at a wide field angle of view. In order to reduce a weight and a total length of the eyepiece optical system, there is a technique of using a Fresnel lens (see PTL 1).

CITATION LIST

Patent Literature

PTL 1: Japanese Unexamined Patent Application Publication No. H7-244246

SUMMARY OF THE INVENTION

In a case where the Fresnel lens is used for the eyepiece optical system, stray light is likely to be generated depending on a shape of a Fresnel lens surface, which may make it difficult to obtain sufficient optical effects in some occasions.

It is desirable to provide a display apparatus that makes it possible to achieve a lighter weight and a wider angle of view upon observation by both eyes without causing a concern about generation of stray light and to provide high-definition beauty of an image.

A display apparatus according to an embodiment of the present disclosure includes: a left eyepiece display unit including a left-eye image display device and a left eyepiece optical system that guides a left-eye display image displayed on the left-eye image display device to a left eye; and a right eyepiece display unit including a right-eye image display device and a right eyepiece optical system that guides a right-eye display image displayed on the right-eye image display device to a right eye, in which an image magnification upon observation by both eyes is twice or more, the left eyepiece optical system and the right eyepiece optical system each include a plurality of single lenses, at least one of the plurality of single lenses is a free-form surface lens including a resin material, at least one of the plurality of single lenses is arranged in at least one of an eccentric state or a rotated state with respect to an optical axis of the left-eye image display device or the right-eye image display device, and the left-eye display image and the right-eye display image each include an overlap image region including a mutually common image part, and a non-overlap image region including a mutually different image part and being a region outside the overlap image region.

In the display apparatus according to an embodiment of the present disclosure, the left eyepiece optical system and the right eyepiece optical system are each configured by the plurality of single lenses including the free-form surface lens that includes a resin material, thus optimizing the configuration of each of the lenses. This achieves a lighter weight without causing a concern about generation of stray light. In addition, at least one of the plurality of single lenses is arranged in at least one of the eccentric state or the rotated state with respect to the optical axis of the left-eye image display device or the right-eye image display device, and the non-overlap image region, which is a region outside the overlap image region, is included in each of the left-eye display image and the right-eye display image. This achieves a wider angle of view upon observation by both eyes.

BRIEF DESCRIPTION OF THE DRAWINGS

FIG. 1 is an explanatory diagram illustrating a first configuration example of an eyepiece display unit used in a head-mounted display, for example.

FIG. 2 is an explanatory diagram illustrating a second configuration example of the eyepiece display unit used in the head-mounted display, for example.

FIG. 3 is an explanatory diagram of image magnification.

FIG. 4 is a plan view of an overview of a display apparatus according to an embodiment of the present disclosure.

FIG. 5 is a side view of an overview of the display apparatus according to an embodiment.

FIG. 6 is an explanatory diagram illustrating an overview of an appearance of an image by a display apparatus according to a comparative example.

FIG. 7 is an explanatory diagram illustrating an overview of an appearance of an image according to the display apparatus according to an embodiment.

FIG. 8 is an explanatory diagram illustrating an overview of a left-eye display image and a right-eye display image by the display apparatus according to an embodiment.

FIG. 9 is an explanatory diagram schematically illustrating an observation virtual image to be observed by a single eye in the display apparatus according to an embodiment.

FIG. 10 is an explanatory diagram schematically illustrating an observation virtual image to be observed by both eyes in the display apparatus according to an embodiment.

FIG. 11 is an explanatory diagram schematically illustrating a relationship between magnitude of a field angle of view (FOV) as well as magnitude of an eye relief (E.R.) and a height of a light beam passing an outermost of a first surface of an eyepiece.

FIG. 12 is an explanatory diagram of an optical axis of an eyepiece according to each of embodiments.

FIG. 13 is a cross-sectional view of lenses of an eyepiece according to Example 1.

FIG. 14 is an aberration diagram illustrating field curvature and distortion of the eyepiece according to Example 1.

FIG. 15 is an aberration diagram illustrating chromatic aberration of magnification of the eyepiece according to Example 1.

FIG. 16 is a cross-sectional view of lenses of an eyepiece according to Example 2.

FIG. 17 is an aberration diagram illustrating field curvature and distortion of the eyepiece according to Example 2.

FIG. 18 is an aberration diagram illustrating chromatic aberration of magnification of the eyepiece according to Example 2.

FIG. 19 is a cross-sectional view of lenses of an eyepiece according to Example 3.

FIG. 20 is an aberration diagram illustrating field curvature and distortion of the eyepiece according to Example 3.

FIG. 21 is an aberration diagram illustrating chromatic aberration of magnification of the eyepiece according to Example 3.

FIG. 22 is a cross-sectional view of lenses of an eyepiece according to Example 4.

FIG. 23 is an aberration diagram illustrating field curvature and distortion of the eyepiece according to Example 4.

FIG. 24 is an aberration diagram illustrating chromatic aberration of magnification of the eyepiece according to Example 4.

FIG. 25 is a cross-sectional view of lenses of an eyepiece according to Example 5.

FIG. 26 is an aberration diagram illustrating field curvature and distortion of the eyepiece according to Example 5.

FIG. 27 is an aberration diagram illustrating chromatic aberration of magnification of the eyepiece according to Example 5.

FIG. 28 is a cross-sectional view of lenses of an eyepiece according to Example 6.

FIG. 29 is an aberration diagram illustrating field curvature and distortion of the eyepiece according to Example 6.

FIG. 30 is an aberration diagram illustrating chromatic aberration of magnification of the eyepiece according to Example 6.

FIG. 31 is a cross-sectional view of lenses of an eyepiece according to Example 7.

FIG. 32 is an aberration diagram illustrating field curvature and distortion of the eyepiece according to Example 7.

FIG. 33 is an aberration diagram illustrating chromatic aberration of magnification of the eyepiece according to Example 7.

FIG. 34 is a cross-sectional view of lenses of an eyepiece according to Example 8.

FIG. 35 is an aberration diagram illustrating field curvature and distortion of the eyepiece according to Example 8.

FIG. 36 is an aberration diagram illustrating chromatic aberration of magnification of the eyepiece according to Example 8.

FIG. 37 is a cross-sectional view of lenses of an eyepiece according to Example 9.

FIG. 38 is an aberration diagram illustrating field curvature and distortion of the eyepiece according to Example 9.

FIG. 39 is an aberration diagram illustrating chromatic aberration of magnification of the eyepiece according to Example 9.

FIG. 40 is a cross-sectional view of lenses of an eyepiece according to Example 10.

FIG. 41 is an aberration diagram illustrating field curvature and distortion of the eyepiece according to Example 10.

FIG. 42 is an aberration diagram illustrating chromatic aberration of magnification of the eyepiece according to Example 10.

FIG. 43 is a cross-sectional view of lenses of an eyepiece according to Example 11.

FIG. 44 is an aberration diagram illustrating field curvature and distortion of the eyepiece according to Example 11.

FIG. 45 is an aberration diagram illustrating chromatic aberration of magnification of the eyepiece according to Example 11.

FIG. 46 is a cross-sectional view of lenses of an eyepiece according to Example 12.

FIG. 47 is an aberration diagram illustrating field curvature and distortion of the eyepiece according to Example 12.

FIG. 48 is an aberration diagram illustrating chromatic aberration of magnification of the eyepiece according to Example 12.

FIG. 49 is a cross-sectional view of lenses of an eyepiece according to Example 13.

FIG. 50 is an aberration diagram illustrating field curvature and distortion of the eyepiece according to Example 13.

FIG. 51 is an aberration diagram illustrating chromatic aberration of magnification of the eyepiece according to Example 13.

FIG. 52 is a cross-sectional view of lenses of an eyepiece according to Example 14.

FIG. 53 is an aberration diagram illustrating field curvature and distortion of the eyepiece according to Example 14.

FIG. 54 is an aberration diagram illustrating chromatic aberration of magnification of the eyepiece according to Example 14.

FIG. 55 is a cross-sectional view of lenses of an eyepiece according to Example 15.

FIG. 56 is an aberration diagram illustrating field curvature and distortion of the eyepiece according to Example 15.

FIG. 57 is an aberration diagram illustrating chromatic aberration of magnification of the eyepiece according to Example 15.

FIG. 58 is a cross-sectional view of lenses of an eyepiece according to Example 16.

FIG. 59 is an aberration diagram illustrating field curvature and distortion of the eyepiece according to Example 16.

FIG. 60 is an aberration diagram illustrating chromatic aberration of magnification of the eyepiece according to Example 16.

FIG. 61 is a cross-sectional view of lenses of an eyepiece according to Example 17.

FIG. 62 is an aberration diagram illustrating field curvature and distortion of the eyepiece according to Example 17.

FIG. 63 is an aberration diagram illustrating chromatic aberration of magnification of the eyepiece according to Example 17.

FIG. 64 is a cross-sectional view of lenses of an eyepiece according to Example 18.

FIG. 65 is an aberration diagram illustrating field curvature and distortion of the eyepiece according to Example 18.

FIG. 66 is an aberration diagram illustrating chromatic aberration of magnification of the eyepiece according to Example 18.

FIG. 67 is a cross-sectional view of lenses of an eyepiece according to Example 19.

FIG. 68 is an aberration diagram illustrating field curvature and distortion of the eyepiece according to Example 19.

FIG. 69 is an aberration diagram illustrating chromatic aberration of magnification of the eyepiece according to Example 19.

FIG. 70 is a cross-sectional view of lenses of an eyepiece according to Example 20.

FIG. 71 is an aberration diagram illustrating field curvature and distortion of the eyepiece according to Example 20.

FIG. 72 is an aberration diagram illustrating chromatic aberration of magnification of the eyepiece according to Example 20.

FIG. 73 is a cross-sectional view of lenses of an eyepiece according to Example 21.

FIG. 74 is an aberration diagram illustrating field curvature and distortion of the eyepiece according to Example 21.

FIG. 75 is an aberration diagram illustrating chromatic aberration of magnification of the eyepiece according to Example 21.

FIG. 76 is a cross-sectional view of lenses of an eyepiece according to Example 22.

FIG. 77 is an aberration diagram illustrating field curvature and distortion of the eyepiece according to Example 22.

FIG. 78 is an aberration diagram illustrating chromatic aberration of magnification of the eyepiece according to Example 22.

FIG. 79 is a cross-sectional view of lenses of an eyepiece according to Example 23.

FIG. 80 is an aberration diagram illustrating field curvature and distortion of the eyepiece according to Example 23.

FIG. 81 is an aberration diagram illustrating chromatic aberration of magnification of the eyepiece according to Example 23.

FIG. 82 is a cross-sectional view of lenses of an eyepiece according to Example 24.

FIG. 83 is an aberration diagram illustrating field curvature and distortion of the eyepiece according to Example 24.

FIG. 84 is an aberration diagram illustrating chromatic aberration of magnification of the eyepiece according to Example 24.

FIG. 85 is a lens cross-sectional view of an overview of a third configuration example of an eyepiece according to an embodiment.

FIG. 86 is a cross-sectional view of lenses of an eyepiece according to Example 25 at a visual acuity of 1.0.

FIG. 87 is a cross-sectional view of lenses of the eyepiece according to Example 25 at a visual acuity of 0.2.

FIG. 88 is an aberration diagram illustrating field curvature and distortion of the eyepiece according to Example 25 at a visual acuity of 1.0.

FIG. 89 is an aberration diagram illustrating chromatic aberration of magnification of the eyepiece according to Example 25 at a visual acuity of 1.0.

FIG. 90 is an aberration diagram illustrating field curvature and distortion of the eyepiece according to Example 25 at a visual acuity of 0.2.

FIG. 91 is an aberration diagram illustrating chromatic aberration of magnification of the eyepiece according to Example 25 at a visual acuity of 0.2.

FIG. 92 is an external perspective view of a head-mounted display as an example of a display apparatus as viewed obliquely from the front.

FIG. 93 is an external perspective view of the head-mounted display as an example of the display apparatus as viewed obliquely from the rear.

MODES FOR CARRYING OUT THE INVENTION

Hereinafter, description is given in detail of embodiments of the present disclosure with reference to the drawings. It is to be noted that the description is given in the following order.
0. Comparative Example
1. Overview of Display Apparatus according to Embodiment
2. Configuration Example and Workings and Effects of Eyepiece Optical System (Eyepiece)
3. Example of Application to Head-Mounted Display
4. Numerical Examples of Eyepiece Optical System (Eyepiece)
5. Other Embodiments

0. Comparative Example

FIG. 1 illustrates a first configuration example of an eyepiece display unit 102 used in a head-mounted display, for example. FIG. 2 illustrates a second configuration example of the eyepiece display unit 102 used in the head-mounted display, for example.

The eyepiece display unit 102 includes an eyepiece optical system 101 and an image display device 100 in order from side of an eye point E.P. along an optical axis Z1.

The image display device 100 is, for example, a display panel such as an LCD (Liquid Crystal Display) or an organic EL display. The eyepiece optical system 101 is used to magnify and display an image displayed on the image display device 100. The eyepiece optical system 101 is configured by, for example, an eyepiece including a plurality of lenses. With use of the eyepiece optical system 101, an observer observes a virtual image Im that is displayed in a magnified manner. A sealing glass, etc. adapted to protect the image display device 100 may be disposed on a front surface of the image display device 100. The eye point E.P. corresponds to a position of a pupil of the observer and also serves as an aperture stop STO.

Here, FIG. 1 illustrates a configuration example in a case where a size of the image display device 100 is smaller than a diameter of the eyepiece optical system 101. FIG. 2 illustrates a configuration example in a case where the size of the image display device 100 is large than the diameter of the eyepiece optical system 101.

In a head-mounted display having a high viewing angle with a field angle of view over 70° and using the coaxial eyepiece optical system 101, the image display device 100 is often larger than the diameter of the eyepiece optical system 101. In such a head-mounted display, an image magnification My is suppressed to be small, but a focal length f becomes relatively long. This leads to a concern that the eyepiece optical system 101 has along total length. In addition, the size of the eyepiece optical system 101 is sometimes limited not by the size of the eyepiece optical system 101 but by the size of the image display device 100. This further leads to an issue of unsuitableness for reduction in size.

For example, as illustrated in FIG. 1, in a case where the size of the image display device 100 is small, the size of the entire eyepiece display unit 102 is limited by the size of the eyepiece optical system 101. In contrast, as illustrated in FIG. 2, in a case where the size of the image display device 100 is large, the size of the entire eyepiece display unit 102 is limited by the size of the image display device 100.

It is to be noted that the image magnification My is expressed by $Mv=\alpha'/\alpha$. As illustrated in the upper part of FIG. 3, α denotes a field angle of view in a case where the eyepiece optical system 101 is not provided. In addition, as illustrated in a lower part of FIG. 3, α' denotes a field angle of view (field angle of view with respect to the virtual image Im) in a case where the eyepiece optical system 101 is provided. In FIG. 3, h is a maximum image height of an image to be observed, and is, for example, a maximum image height of an image displayed on the image display device 100. For example, in a case where the image display device 100 has a rectangular shape, h is a half value of a diagonal size of the image display device 100. f denotes a focal length of the eyepiece optical system 101.

In addition, the image magnification My is expressed by the following expression (A):

$$Mv=\omega'/(\tan^{-1}(h/L)) \quad (A)$$

where
ω' is a half value (rad) of a maximum field angle of view,
h is a maximum image height, and
L is a total length (a distance from the eye point E.P. to an image).

It is to be noted that the image refers to an image displayed on the image display device 100, for example. For example, in the case where the image display device 100 has the rectangular shape, h is the half value of the diagonal size of the image display device 100, as described above. L corresponds to the total length of the eyepiece optical system 101 described above (a distance from the eye point E.P. to a display surface of the image display device 100), for example.

In the head-mounted display having a high viewing angle with a field angle of view over 70°, using the image display device 100 having a small size relative to the diameter of the eyepiece optical system 101 as illustrated in the configuration example in FIG. 1 enables reduction in the total length and size of the eyepiece optical system 101 as compared with the case of using the image display device 100 having a large size. This is believed to contribute advantageously to reduction in size of the head-mounted display. However, in a case of attempting to achieve such a head-mounted display without using a reflective device, there is an issue of difficulty in increasing the image magnification My when attempting to increase an image-forming capability.

To address the above-described issue, PTL 1 (Japanese Unexamined Patent Application Publication No. H7-244246) has attempted to solve the issue by an eyepiece optical system using a Fresnel lens. In the eyepiece optical system described in PTL 1, use of a meniscus-shaped Fresnel lens achieves both a high imaging-forming capability and a high image magnification Mv. However, the Fresnel lens generates stray light depending on the shape of a Fresnel lens surface, thus causing a concern about generation of a sense of discomfort when observing an image through the eyepiece optical system.

It is therefore desired to develop a display apparatus suitable for the head-mounted display, etc. that makes it possible to achieve a lighter weight and a wider angle of view upon observation by both eyes without causing a concern about generation of stray light and to provide high-definition beauty of an image.

1. Overview of Display Apparatus According to Embodiment

A display apparatus according to an embodiment of the present disclosure is applicable to the head-mounted display, for example.

FIGS. 4 and 5 each illustrate an overview of a display apparatus 1 according to an embodiment of the present disclosure. FIG. 4 illustrates a configuration of the display apparatus 1 in an x-z plane. FIG. 5 illustrates a configuration of the display apparatus 1 as viewed from a side surface (y-z plane). FIG. 6 illustrates an overview of an appearance of an image by a display apparatus according to a comparative example. FIG. 7 illustrates an overview of an appearance of an image by the display apparatus 1. FIG. 8 illustrates an overview of a left-eye display image 10L and a right-eye display image 10R by the display apparatus 1.

As illustrated in FIGS. 4 and 5, the display apparatus 1 includes a left eyepiece display unit 102L and a right eyepiece display unit 102R arranged side by side at positions corresponding to locations of both eyes. The display apparatus 1 is configured to allow the image magnification My to be twice or more upon observation by both eyes.

The left eyepiece display unit 102L includes a left-eye image display device 100L and a left eyepiece optical system 101L that guides the left-eye display image 10L displayed on the left-eye image display device 100L to a left eye 2L.

The right eyepiece display unit 102R includes a right-eye image display device 100R and a right eyepiece optical system 101R that guides the right-eye display image 10R displayed on the right-eye image display device 100R to a right eye 2R.

Each of the left eyepiece optical system 101L and the right eyepiece optical system 101R is configured by an eyepiece including a plurality of single lenses.

In the left eyepiece optical system 101L and the right eyepiece optical system 101R, at least one of the plurality of single lenses is a free-form surface lens including a resin material. Employing a resin material for at least one of the plurality of single lenses makes it possible to reduce weights of the left eyepiece optical system 101L and the right eyepiece optical system 101R. In addition, employing the free-form surface lens for at least one of the plurality of single lenses makes it possible to suppress generation of aberration.

In the left eyepiece optical system 101L and the right eyepiece optical system 101R, at least one of the plurality of single lenses is arranged in at least one of an eccentric state or a rotated state with respect to an optical axis of the left-eye image display device 100L or the right-eye image display device 100R. Arranging the lens in such a state makes it possible to suppress aberration and to achieve a light-weighted optical system with a wide angle of view.

Each of the left-eye image display device 100L and the right-eye image display device 100R is configured by, for example, a flat-type small display panel such as an LCD and an organic EL display.

Here, as illustrated in the comparative example in FIG. 6, in the normal display apparatus such as a head-mounted display, the identical image is displayed in the left-eye image display device 100L and the right-eye image display device 100R, and the identical image is observed in the left eye 2L and the right eye 2R, as illustrated in the upper part of FIG. 6. As a result, as illustrated in the lower part of FIG. 6, when viewed by both eyes, an image is observed at the identical angle of view as the field angle of view in a single eye.

In contrast, in the display apparatus 1 according to the present disclosure, as illustrated in FIG. 7, images partially different from each other are displayed in the left-eye image display device 100L and the right-eye image display device 100R, and images partially different from each other are observed in the left eye 2L and the right eye 2R, as illustrated in the upper part of FIG. 7. As a result, as illustrated in the lower part of FIG. 7, when viewed by both eyes, an image is observed in a wider angle of view than the field angle of view by a single eye.

As illustrated in FIG. 8, each of the left-eye display image 10L and the right-eye display image 10R includes an overlap image region 11 and a non-overlap image region 12. The overlap image region 11 is an image region including an image part mutually common to the left-eye display image 10L and the right-eye display image 10R.

The non-overlap image region 12 is an image region including an image part mutually different between the left-eye display image 10L and the right-eye display image 10R; the non-overlap image region 12 is a region outside the overlap image region 11 in each of the left-eye display image 10L and the right-eye display image 10R. For example, as illustrated in FIG. 8, in the left-eye display image 10L, the non-overlap image region 12 constitutes a region on outer left side of the overlap image region 11. In addition, in the right-eye display image 10R, the non-overlap image region 12 constitutes a region on outer right side of the overlap image region 11. It is to be noted that a front gaze point C0L of the observer in the left-eye display image 10L and a front gaze point C0R of the observer in the right-eye display image 10R are within the overlap image region 11.

As described above, providing the overlap image region 11 and the non-overlap image region 12 in the left-eye display image 10L and the right-eye display image 10R allows for prospects of a wider angle of view upon observation by both eyes as compared with the case where the left-eye display image 10L and the right-eye display image 10R are configured only by an overlapped region.

(Concerning Field Angle of View (FOV))

FIG. 9 schematically illustrates an observations virtual image (a left-eye observation virtual image ImL or a right-eye observation virtual image ImR) to be observed by a single eye in the display apparatus 1. FIG. 10 schematically illustrates an observations virtual image (a both-eye observation virtual image ImLR) to be observed by both eyes in the display apparatus 1.

As illustrated in FIG. 9, upon observation by a single eye, the maximum angle of view of one side (left side or right side) with reference to the front gaze point (C0L, C0R) is defined as θa, and the maximum angle of view of the other side (right side or left side) is defined as θb (θa>θb). θb corresponds to the maximum angle of view of the overlap image region 11. As for the maximum angle of view upon observation by both eyes, the maximum angle of view is θa on both the left side and the right side with reference to the front gaze point C0, and thus the maximum angle of view is wider than that upon observation by a single eye.

2. Configuration Example and Workings and Effects of Eyepiece Optical System (Eyepiece)

Next, description is given of first to third configuration examples of the eyepiece that configures the left eyepiece optical system 101L and the right eyepiece optical system 101R in the display apparatus 1.

First Configuration Example

The configuration of the eyepiece according to the first configuration example corresponds to configurations of eyepieces (FIG. 13, etc.) according to Examples 1 to 11 described later. Each of the left eyepiece optical system 101L and the right eyepiece optical system 101R may be configured by an eyepiece of a three-group three-lens configuration in which a first lens L1, a second lens L2, and a third lens L3 are arranged as the plurality of single lenses in order from side of the eye point E.P. toward image side (side of the left-eye image display device 100L or side of the right-eye image display device 100R), as in the eyepieces (FIG. 13, etc.) according to Examples 1 to 11 described later.

In the above-described eyepiece (eyepiece according to the first configuration example) of the three-group three-lens configuration, the first lens L1 is preferably a spherical lens having a positive refractive power including a material of a refractive index of 1.439 or more with respect to ad-line. In addition, a lens surface of the first lens L1 on the side of the eye point E.P. preferably has a convex shape or a planar shape. Causing the first lens L1 to have a positive refractive power and the lens surface on the side of the eye point E.P. to have a convex shape or a planar shape makes it possible to suppress the maximal height of a marginal light beam. This allows for prospects of a reduction in capacitance of the optical system of each of the left eyepiece optical system 101L and the right eyepiece optical system 101R as well as a reduction in weight. In addition, using a spherical lens as the first lens L1 makes it possible to suppress manufacturing costs as compared with the case of using an aspherical lens or a free-form surface lens.

In the eyepiece according to the first configuration example, an optical axis AX (L1) of the first lens L1 is preferably parallel to a reference optical axis AX (E.P.), which employs the eye point E.P. as a reference (see FIGS. 12 and 13, etc. described later). This enables the capacitance of the optical system of each of the left eyepiece optical system 101L and the right eyepiece optical system 101R to be suppressed the most for the same eye relief.

In addition, in the eyepiece according to the first configuration example, at least one of the second lens L2 or the third lens L3 is preferably a free-form surface lens. Using the free-form surface lens makes it possible to favorably correct aberration to be generated.

In addition, in the eyepiece according to the first configuration example, at least one of the first lens L1, the second lens L2, and the third lens L3 is preferably arranged in at least one of an eccentric state or a rotated state with respect to the reference optical axis AX (E.P.), which employs the eye point E.P. as a reference (see FIGS. 12 and 13, etc. described later). In this case, the eyepiece according to the first configuration example preferably satisfies the following conditions.

$$Si,\max<25 \text{ (mm)} \tag{1}$$

$$\theta i,\max<25(°) \tag{2}$$

Here, in the eyepiece according to the first configuration example, si,max denotes the maximum absolute value of an eccentric amount of each of respective optical axes AX (L1), (L2), and (L3) of the first lens L1, the second lens L2, and the third lens L3 with respect to the reference optical axis AX (E.P.) in a direction orthogonal to the reference optical axis AX (E.P.). In addition, in the eyepiece according to the first configuration example, θi,max denotes the maximum absolute value of a rotational amount of each of the respective optical axes AX (L1), (L2), and (L3) of the first lens L1, the second lens L2, and the third lens L3 with respect to the reference optical axis AX (E.P.).

In the eyepiece according to the first configuration example, in a case where there is a lens element in which an eccentric amount and a rotational amount exceed values of the conditional expressions (1) and (2), respectively, the eccentric amount and the rotational amount become too large, thereby increasing a volume of the optical system of each of the left eyepiece optical system 101L and the right eyepiece optical system 101R. This may possibly prevent reduction in size of the entire display apparatus 1, which is not preferable.

Modification Example of First Configuration Example

In contrast to the configuration of the eyepiece according to the first configuration example described above, the optical axis AX (L1) of the first lens L1 may also be configured to be non-parallel, instead of parallel, to the reference optical axis AX (E.P.), which employs the eye point E.P. as a reference, as in a configuration of an eyepiece (FIG. 79) according to Example 23 described later.

In addition, in contrast to the configuration of the eyepiece according to the first configuration example described above, the first lens L1 may also be configured to use a Fresnel lens, instead of a spherical lens, as in the configuration of the eyepiece (FIG. 79) according to Example 23 described later. For example, a lens surface of the first lens L1 on the image side (side opposite to the eye point E.P.) is preferably a Fresnel lens surface.

Using a Fresnel lens as the first lens L1 makes it possible to achieve higher magnification of each of the left eyepiece optical system 101L and the right eyepiece optical system 101R while suppressing increase in the weight of the entire optical system. In addition, it is possible to arrange the first lens L1 to have an optimum eccentric amount and an optimum rotational amount with respect to the FOV described above, thus making it possible to suppress increase in an aperture of the first lens L1. [Second Configuration Example]

A configuration of the eyepiece according to the second configuration example corresponds to configurations of the eyepiece (FIG. 46, etc.) according to Examples 12 to 22 described later. Each of the left eyepiece optical system 101L and the right eyepiece optical system 101R may be configured by an eyepiece of a four-group four-lens configuration in which the first lens L1, the second lens L2, the third lens L3, and a fourth lens L4 are arranged as a plurality of single lenses in order from the side of the eye point E.P. toward the image side (side of the left-eye image display device 100L or side of the right-eye image display device 100R), as in the eyepiece (FIG. 46, etc.) according to Examples 12 to 22 described later.

In the above-described eyepiece (eyepiece according to the second configuration example) of the four-group four-lens configuration, the first lens L1 is preferably a spherical lens having a positive refractive power including a material of a refractive index of 1.439 or more with respect to a d-line. In addition, the lens surface of the first lens L1 on the side of the eye point E.P. preferably has a convex shape or a planar shape. Causing the first lens L1 to have a positive refractive power and the lens surface on the side of the eye point E.P. to have a convex shape or a planar shape makes it possible to suppress the maximal height of a marginal light beam. This allows for prospects of a reduction in capacitance of the optical system of each of the left eyepiece optical system 101L and the right eyepiece optical system 101R as well as a reduction in weight. In addition, using a spherical lens as the first lens L1 makes it possible to suppress manufacturing costs as compared with the case of using an aspherical lens or a free-form surface lens.

In the eyepiece according to the second configuration example, the optical axis AX (L1) of the first lens L1 is preferably parallel to the reference optical axis AX (E.P.), which employs the eye point E.P. as a reference (see FIGS. 12 and 46, etc. described later). This enables the capacitance of the optical system of each of the left eyepiece optical system 101L and the right eyepiece optical system 101R to be suppressed the most for the same eye relief.

In addition, in the eyepiece according to the second configuration example, at least one of the second lens L2, the third lens L3, or the fourth lens L4 is preferably a free-form surface lens. Using the free-form surface lens makes it possible to favorably correct aberration to be generated.

In addition, in the eyepiece according to the second configuration example, at least one of the second lens L2, the third lens L3, or the fourth lens L4 is preferably arranged in at least one of an eccentric state or a rotated state with respect to the reference optical axis AX (E.P.), which employs the eye point E.P. as a reference (see FIGS. 12 and 46, etc. described later). In this case, the eyepiece according to the second configuration example preferably satisfies the following conditions.

$$Si,\max<25 \text{ (mm)} \tag{1}$$

$$\theta i,\max<25(°) \tag{2}$$

Here, in the eyepiece according to the second configuration example, $si,\max$ denotes the maximum absolute value of an eccentric amount of each of respective optical axes AX (L1), (L2), (L3), and (L4) of the second lens L2, the third lens L3, and the fourth lens L4 with respect to the reference optical axis AX (E.P.) in a direction orthogonal to the reference optical axis AX (E.P.). In addition, in the eyepiece according to the second configuration example, $\theta i,\max$ denotes the maximum absolute value of a rotational amount of each of the respective optical axes AX (L1), (L2), (L3), and (L4) of the second lens L2, the third lens L3, and the fourth lens L4 with respect to the reference optical axis AX (E.P.).

In the eyepiece according to the second configuration example, in a case where there is a lens element in which an eccentric amount and a rotational amount exceed values of the conditional expressions (1) and (2), respectively, the eccentric amount and the rotational amount become too large, thereby increasing a volume of the optical system of each of the left eyepiece optical system 101L and the right eyepiece optical system 101R. This may possibly prevent reduction in size of the entire display apparatus 1, which is not preferable.

Modification Example of Second Configuration Example

In contrast to the configuration of the eyepiece according to the second configuration example described above, the optical axis AX (L1) of the first lens L1 may also be configured to be non-parallel, instead of parallel, to the reference optical axis AX (E.P.), which employs the eye point E.P. as a reference, as in a configuration of an eyepiece (FIG. 82) according to Example 24 described later.

In addition, in contrast to the configuration of the eyepiece according to the second configuration example described above, the first lens L1 may also be configured to use a Fresnel lens, instead of a spherical lens, as in the configuration of the eyepiece (FIG. 82) according to Example 24 described later. For example, a lens surface of the first lens L1 on the image side (side opposite to the eye point E.P.) is preferably a Fresnel lens surface.

Using a Fresnel lens as the first lens L1 makes it possible to achieve higher magnification of each of the left eyepiece optical system 101L and the right eyepiece optical system 101R while suppressing increase in the weight of the entire optical system. In addition, it is possible to arrange the first lens L1 to have an optimum eccentric amount and an optimum rotational amount with respect to the FOV described above, thus making it possible to suppress increase in the aperture of the first lens L1. [Third Configuration Example]

FIG. 85 illustrates an overview of a third configuration example of an eyepiece according to an embodiment. The configuration of the eyepiece according to the third configuration example corresponds to configurations of eyepieces (FIGS. 86 and 87) according to Example 25 described later.

In contrast to the configurations of the eyepieces according to the first and second configuration examples described above, a configuration including a varifocal lens group may be employed. For example, as in the eyepiece according to the third configuration example illustrated in FIG. 85, a configuration may be employed which includes an eccentric lens group G1 and a varifocal lens group G2 in order from the side of the eye point E.P. toward the image side. Each of the eccentric lens group G1 and the varifocal lens group G2 is configured by a plurality of single lenses, for example.

The varifocal lens group G2 may be configured by an Alvarez lens, for example. The Alvarez lens is able to change a focal length by moving two lenses mutually in a direction different from an optical axis.

The varifocal lens group G2 is preferably arranged in eccentric and rotated states with respect to the reference optical axis AX (E.P.), which employs the eye point E.P. as a reference. In a case where the varifocal lens group G2 is configured by the Alvarez lens, for example, the two lenses are moved mutually in directions opposite to each other and in directions different from the reference optical axis AX (E.P.), which employs the eye point E.P. as a reference, thereby making it possible to change the focal length.

The eyepiece according to the third configuration example is configured to include the varifocal lens group G2, thereby enabling adjustment of visibility. This makes it possible to provide an image corresponding to a user having a wide range of visual acuity (e.g., 0.1 or more). In addition, it becomes unnecessary to ensure an eye relief (e.g., 15 mm) which assumes a user of glasses. For this reason, higher FOV, higher definition, and reduced weight of the optical system are expected as ripple effects as a result of shorter eye relief.

Effects of Invention

According to the display apparatus of an embodiment of the present disclosure, the configuration of the lenses is optimized that configure the left eyepiece optical system 101L and the right eyepiece optical system 101R, and the non-overlap image region 12 is included in the left-eye display image 10L and the right-eye display image 10R. This makes it possible to achieve a lighter weight and a wider angle of view upon observation by both eyes without causing a concern about generation of stray light and to provide high-definition beauty of an image.

In particular, each of the left eyepiece optical system 101L and the right eyepiece optical system 101R is configured by the plurality of single lenses including a free-form surface lens including a resin material to optimize the configuration of each lens, thereby achieving a lighter weight without causing the concern about the generation of stray light. In addition, use of the resin material makes it possible to suppress material costs and manufacturing costs. In addition, at least one of the plurality of single lenses is arranged in at least one of an eccentric state or a rotated state with respect to the optical axis of the left-eye image display device 100L or the right-eye image display device 100R, and the non-overlap image region 12, which constitutes a region outside the overlap image region 11, is included in each of the left-eye display image 10L and the right-eye display image 10R. This makes it possible to achieve a wider angle of view upon observation by both eyes.

Applying the display apparatus according to an embodiment to a head-mounted display makes it possible to provide high-definition beauty of an image at a high viewing angle. In a head-mounted display having a high viewing angle, a pupil position shifts when observing a peripheral region of an image (hereinafter, referred to as "eye shift"). At this time, it is difficult to secure desired optical characteristics for an amount of the eye shift assumed in the head-mounted display. According to the display apparatus of an embodiment, configuring the left eyepiece optical system 101L and the right eyepiece optical system 101R as described above makes it possible to achieve an optical system that is robust against the eye shift.

It is to be noted that the effects described herein are merely illustrative and non-limiting, and may have other effects.

3. Example of Application to Head-Mounted Display

FIGS. 92 and 93 illustrate a configuration example of a head-mounted display 200 to which the display apparatus 1 according to an embodiment of the present disclosure is applied. The head-mounted display 200 includes a body 201, a forehead rest 202, a nose rest 203, a headband 204, and headphones 205. The forehead rest 202 is provided at an upper-middle part of the body 201. The nose rest 203 is provided at a lower-middle part of the body 201.

When the user wears the head-mounted display 200 on the head, the forehead rest 202 abuts the forehead of the user, and the nose rest 203 abuts the nose. Further, the headband 204 abuts the rear of the head. As a result, the head-mounted display 200 distributes a load of the apparatus over the entire head. This makes it possible for the user to wear the head-mounted display 200 with a less burden on the user.

The headphones 205 are provided for the left ear and the right ear. This makes it possible to provide sounds to the left ear and the right ear independently.

The body 201 is provided with a circuit board, an optical system, etc. that are built in the body 201 and are adapted to display an image. As illustrated in FIG. 93, a left-eye display part 210L and a right-eye display part 210R are provided in the body 201. This makes it possible to provide images to the left eye and the right eye independently. The left-eye display part 210L is provided with a left eyepiece display unit including an image display device for the left eye and an eyepiece optical system for the left eye that magnifies an image displayed on the image display device for the left eye. The right-eye display part 210R is provided with a right eyepiece display unit including an image display device for the right eye and an eyepiece optical system for the right eye that magnifies an image displayed on the image display device for the right eye. The left eyepiece display unit 102L and the right eyepiece display unit 102R in the display apparatus 1 according to an embodiment of the present disclosure are applicable as the left eyepiece display unit configuring the left-eye display part 210L and the right eyepiece display unit configuring the right-eye display part 210R.

It is to be noted that image data is supplied to the image display device from an unillustrated image reproducing apparatus. It is also possible to perform three-dimensional display by supplying three-dimensional image data from the image reproducing apparatus and displaying images having parallaxes with respect to each other by means of the left-eye display part 210L and the right-eye display part 210R.

EXAMPLES

Overview of Examples

FIG. 11 schematically illustrates a relationship between magnitude of a field angle of view (FOV) as well as magnitude of an eye relief E.R. and a height of a light beam (marginal light beam) passing an outermost of a first surface of an eyepiece.

As illustrated in FIG. 11, increasing the field angle of view and the eye relief E.R. causes the height of the marginal light beam at the first surface of the eyepiece to increase. In a case of considering that the marginal light beam is caused to form an image on an equally-sized image display device, the light beam needs to be bent greater, as the height of the light beam increases. Accordingly, the amount of generation of aberration increases, thus causing the imaging-forming capability to be lowered. In this manner, the magnitude of each of the field angle of view and the eye relief E.R. is in a trade-off relationship with the imaging-forming capability.

In consideration of such characteristics, the following examples illustrate design examples of specifications in which the magnitudes of the field angle of view and the eye relief E.R. are changed as illustrated in Tables 1 and 2. Here, Examples 1 to 11 and 23 correspond to the eyepiece (eyepiece of three-group three-lens configuration) of the foregoing first configuration example and modification example thereof. Examples 12 to 22 and 24 correspond to the eyepiece (eyepiece of four-group four-lens configuration) of the foregoing second configuration example and modification example thereof. Example 25 corresponds to the eyepiece (eyepiece of the configuration including the varifocal lens group G2) of the foregoing third configuration example. As illustrated in Tables 1 and 2, in each of the eyepiece of the three-group three-lens configuration and the eyepiece of the four-group four-lens configuration, the lens surface of the first lens L1 on the side of the eye point E.P. exhibits examples of a convex shape and examples of a planar shape. In addition, as illustrated in Tables 1 and 2, design examples are exhibited in which the number of the free-form surface lenses is changed in each of the eyepiece of the three-group three-lens configuration and the eyepiece of the four-group four-lens configuration.

It is to be noted that, as illustrated in the above-mentioned FIG. 9, as for the field angle of view, the maximum angle of view of one side (left side or right side), upon observation by a single eye, with reference to the front gaze point (C0L, C0R) is defined as θa, and the maximum angle of view of the other side (right side or left side) is defined as θb (θa>θb). θb corresponds to the maximum angle of view of the overlap image region 11. As for the maximum angle of view upon observation by both eyes, the maximum angle of view is θa on both the left side and the right side with reference to the front gaze point C0, as illustrated in the above-mentioned FIG. 10.

TABLE 1

|  | Example 1 | Example 2 | Example 3 | Example 4 | Example 5 | Example 6 |
|---|---|---|---|---|---|---|
| Lens Configuration | 3-Group 3-Lens | 3-Group 3-Lens | 3-Grow 3-Lens | 3-Grow 3-Lens | 3-Grow 3-Lens | 3-Grow 3-Lens |
| FOV θa [degree] | 55.0 | 55.0 | 55.0 | 57.5 | 57.5 | 57.5 |
| θb [degree] | 40 | 40 | 40 | 40 | 40 | 40 |
| Eye Relief E.R. [mm] | 11 | 13 | 15 | 11 | 13 | 15 |
| Shape of L1 on E.P. Side | Convex | Convex | Convex | Convex | Convex | Convex |
| Number of Free-Form Surface Lens | 1 | 1 | 1 | 1 | 1 | 1 |

TABLE 1-continued

|  | Example 7 | Example 8 | Example 9 | Example 10 | Example 11 | Example 23 |
|---|---|---|---|---|---|---|
| Lens Configuration | 3-Group 3-Lens | 3-Group 3-Lens | 3-Grow 3-Lens | 3-Grow 3-Lens | 3-Grow 3-Lens | 3-Grow 3-Lens |
| FOV θa [degree] | 60.0 | 60.0 | 60.0 | 55.0 | 55.0 | 70.0 |
| θb [degree] | 40 | 40 | 40 | 40 | 40 | 40 |
| Eye Relief E.R. [mm] | 11 | 13 | 15 | 11 | 11 | 10 |
| Shape of L1 on E.P. Side | Convex | Convex | Convex | Flat | Convex | Convex |
| Number of Free-Form Surface Lens | 1 | 1 | 1 | 1 | 2 | 1 |

TABLE 2

|  | Example 12 | Example 13 | Example 14 | Example 15 | Example 16 | Example 17 |
|---|---|---|---|---|---|---|
| Lens Configuration | 4-Group 4-Lens | 4-Group 4-Lens | 4-Grow 4-Lens | 4-Grow 4-Lens | 4-Grow 4-Lens | 4-Grow 4-Lens |
| FOV θa [degree] | 55.0 | 55.0 | 55.0 | 57.5 | 57.5 | 57.5 |
| θb [degree] | 40 | 40 | 40 | 40 | 40 | 40 |
| Eye Relief E.R. [mm] | 11 | 13 | 15 | 11 | 13 | 15 |
| Shape of L1 on E.P. Side | Convex | Convex | Convex | Convex | Convex | Convex |
| Number of Free-Form Surface Lens | 1 | 1 | 1 | 1 | 1 | 1 |

|  | Example 18 | Example 19 | Example 20 | Example 21 | Example 22 | Example 24 |
|---|---|---|---|---|---|---|
| Lens Configuration | 4-Group 4-Lens | 4-Group 4-Lens | 4-Grow 4-Lens | 4-Grow 4-Lens | 4-Grow 4-Lens | 4-Grow 4-Lens |
| FOV θa [degree] | 60.0 | 60.0 | 60.0 | 55.0 | 55.0 | 70.0 |
| θb [degree] | 40 | 40 | 40 | 40 | 40 | 40 |
| Eye Relief E.R. [min] | 11 | 13 | 15 | 11 | 11 | 10 |
| Shape of L1 on E.P. Side | Convex | Convex | Convex | Flat | Convex | Convex |
| Number of Free-Form Surface Lens | 1 | 1 | 1 | 1 | 3 | 2 |

|  | Example 25 |
|---|---|
| Lens Configuration | 5-Group 5-Lens |
| FOV θa [degree] | 65.0 |
| θb [degree] | 40 |
| Eye Relief E.R. [mm] | 10 |
| Shape of L1 on E.P. Side | Convex |
| Number of Free-Form Surface Lens | 3 |

4. Numerical Examples of Eyepiece Optical System (Eyepiece)

Specific lens data of eyepieces according to respective examples exhibited in Tables 1 and 2 are given below. The eyepiece according to each of the examples corresponds to each of the left eyepiece optical system 101L and the right eyepiece optical system 101R, and is applied to each of the left eyepiece display unit 102L and the right eyepiece display unit 102R. In the eyepiece according to each of the examples, the left-eye image display device 100L or the right-eye image display device 100R is referred to as the image display device 100 without distinction between the left and the right.

It is to be noted that meanings, etc. of symbols used in the following tables and descriptions are as follows. "Si" denotes the number of i-th surface, which is numbered to sequentially increase toward the image side, with the eye point E.P. being numbered as the first. "Ri" denotes a paraxial curvature radius (mm) of the i-th surface. "Ndi" denotes a value of a refractive index at a d-line (a wavelength of 587.6 nm) of a material (medium) of an optical element having the i-th surface. "vdi" denotes a value of Abbe's number at the d-line of the material of the optical element having the i-th surface. A surface having a curvature radius of "o" indicates a planar surface or a stop surface (an aperture stop STO (eye point E.P.)).

Description of Definitions of Eccentric Amount, Rotational Amount, and Interval

FIG. 12 illustrates a definition of an optical axis of the eyepiece according to each of the examples. In the eyepiece according to each of the embodiments, at least one lens element and the image display device 100 are eccentric and/or rotated with respect to the eye point E.P. It is to be noted that, FIG. 12 exemplifies the eyepiece of the three-group three-lens configuration, but the same applies also to the eyepiece, etc. of the four-group four-lens configuration.

In each of the examples, as illustrated in FIG. 12, (Y-coordinate and Z-coordinate) of the eye point E.P. is set to (0, 0), and the optical axis AX (E.P.) of the eye point E.P. is set as a reference optical axis. In addition, an optical axis of an i-th lens Li is represented as an optical axis AX (Li). An optical axis of the image display device 100 is represented as AX (Pa). As for the positions of each lens element and the image display device 100 in the following tables, absolute positions (Y-coordinate and Z-coordinate) are indicated on each optical axis in a case where the eye point E.P. is set to (0,0). In addition, similarly, also for the rotational amount, an absolute amount is indicated with reference to the optical axis AX (E.P.) of eye point E.P.

Description of Definition of Image Magnification

The image magnification My is defined as Mv=α'/α as described above referring to FIG. 3; in the eyepiece according to each of the examples, at least one lens element and the image display device 100 are eccentric and/or rotated with respect to the eye point E.P. Accordingly, an observation angle is asymmetric with respect to an eccentric direction and a rotational direction. In the present example, in order to handle the observation angle in an average manner, the image magnification My was calculated using an observation angle in a case of replacing a Y-position and a rotational amount of the image display device 100 with 0 (mm) and 0 (degree), respectively, while keeping a Z-position thereof as it is.

(Expressions of Aspherical Surface and Free-Form Surface)

The eyepiece according to each of the examples includes a free-form surface lens. In addition, an aspherical lens may be included in some cases. An aspherical shape is defined by the following expression (1.1) of an aspherical surface. In addition, a free-form surface shape is defined by the following expression (1.2) of a free-form surface. It is to be noted that, in each of the following tables exhibiting aspherical surfaces and free-form surfaces, "E-n" denotes an exponential expression with a base of 10, i.e., "minus n-th power of 10". For example, "0.12345E-05" denotes "0.12345×(minus fifth power of 10)".

$$Za(s) = \frac{\frac{1}{R}s^2}{1 + \sqrt{1 - (1+k)\frac{1}{R^2}s^2}} + A4s^4 + A6s^6 + A8s^8 + \ldots \quad (1.1)$$

$$Zf(s) = \frac{\frac{1}{R}s^2}{1 + \sqrt{1 - (1+k)\frac{1}{R^2}s^2}} + B1 \cdot x^1 y^0 + B2 \cdot x^0 y^1 + B3 \cdot x^2 y^0 + B4 \cdot x^1 y^1 + B5 \cdot x^0 y^2 + \ldots \quad (1.2)$$

In the expressions,

Za (s) denotes a sag amount of an aspherical shape with reference to an optical axis of each lens element, Zf (s) denotes a sag amount of a free-form surface shape with reference to an optical axis of each lens element, s denotes a distance from an optical axis of each lens element (tangential direction), x denotes a distance from an optical axis of each lens element (x-direction, see FIG. 4), y denotes a distance from an optical axis of each lens element (z-direction, see FIG. 4), R denotes a curvature radius, k denotes a conic constant, Ai denotes an aspherical coefficient of degree i, and Bj denotes a j-th polynomial coefficient.

Example 1

Table 3 exhibits basic lens data of an eyepiece according to Example 1. In addition, Table 4 exhibits data of polynomials representing a free-form surface.

TABLE 3

Example 1 Lens Data

| Si Surface No. | Yi Y-Coordinate | Zi Z-Coordinate | θi Rotational Amount | Ri Curvature Radius | Ndi Refractive Index | vdi Abbe's Number |
|---|---|---|---|---|---|---|
| 1 (STO) | — | — | — | ∞ | — | — |
| 2 | 3.068 | 11.000 | 0.000 | 117.55 | 1.439 | 94.7 |
| 3 | 3.068 | 17.840 | 0.000 | −23.594 | — | — |
| 4 | −4.125 | 19.475 | −16.931 | 30.743 | 1.883 | 40.8 |
| 5 | −1.438 | 28.302 | −16.931 | 66.256 | — | — |
| 6 | 4.672 | 28.145 | −3.546 | ∞ | 1.661 | 20.4 |
| 7 | 5.336 | 38.862 | −3.546 | ∞ | — | — |
| 8 | 4.456 | 44.133 | −1.542 | ∞ | — | — |

TABLE 4

Example 1 Free-Form Surface Data

| Si Surface No. | r Normalized Radius | $x^1y^0$ | $x^0y^1$ | $x^2y^0$ | $x^1y^1$ | $x^0y^2$ |
|---|---|---|---|---|---|---|
| 6 | 1.000 | — | −1.049E−02 | 1.622E−02 | — | 1.734E−02 |
| 7 | 1.000 | — | −3.454E−02 | 1.267E−03 | — | 1.585E−02 |

| Si Surface No. | $x^3y^0$ | $x^2y^1$ | $x^1y^2$ | $x^0y^3$ | $x^4y^0$ | $x^3y^1$ |
|---|---|---|---|---|---|---|
| 6 | — | −6.660E−04 | — | −7.088E−05 | 1.947E−08 | — |
| 7 | — | 1.061E−04 | — | 1.438E−04 | −5.462E−07 | — |

| Si Surface No. | $x^2y^2$ | $x^1y^3$ | $x^0y^4$ | $x^5y^0$ | $x^4y^1$ | $x^3y^2$ |
|---|---|---|---|---|---|---|
| 6 | −4.343E−07 | — | −7.021E−07 | — | −6.229E−08 | — |
| 7 | 1.630E−06 | — | −5.819E−08 | — | 4.693E−08 | — |

| Si Surface No. | $x^2y^3$ | $x^1y^4$ | $x^0y^5$ |
|---|---|---|---|
| 6 | 8.976E−08 | — | −1.408E−07 |
| 7 | 1.764E−07 | — | −4.885E−08 |

FIG. 13 illustrates a lens cross-section of the eyepiece according to Example 1. FIGS. 14 to 15 illustrate various aberrations of the eyepiece according to Example 1. Each aberration is obtained by tracing a light beam from the side of the eye point E.P. In particular, FIG. 14 illustrates astigmatism (field curvature) and distortion. FIG. 15 illustrates chromatic aberration of magnification. An astigmatism diagram and a distortion diagram indicate a value for a wavelength of 587.6 (nm). In the astigmatism diagram, S denotes a value on a sagittal image plane, and T denotes a value on a tangential image plane. A diagram of chromatic aberration of magnification indicates values for a wavelength of 486.1 (nm) and a wavelength of 656.3 (nm), with the wavelength of 587.6 (nm) as a reference wavelength.

It is to be noted that each aberration diagram illustrates aberrations in a case where alight beam tracing angle is changed in ay-direction (see FIG. 5). The same holds true also for aberration diagrams in other examples below.

As can be appreciated from each of the aberration diagrams, it is obvious that Example 1 exhibits favorable optical performance.

Example 2

Table 5 exhibits basic lens data of an eyepiece according to Example 2. In addition, Table 6 exhibits data of polynomials representing a free-form surface.

TABLE 5

Example 2 Lens Data

| Si Surface No. | Yi Y-Coordinate | Zi Z-Coordinate | θi Rotational Amount | Ri Curvature Radius | Ndi Refractive Index | vdi Abbe's Number |
|---|---|---|---|---|---|---|
| 1 (STO) | — | — | — | ∞ | — | — |
| 2 | 9.610 | 13.000 | 0.000 | 100.774 | 1.963 | 24.1 |
| 3 | 9.610 | 20.678 | 0.000 | −81.970 | — | — |
| 4 | 1.420 | 22.801 | −16.180 | 31.526 | 1.877 | 40.8 |
| 5 | 4.207 | 32.405 | −16.180 | 107.653 | — | — |
| 6 | 3.196 | 33.967 | −21.124 | ∞ | 1.661 | 20.4 |
| 7 | 6.597 | 42.768 | −21.124 | ∞ | — | — |
| 8 | 8.571 | 46.980 | −15.557 | ∞ | — | — |

TABLE 6

Example 2 Free-Form Surface Data

| Si Surface No. | r Normalized Radius | $x^1y^0$ | $x^0y^1$ | $x^2y^0$ | $x^1y^1$ | $x^0y^2$ |
|---|---|---|---|---|---|---|
| 6 | 1.000 | — | 1.848E−01 | 1.740E−02 | — | 7.679E−03 |
| 7 | 1.000 | — | −1.348E−01 | 1.363E−03 | — | 7.594E−03 |

TABLE 6-continued

Example 2 Free-Form Surface Data

| Si Surface No. | $x^3y^0$ | $x^2y^1$ | $x^1y^2$ | $x^0y^3$ | $x^4y^0$ | $x^3y^1$ |
|---|---|---|---|---|---|---|
| 6 | — | −3.376E−04 | — | −9.993E−05 | 1.210E−05 | — |
| 7 | — | −5.174E−04 | — | 1.268E−04 | 1.057E−07 | — |

| Si Surface No. | $x^2y^2$ | $x^1y^3$ | $x^0y^4$ | $x^5y^0$ | $x^4y^1$ | $x^3y^2$ |
|---|---|---|---|---|---|---|
| 6 | −1.013E−06 | — | 8.241E−06 | — | −1.547E−06 | — |
| 7 | 1.442E−05 | — | −1.182E−05 | — | 6.905E−07 | — |

| Si Surface No. | $x^2y^3$ | $x^1y^4$ | $x^0y^5$ |
|---|---|---|---|
| 6 | 7.160E−07 | — | −9.968E−08 |
| 7 | 5.755E−07 | — | 5.268E−07 |

FIG. 16 illustrates a lens cross-section of the eyepiece according to Example 2. FIGS. 17 to 18 illustrate various aberrations of the eyepiece according to Example 2.

As can be appreciated from each of the aberration diagrams, it is obvious that the eyepiece according to Example 2 has favorable optical performance.

Example 3

Table 7 exhibits basic lens data of an eyepiece according to Example 3. In addition, Table 8 exhibits data of polynomials representing a free-form surface.

TABLE 7

Example 3 Lens Data

| Si Surface No. | Yi Y-Coordinate | Zi Z-Coordinate | θi Rotational Amount | Ri Curvature Radius | Ndi Refractive Index | vdi Abbe's Number |
|---|---|---|---|---|---|---|
| 1 (STO) | — | — | — | ∞ | — | — |
| 2 | 4.419 | 15.000 | 0.000 | 117.898 | 1.963 | 24.1 |
| 3 | 4.419 | 21.000 | 0.000 | −63.595 | — | — |
| 4 | 3.474 | 21.987 | −6.712 | 36.807 | 1.883 | 40.8 |
| 5 | 4.092 | 27.237 | −6.712 | 68.665 | — | — |
| 6 | 2.556 | 28.402 | −20.433 | ∞ | 1.661 | 20.4 |
| 7 | 6.863 | 39.964 | −20.433 | ∞ | — | — |
| 8 | 7.064 | 46.421 | −7.516 | ∞ | — | — |

TABLE 8

Example 3 Free-Form Surface Data

| Si Surface No. | r Normalized Radius | $x^1y^0$ | $x^0y^1$ | $x^2y^0$ | $x^1y^1$ | $x^0y^2$ |
|---|---|---|---|---|---|---|
| 6 | 1.000 | — | 1.867E−01 | 1.995E−02 | — | 1.599E−02 |
| 7 | 1.000 | — | −1.686E−02 | −2.022E−03 | — | −8.243E−04 |

| Si Surface No. | $x^3y^0$ | $x^2y^1$ | $x^1y^2$ | $x^0y^3$ | $x^4y^0$ | $x^3y^1$ |
|---|---|---|---|---|---|---|
| 6 | — | −2.152E−04 | — | −1.233E−04 | −5.823E−07 | — |
| 7 | — | −1.792E−05 | — | 1.523E−04 | −2.820E−08 | — |

| Si Surface No. | $x^2y^2$ | $x^1y^3$ | $x^0y^4$ | $x^5y^0$ | $x^4y^1$ | $x^3y^2$ |
|---|---|---|---|---|---|---|
| 6 | 1.429E−06 | — | 4.564E−06 | — | −5.170E−07 | — |
| 7 | 9.605E−06 | — | 1.703E−06 | — | 6.917E−08 | — |

TABLE 8-continued

Example 3 Free-Form Surface Data

| Si Surface No. | $x^2y^3$ | $x^1y^4$ | $x^0y^5$ |
|---|---|---|---|
| 6 | 9.236E−08 | — | −2.292E−07 |
| 7 | 7.955E−08 | — | −8.027E−08 |

FIG. 19 illustrates a lens cross-section of the eyepiece according to Example 3. FIGS. 20 to 21 illustrate various aberrations of the eyepiece according to Example 3.

As can be appreciated from each of the aberration diagrams, it is obvious that the eyepiece according to Example 3 has favorable optical performance.

Example 4

Table 9 exhibits basic lens data of an eyepiece according to Example 4. In addition, Table 10 exhibits data of polynomials representing a free-form surface.

TABLE 9

Example 4 Lens Data

| Si Surface No. | Yi Y-Coordinate | Zi Z-Coordinate | θi Rotational Amount | Ri Curvature Radius | Ndi Refractive Index | vdi Abbe's Number |
|---|---|---|---|---|---|---|
| 1 (STO) | — | — | — | ∞ | — | — |
| 2 | 10.305 | 11.000 | 0.000 | 90.820 | 1.963 | 24.1 |
| 3 | 10.305 | 18.328 | 0.000 | −85.996 | — | — |
| 4 | 1.475 | 20.545 | −17.590 | 31.077 | 1.883 | 40.8 |
| 5 | 4.497 | 30.077 | −17.590 | 107.953 | — | — |
| 6 | 5.490 | 31.649 | −22.975 | ∞ | 1.661 | 20.4 |
| 7 | 8.526 | 38.809 | −22.975 | ∞ | — | — |
| 8 | 8.995 | 43.683 | −16.386 | ∞ | — | — |

TABLE 10

Example 4 Free-Form Surface Data

| Si Surface No. | r Normalized Radius | $x^1y^0$ | $x^0y^1$ | $x^2y^0$ | $x^1y^1$ | $x^0y^2$ |
|---|---|---|---|---|---|---|
| 6 | 1.000 | — | 2.470E−01 | 1.904E−02 | — | 5.829E−03 |
| 7 | 1.000 | — | −1.048E−01 | −2.424E−05 | — | 6.589E−03 |

| Si Surface No. | $x^3y^0$ | $x^2y^1$ | $x^1y^2$ | $x^0y^3$ | $x^4y^0$ | $x^3y^1$ |
|---|---|---|---|---|---|---|
| 6 | — | −4.424E−04 | — | −1.444E−04 | 1.104E−05 | — |
| 7 | — | −5.535E−04 | — | 9.045E−05 | 1.135E−05 | — |

| Si Surface No. | $x^2y^2$ | $x^1y^3$ | $x^0y^4$ | $x^5y^0$ | $x^4y^1$ | $x^3y^2$ |
|---|---|---|---|---|---|---|
| 6 | −3.767E−06 | — | 1.061E−05 | — | −2.438E−06 | — |
| 7 | 1.475E−05 | — | −5.901E−06 | — | 1.094E−06 | — |

| Si Surface No. | $x^2y^3$ | $x^1y^4$ | $x^0y^5$ |
|---|---|---|---|
| 6 | 6.333E−07 | — | 2.238E−08 |
| 7 | 8.520E−08 | — | 5.317E−07 |

FIG. 22 illustrates a lens cross-section of the eyepiece according to Example 4. FIGS. 23 to 24 illustrate various aberrations of the eyepiece according to Example 4.

As can be appreciated from each of the aberration diagrams, it is obvious that the eyepiece according to Example 4 has favorable optical performance.

Example 5

Table 11 exhibits basic lens data of an eyepiece according to Example 5. In addition, Table 12 exhibits data of polynomials representing a free-form surface.

TABLE 11

Example 5 Lens Data

| Si Surface No. | Yi Y-Coordinate | Zi Z-Coordinate | θi Rotational Amount | Ri Curvature Radius | Ndi Refractive Index | νdi Abbe's Number |
|---|---|---|---|---|---|---|
| 1 (STO) | — | — | — | ∞ | — | — |
| 2 | 5.303 | 13.000 | 0.000 | 120.654 | 1.963 | 24.1 |
| 3 | 5.303 | 18.697 | 0.000 | −57.614 | — | — |
| 4 | 2.218 | 19.693 | −7.535 | 30.891 | 1.883 | 40.8 |
| 5 | 3.024 | 25.783 | −7.535 | 47.292 | — | — |
| 6 | 3.043 | 26.788 | −24.657 | ∞ | 1.661 | 20.4 |
| 7 | 7.796 | 37.142 | −24.657 | ∞ | — | — |
| 8 | 6.486 | 43.728 | −11.536 | ∞ | — | — |

TABLE 12

Example 5 Free-Form Surface Data

| Si Surface No. | r Normalized Radius | $x^1y^0$ | $x^0y^1$ | $x^2y^0$ | $x^1y^1$ | $x^0y^2$ |
|---|---|---|---|---|---|---|
| 6 | 1.000 | — | 2.552E−01 | 1.857E−02 | — | 1.427E−02 |
| 7 | 1.000 | — | −1.738E−02 | −9.378E−04 | — | 5.698E−03 |

| Si Surface No. | $x^3y^0$ | $x^2y^1$ | $x^1y^2$ | $x^0y^3$ | $x^4y^0$ | $x^3y^1$ |
|---|---|---|---|---|---|---|
| 6 | — | −1.353E−04 | — | 1.172E−05 | 1.190E−05 | — |
| 7 | — | 3.387E−04 | — | 1.652E−04 | 5.166E−06 | — |

| Si Surface No. | $x^2y^2$ | $x^1y^3$ | $x^0y^4$ | $x^5y^0$ | $x^4y^1$ | $x^3y^2$ |
|---|---|---|---|---|---|---|
| 6 | 2.346E−05 | — | 1.096E−05 | — | −4.930E−07 | — |
| 7 | 4.088E−06 | — | 2.767E−07 | — | −1.302E−07 | — |

| Si Surface No. | $x^2y^3$ | $x^1y^4$ | $x^0y^5$ |
|---|---|---|---|
| 6 | 1.210E−06 | — | 2.685E−08 |
| 7 | −1.710E−07 | — | −3.769E−08 |

FIG. 25 illustrates a lens cross-section of the eyepiece according to Example 5. FIGS. 26 to 27 illustrate various aberrations of the eyepiece according to Example 5.

As can be appreciated from each of the aberration diagrams, it is obvious that the eyepiece according to Example 5 has favorable optical performance.

Example 6

Table 13 exhibits basic lens data of an eyepiece according to Example 6. In addition, Table 14 exhibits data of polynomials representing a free-form surface.

TABLE 13

Example 6 Lens Data

| Si Surface No. | Yi Y-Coordinate | Zi Z-Coordinate | θi Rotational Amount | Ri Curvature Radius | Ndi Refractive Index | νdi Abbe's Number |
|---|---|---|---|---|---|---|
| 1 (STO) | — | — | — | ∞ | — | — |
| 2 | 6.102 | 15.000 | 0.000 | 144.881 | 1.963 | 24.1 |
| 3 | 6.102 | 21.672 | 0.000 | −58.056 | — | — |
| 4 | 6.175 | 22.642 | −2.564 | 31.881 | 1.883 | 40.8 |
| 5 | 6.562 | 31.288 | −2.564 | 68.988 | — | — |
| 6 | 4.375 | 32.372 | −15.548 | ∞ | 1.661 | 20.4 |
| 7 | 7.797 | 44.670 | −15.548 | ∞ | — | — |
| 8 | 8.108 | 48.477 | −7.653 | ∞ | — | — |

TABLE 14

Example 6 Free-Form Surface Data

| Si Surface No. | r Normalized Radius | $x^1y^0$ | $x^0y^1$ | $x^2y^0$ | $x^1y^1$ | $x^0y^2$ |
|---|---|---|---|---|---|---|
| 6 | 1.000 | — | 1.520E−01 | 1.803E−02 | — | 1.608E−02 |
| 7 | 1.000 | — | −2.101E−02 | −6.245E−03 | — | 2.661E−03 |

| Si Surface No. | $x^3y^0$ | $x^2y^1$ | $x^1y^2$ | $x^0y^3$ | $x^4y^0$ | $x^3y^1$ |
|---|---|---|---|---|---|---|
| 6 | — | −7.265E−05 | — | 1.107E−04 | 6.109E−06 | — |
| 7 | — | −3.278E−05 | — | 8.072E−05 | 1.103E−05 | — |

| Si Surface No. | $x^2y^2$ | $x^1y^3$ | $x^0y^4$ | $x^5y^0$ | $x^4y^1$ | $x^3y^2$ |
|---|---|---|---|---|---|---|
| 6 | −3.507E−05 | — | 1.130E−05 | — | −4.401E−07 | — |
| 7 | 1.313E−05 | — | 2.110E−06 | — | 1.861E−07 | — |

| Si Surface No. | $x^2y^3$ | $x^1y^4$ | $x^0y^5$ |
|---|---|---|---|
| 6 | 2.703E−07 | — | −1.934E−07 |
| 7 | −3.533E−07 | — | 1.185E−07 |

FIG. 28 illustrates a lens cross-section of the eyepiece according to Example 6. FIGS. 29 to 30 illustrate various aberrations of the eyepiece according to Example 6.

As can be appreciated from each of the aberration diagrams, it is obvious that the eyepiece according to Example 6 has favorable optical performance.

Example 7

Table 15 exhibits basic lens data of an eyepiece according to Example 7. In addition, Table 16 exhibits data of polynomials representing a free-form surface.

TABLE 15

Example 7 Lens Data

| Si Surface No. | Yi Y-Coordinate | Zi Z-Coordinate | θi Rotational Amount | Ri Curvature Radius | Ndi Refractive Index | νdi Abbe's Number |
|---|---|---|---|---|---|---|
| 1 (STO) | — | — | — | ∞ | — | — |

TABLE 15-continued

Example 7 Lens Data

| Si Surface No. | Yi Y-Coordinate | Zi Z-Coordinate | θi Rotational Amount | Ri Curvature Radius | Ndi Refractive Index | νdi Abbe's Number |
|---|---|---|---|---|---|---|
| 2 | 8.164 | 11.000 | 0.000 | 106.869 | 1.963 | 24.1 |
| 3 | 8.164 | 17.071 | 0.000 | −69.691 | — | — |
| 4 | 2.550 | 18.691 | −12.402 | 31.990 | 1.883 | 40.8 |
| 5 | 4.148 | 25.956 | −12.402 | 95.134 | — | — |
| 6 | 4.017 | 27.007 | −22.859 | ∞ | 1.661 | 20.4 |
| 7 | 7.727 | 35.806 | −22.859 | ∞ | — | — |
| 8 | 7.655 | 41.528 | −15.229 | ∞ | — | — |

TABLE 16

Example 7 Free-Form Surface Data

| Si Surface No. | r Normalized Radius | $x^1y^0$ | $x^0y^1$ | $x^2y^0$ | $x^1y^1$ | $x^0y^2$ |
|---|---|---|---|---|---|---|
| 6 | 1.000 | — | 2.434E−01 | 1.778E−02 | — | 9.768E−03 |
| 7 | 1.000 | — | −9.913E−02 | −9.620E−04 | — | 6.362E−03 |

| Si Surface No. | $x^3y^0$ | $x^2y^1$ | $x^1y^2$ | $x^0y^3$ | $x^4y^0$ | $x^3y^1$ |
|---|---|---|---|---|---|---|
| 6 | — | −2.761E−04 | — | −2.649E−05 | 1.220E−05 | — |
| 7 | — | −2.757E−04 | — | 1.125E−04 | 9.131E−06 | — |

| Si Surface No. | $x^2y^2$ | $x^1y^3$ | $x^0y^4$ | $x^5y^0$ | $x^4y^1$ | $x^3y^2$ |
|---|---|---|---|---|---|---|
| 6 | 5.701E−06 | — | 9.602E−06 | — | −1.386E−06 | — |
| 7 | 1.242E−05 | — | −2.344E−06 | — | 6.675E−07 | — |

| Si Surface No. | $x^2y^3$ | $x^1y^4$ | $x^0y^5$ |
|---|---|---|---|
| 6 | 5.079E−07 | — | −3.483E−08 |
| 7 | 5.504E−08 | — | 2.161E−07 |

FIG. 31 illustrates a lens cross-section of the eyepiece according to Example 7. FIGS. 32 to 33 illustrate various aberrations of the eyepiece according to Example 7.

As can be appreciated from each of the aberration diagrams, it is obvious that the eyepiece according to Example 7 has favorable optical performance.

Example 8

Table 17 exhibits basic lens data of an eyepiece according to Example 8. In addition, Table 18 exhibits data of polynomials representing a free-form surface.

TABLE 17

Example 8 Lens Data

| Si Surface No. | Yi Y-Coordinate | Zi Z-Coordinate | θi Rotational Amount | Ri Curvature Radius | Ndi Refractive Index | νdi Abbe's Number |
|---|---|---|---|---|---|---|
| 1 (STO) | — | — | — | ∞ | — | — |
| 2 | 6.087 | 13.000 | 0.000 | 145.639 | 1.963 | 24.1 |
| 3 | 6.087 | 18.690 | 0.000 | −58.772 | — | — |
| 4 | 4.637 | 19.700 | −6.076 | 34.456 | 1.883 | 40.8 |
| 5 | 5.528 | 28.073 | −6.076 | 106.086 | — | — |
| 6 | 5.225 | 29.094 | −16.363 | ∞ | 1.661 | 20.4 |
| 7 | 8.727 | 41.023 | −16.363 | ∞ | — | — |
| 8 | 8.156 | 45.036 | −10.397 | ∞ | — | — |

TABLE 18

Example 8 Free-Form Surface Data

| Si Surface No. | r Normalized Radius | $x^1y^0$ | $x^0y^1$ | $x^2y^0$ | $x^1y^1$ | $x^0y^2$ |
|---|---|---|---|---|---|---|
| 6 | 1.000 | — | 1.881E−01 | 1.874E−02 | — | 1.538E−02 |
| 7 | 1.000 | — | −9.178E−02 | −1.280E−03 | — | 1.310E−04 |

| Si Surface No. | $x^3y^0$ | $x^2y^1$ | $x^1y^2$ | $x^0y^3$ | $x^4y^0$ | $x^3y^1$ |
|---|---|---|---|---|---|---|
| 6 | — | −4.576E−05 | — | 1.627E−05 | 1.134E−05 | — |
| 7 | — | −1.994E−05 | — | 2.069E−04 | 6.041E−06 | — |

| Si Surface No. | $x^2y^2$ | $x^1y^3$ | $x^0y^4$ | $x^5y^0$ | $x^4y^1$ | $x^3y^2$ |
|---|---|---|---|---|---|---|
| 6 | −3.447E−06 | — | 3.054E−06 | — | −1.192E−06 | — |
| 7 | 1.639E−05 | — | 4.083E−06 | — | 3.124E−07 | — |

| Si Surface No. | $x^2y^3$ | $x^1y^4$ | $x^0y^5$ |
|---|---|---|---|
| 6 | 6.740E−08 | — | −4.197E−07 |
| 7 | −3.351E−07 | — | −2.053E−07 |

FIG. 34 illustrates a lens cross-section of the eyepiece according to Example 8. FIGS. 35 to 36 illustrate various aberrations of the eyepiece according to Example 8.

As can be appreciated from each of the aberration diagrams, it is obvious that the eyepiece according to Example 8 has favorable optical performance.

Example 9

Table 19 exhibits basic lens data of an eyepiece according to Example 9. In addition, Table 20 exhibits data of polynomials representing a free-form surface.

TABLE 19

Example 9 Lens Data

| Si Surface No. | Yi Y-Coordinate | Zi Z-Coordinate | θi Rotational Amount | Ri Curvature Radius | Ndi Refractive Index | vdi Abbe's Number |
|---|---|---|---|---|---|---|
| 1 (STO) | — | — | — | ∞ | — | — |
| 2 | 6.650 | 15.000 | 0.000 | 455.108 | 1.963 | 24.1 |
| 3 | 6.650 | 21.749 | 0.000 | −43.366 | — | — |
| 4 | 7.554 | 22.538 | −4.101 | 35.315 | 1.883 | 40.8 |
| 5 | 8.150 | 30.848 | −4.101 | 124.555 | — | — |
| 6 | 7.178 | 31.691 | −9.970 | ∞ | 1.661 | 20.4 |
| 7 | 9.190 | 43.134 | −9.970 | ∞ | — | — |
| 8 | 8.588 | 47.901 | −5.568 | ∞ | — | — |

TABLE 20

Example 9 Free-Form Surface Data

| Si Surface No. | r Normalized Radius | $x^1y^0$ | $x^0y^1$ | $x^2y^0$ | $x^1y^1$ | $x^0y^2$ |
|---|---|---|---|---|---|---|
| 6 | 1.000 | — | 9.748E−02 | 1.623E−02 | — | 9.174E−03 |
| 7 | 1.000 | — | −1.451E−01 | −7.876E−03 | — | −1.578E−03 |

| Si Surface No. | $x^3y^0$ | $x^2y^1$ | $x^1y^2$ | $x^0y^3$ | $x^4y^0$ | $x^3y^1$ |
|---|---|---|---|---|---|---|
| 6 | — | −2.910E−04 | — | 1.909E−05 | −6.615E−07 | — |
| 7 | — | 9.549E−05 | — | 1.558E−04 | 9.511E−06 | — |

| Si Surface No. | $x^2y^2$ | $x^1y^3$ | $x^0y^4$ | $x^5y^0$ | $x^4y^1$ | $x^3y^2$ |
|---|---|---|---|---|---|---|
| 6 | −1.191E−05 | — | 6.147E−06 | — | −1.063E−07 | — |
| 7 | 1.676E−05 | — | 6.500E−07 | — | 5.331E−08 | — |

| Si Surface No. | $x^2y^3$ | $x^1y^4$ | $x^0y^5$ |
|---|---|---|---|
| 6 | 5.896E−09 | — | −7.203E−08 |
| 7 | −6.427E−07 | — | 7.155E−08 |

FIG. 37 illustrates a lens cross-section of the eyepiece according to Example 9. FIGS. 38 to 39 illustrate various aberrations of the eyepiece according to Example 9.

As can be appreciated from each of the aberration diagrams, it is obvious that the eyepiece according to Example 9 has favorable optical performance.

Example 10

Table 21 exhibits basic lens data of an eyepiece according to Example 10. In addition, Table 22 exhibits data of polynomials representing a free-form surface.

TABLE 21

| | | | | | | |
|---|---|---|---|---|---|---|
| Example 10 Lens Data | | | | | | |
| Si Surface No. | Yi Y-Coordinate | Zi Z-Coordinate | θi Rotational Amount | Ri Curvature Radius | Ndi Refractive Index | vdi Abbe's Number |
| 1 (STO) | — | — | — | ∞ | — | — |

TABLE 21-continued

| | | | | | | |
|---|---|---|---|---|---|---|
| Example 10 Lens Data | | | | | | |
| Si Surface No. | Yi Y-Coordinate | Zi Z-Coordinate | θi Rotational Amount | Ri Curvature Radius | Ndi Refractive Index | vdi Abbe's Number |
| 2 | −4.846 | 11.000 | 0.000 | ∞ | 1.883 | 40.8 |
| 3 | −4.846 | 17.644 | 0.000 | −52.074 | — | — |
| 4 | −4.968 | 18.643 | −13.673 | 44.962 | 1.963 | 24.1 |
| 5 | −3.477 | 24.771 | −13.673 | 146.53 | — | — |
| 6 | 2.357 | 25.803 | 7.818 | ∞ | 1.661 | 20.4 |
| 7 | 0.728 | 37.669 | 7.818 | ∞ | — | — |
| 8 | 1.991 | 44.822 | 5.663 | ∞ | — | — |

TABLE 22

| | | | | | | |
|---|---|---|---|---|---|---|
| Example 10 Free-Form Surface Data | | | | | | |
| Si Surface No. | r Normalized Radius | $x^1y^0$ | $x^0y^1$ | $x^2y^0$ | $x^1y^1$ | $x^0y^2$ |
| 6 | 1.000 | — | −9.072E−02 | 1.664E−02 | — | 1.348E−02 |
| 7 | 1.000 | — | 2.704E−01 | −9.567E−03 | — | 8.981E−03 |
| Si Surface No. | $x^3y^0$ | $x^2y^1$ | $x^1y^2$ | $x^0y^3$ | $x^4y^0$ | $x^3y^1$ |
| 6 | — | 4.352E−04 | — | −1.428E−04 | −2.783E−06 | — |
| 7 | — | 1.224E−04 | — | 6.393E−05 | 4.744E−06 | — |
| Si Surface No. | $x^2y^2$ | $x^1y^3$ | $x^0y^4$ | $x^5y^0$ | $x^4y^1$ | $x^3y^2$ |
| 6 | 3.222E−05 | — | 2.186E−06 | — | 1.901E−07 | — |
| 7 | 4.340E−05 | — | −1.834E−05 | — | 1.715E−07 | — |
| Si Surface No. | $x^2y^3$ | $x^1y^4$ | $x^0y^5$ | | | |
| 6 | 1.563E−07 | — | 3.928E−07 | | | |
| 7 | 7.564E−07 | — | −4.527E−07 | | | |

FIG. 40 illustrates a lens cross-section of the eyepiece according to Example 10. FIGS. 41 to 42 illustrate various aberrations of the eyepiece according to Example 10.

As can be appreciated from each of the aberration diagrams, it is obvious that the eyepiece according to Example 10 has favorable optical performance.

Example 11

Table 23 exhibits basic lens data of an eyepiece according to Example 11. In addition, Table 24 exhibits data of polynomials representing a free-form surface.

TABLE 23

Example 11 Lens Data

| Si Surface No. | Yi Y-Coordinate | Zi Z-Coordinate | θi Rotational Amount | Ri Curvature Radius | Ndi Refractive Index | vdi Abbe's Number |
|---|---|---|---|---|---|---|
| 1 (STO) | — | — | — | ∞ | — | — |
| 2 | 3.002 | 11.000 | 0.000 | 66.331 | 1.883 | 40.8 |
| 3 | 3.002 | 15.715 | 0.000 | −84.880 | — | — |
| 4 | 4.449 | 16.714 | −4.301 | ∞ | 1.553 | 56.0 |
| 5 | 5.199 | 26.679 | −4.301 | ∞ | — | — |
| 6 | 4.920 | 27.703 | −2.842 | ∞ | 1.553 | 56.0 |
| 7 | 5.430 | 37.985 | −2.842 | ∞ | — | — |
| 8 | 4.778 | 43.297 | −5.411 | ∞ | — | — |

TABLE 24

Example 11 Free-Form Surface Data

| Si Surface No. | r Normalized Radius | $x^1y^0$ | $x^0y^1$ | $x^2y^0$ | $x^1y^1$ | $x^0y^2$ |
|---|---|---|---|---|---|---|
| 4 | 1.000 | — | 3.418E−02 | 1.102E−02 | — | 1.699E−02 |
| 5 | 1.000 | — | −1.173E−01 | −1.027E−02 | — | 8.020E−04 |
| 6 | 1.000 | — | 1.282E−02 | 1.034E−02 | — | 1.259E−02 |
| 7 | 1.000 | — | −1.326E−01 | −1.967E−02 | — | 5.867E−03 |

| Si Surface No. | $x^3y^0$ | $x^2y^1$ | $x^1y^2$ | $x^0y^3$ | $x^4y^0$ | $x^3y^1$ |
|---|---|---|---|---|---|---|
| 4 | — | −1.099E−04 | — | 1.149E−05 | −1.497E−05 | — |
| 5 | — | 2.093E−04 | — | 5.762E−05 | 1.191E−05 | — |
| 6 | — | −1.995E−05 | — | −1.965E−04 | −6.439E−06 | — |
| 7 | — | −8.895E−06 | — | −2.080E−04 | −7.325E−07 | — |

| Si Surface No. | $x^2y^2$ | $x^1y^3$ | $x^0y^4$ | $x^5y^0$ | $x^4y^1$ | $x^3y^2$ |
|---|---|---|---|---|---|---|
| 4 | 6.347E−06 | — | 7.432E−06 | — | −9.015E−08 | — |
| 5 | 8.445E−07 | — | −3.513E−06 | — | 2.770E−07 | — |
| 6 | 8.070E−06 | — | −1.278E−05 | — | −1.511E−07 | — |
| 7 | 5.109E−05 | — | 7.038E−07 | — | −7.652E−08 | — |

| Si Surface No. | $x^2y^3$ | $x^1y^4$ | $x^0y^5$ |
|---|---|---|---|
| 4 | −1.082E−06 | — | −9.090E−08 |
| 5 | −9.540E−07 | — | 3.590E−07 |
| 6 | 1.877E−06 | — | 7.667E−07 |
| 7 | 4.346E−07 | — | −7.416E−08 |

FIG. 43 illustrates a lens cross-section of the eyepiece according to Example 11. FIGS. 44 to 45 illustrate various aberrations of the eyepiece according to Example 11.

As can be appreciated from each of the aberration diagrams, it is obvious that the eyepiece according to Example 11 has favorable optical performance.

Example 12

Table 25 exhibits basic lens data of an eyepiece according to Example 12. In addition, Table 26 exhibits aspherical surface data. In addition, Table 27 exhibits data of polynomials representing a free-form surface.

TABLE 25

Example 12 Lens Data

| Si Surface No. | Yi Y-Coordinate | Zi Z-Coordinate | θi Rotational Amount | Ri Curvature Radius | Ndi Refractive Index | νdi Abbe's Number |
|---|---|---|---|---|---|---|
| 1 (STO) | — | — | — | ∞ | — | — |
| 2 | 2.621 | 11.000 | 0.000 | 82.238 | 1.439 | 94.7 |
| 3 | 2.621 | 16.191 | 0.000 | −51.611 | — | — |
| 4 | 1.170 | 17.204 | 6.359 | 46.290 | 1.877 | 40.8 |
| 5 | 1.660 | 21.598 | −6.359 | 116.776 | — | — |
| 6 | 3.398 | 22.387 | −2.321 | 27.015 | 1.661 | 20.4 |
| 7 | 3.770 | 31.559 | −2.321 | ∞ | — | — |
| 8 | 3.943 | 33.542 | −0.443 | ∞ | 1.553 | 56.0 |
| 9 | 4.009 | 42.077 | −0.443 | ∞ | — | — |
| 10 | 3.553 | 45.982 | −3.046 | ∞ | — | — |

TABLE 26

Example 12 Aspherical Surface Data

| Si Surface No. | k Conic Constant | A4 | A6 | A8 |
|---|---|---|---|---|
| 6 | −1.479E+00 | 1.853E−06 | −1.163E−09 | −3.097E−12 |
| 7 | 0.000E+00 | −1.659E−06 | −1.132E−09 | 3.141E−12 |

TABLE 27

Example 12 Free-Form Surface Data

| Si Surface No. | r Normalized Radius | $x^1y^0$ | $x^0y^1$ | $x^2y^0$ | $x^1y^1$ | $x^0y^2$ |
|---|---|---|---|---|---|---|
| 8 | 1.000 | — | 1.293E−01 | 7.061E−03 | — | 7.641E−03 |
| 9 | 1.000 | — | 4.285E−03 | −6.969E−03 | — | −6.120E−03 |

| Si Surface No. | $x^3y^0$ | $x^2y^1$ | $x^1y^2$ | $x^0y^3$ |
|---|---|---|---|---|
| 8 | — | −1.943E−04 | — | −1.263E−04 |
| 9 | — | −1.290E−05 | — | −5.333E−05 |

FIG. 46 illustrates a lens cross-section of the eyepiece according to Example 12. FIGS. 47 to 48 illustrate various aberrations of the eyepiece according to Example 12.

As can be appreciated from each of the aberration diagrams, it is obvious that the eyepiece according to Example 12 has favorable optical performance.

Example 13

Table 28 exhibits basic lens data of an eyepiece according to Example 13. In addition, Table 29 exhibits aspherical surface data. In addition, Table 30 exhibits data of polynomials representing a free-form surface.

TABLE 28

Example 13 Lens Data

| Si Surface No. | Yi Y-Coordinate | Zi Z-Coordinate | θi Rotational Amount | Ri Curvature Radius | Ndi Refractive Index | vdi Abbe's Number |
|---|---|---|---|---|---|---|
| 1 (STO) | — | — | — | ∞ | — | — |
| 2 | 2.516 | 13.000 | 0.000 | 169.491 | 1.963 | 24.1 |
| 3 | 2.516 | 18.325 | 0.000 | −52.997 | — | — |
| 4 | 3.068 | 19.283 | −3.871 | 33.826 | 1.877 | 40.8 |

TABLE 28-continued

Example 13 Lens Data

| Si Surface No. | Yi Y-Coordinate | Zi Z-Coordinate | θi Rotational Amount | Ri Curvature Radius | Ndi Refractive Index | vdi Abbe's Number |
|---|---|---|---|---|---|---|
| 5 | 3.496 | 25.619 | −3.871 | 113.512 | — | — |
| 6 | 2.275 | 26.631 | −3.042 | 56.955 | 1.661 | 20.4 |
| 7 | 2.813 | 36.764 | −3.042 | 1208.724 | — | — |
| 8 | 3.471 | 38.737 | 0.237 | ∞ | 1.553 | 56.0 |
| 9 | 3.448 | 44.344 | 0.237 | ∞ | — | — |
| 10 | 3.734 | 46.374 | −4.315 | ∞ | — | — |

TABLE 29

Example 13 Aspherical Surface Data

| Si Surface No. | k Conic Constant | A4 | A6 | A8 |
|---|---|---|---|---|
| 6 | 1.850E+00 | 1.063E−06 | −1.540E−09 | −3.273E−12 |
| 7 | 2.562E+03 | 3.877E−07 | 3.155E−09 | 7.262E−12 |

TABLE 30

Example 13 Free-Form Surface Data

| Si Surface No. | r Normalized Radius | $x^1y^0$ | $x^0y^1$ | $x^2y^0$ | $x^1y^1$ | $x^0y^2$ |
|---|---|---|---|---|---|---|
| 8 | 1.000 | — | 6.856E−03 | 3.314E−03 | — | 4.035E−03 |
| 9 | 1.000 | — | −5.687E−03 | −2.512E−03 | — | 9.521E−04 |

| Si Surface No. | $x^3y^0$ | $x^2y^1$ | $x^1y^2$ | $x^0y^3$ |
|---|---|---|---|---|
| 8 | — | −2.332E−04 | — | 1.804E−06 |
| 9 | — | 7.197E−06 | — | −7.216E−05 |

FIG. 49 illustrates a lens cross-section of the eyepiece according to Example 13. FIGS. 50 to 51 illustrate various aberrations of the eyepiece according to Example 13.

As can be appreciated from each of the aberration diagrams, it is obvious that the eyepiece according to Example 13 has favorable optical performance.

Example 14

Table 31 exhibits basic lens data of an eyepiece according to Example 14. In addition, Table 32 exhibits aspherical surface data. In addition, Table 33 exhibits data of polynomials representing a free-form surface.

TABLE 31

Example 14 Lens Data

| Si Surface No. | Yi Y-Coordinate | Zi Z-Coordinate | θi Rotational Amount | Ri Curvature Radius | Ndi Refractive Index | vdi Abbe's Number |
|---|---|---|---|---|---|---|
| 1 (STO) | — | — | — | ∞ | — | — |
| 2 | 3.854 | 15.000 | 0.000 | 178.931 | 1.963 | 24.1 |
| 3 | 3.854 | 21.534 | 0.000 | −46.746 | — | — |
| 4 | 4.217 | 22.444 | −5.515 | 34.235 | 1.877 | 40.8 |

TABLE 31-continued

Example 14 Lens Data

| Si Surface No. | Yi Y-Coordinate | Zi Z-Coordinate | θi Rotational Amount | Ri Curvature Radius | Ndi Refractive Index | vdi Abbe's Number |
|---|---|---|---|---|---|---|
| 5 | 4.85 | 28.999 | −5.515 | 108.170 | — | — |
| 6 | 3.255 | 30.087 | −7.004 | 52.885 | 1.661 | 20.4 |
| 7 | 4.328 | 38.823 | −.004 | 1222.183 | — | — |
| 8 | 5.850 | 40.579 | −5.044 | ∞ | 1.553 | 56.0 |
| 9 | 6.362 | 46.369 | −5.044 | ∞ | — | — |
| 10 | 6.499 | 48.077 | −6.876 | ∞ | — | — |

TABLE 32

Example 14 Aspherical Surface Data

| Si Surface No. | k Conic Constant | A4 | A6 | A8 |
|---|---|---|---|---|
| 6 | 1.850E+00 | 4.503E−07 | −2.824E−09 | −4.297E−12 |
| 7 | 2.562E+03 | 1.348E−06 | 4.384E−09 | 1.171E−11 |

TABLE 33

Example 14 Free-Form Surface Data

| Si Surface No. | r Normalized Radius | $x^1y^0$ | $x^0y^1$ | $x^2y^0$ | $x^1y^1$ | $x^0y^2$ |
|---|---|---|---|---|---|---|
| 8 | 1.000 | — | 1.274E−01 | 4.777E−03 | — | 4.783E−03 |
| 9 | 1.000 | — | −1.130E−02 | −4.742E−03 | — | 1.945E−03 |

| Si Surface No. | $x^3y^0$ | $x^2y^1$ | $x^1y^2$ | $x^0y^3$ |
|---|---|---|---|---|
| 8 | — | −6.056E−04 | — | −1.935E−04 |
| 9 | — | −6.780E−05 | — | −1.328E−05 |

FIG. 52 illustrates a lens cross-section of the eyepiece according to Example 14. FIGS. 53 to 54 illustrate various aberrations of the eyepiece according to Example 14.

As can be appreciated from each of the aberration diagrams, it is obvious that the eyepiece according to Example 14 has favorable optical performance.

Example 15

Table 34 exhibits basic lens data of an eyepiece according to Example 15. In addition, Table 35 exhibits aspherical surface data. In addition, Table 36 exhibits data of polynomials representing a free-form surface.

TABLE 34

Example 15 Lens Data

| Si Surface No. | Yi Y-Coordinate | Zi Z-Coordinate | θi Rotational Amount | Ri Curvature Radius | Ndi Refractive Index | vdi Abbe's Number |
|---|---|---|---|---|---|---|
| 1 (STO) | — | — | — | ∞ | — | — |
| 2 | 0.124 | 11.000 | 0.000 | 433.316 | 1.963 | 24.1 |
| 3 | 0.124 | 16.816 | 0.000 | −41.964 | — | — |
| 4 | 4.150 | 17.813 | 2.804 | 36.431 | 1.877 | 40.8 |

TABLE 34-continued

Example 15 Lens Data

| Si Surface No. | Yi Y-Coordinate | Zi Z-Coordinate | θi Rotational Amount | Ri Curvature Radius | Ndi Refractive Index | vdi Abbe's Number |
|---|---|---|---|---|---|---|
| 5 | 3.875 | 23.412 | 2.804 | 125.658 | — | — |
| 6 | 1.942 | 24.317 | −0.944 | 43.233 | 1.661 | 20.4 |
| 7 | 2.042 | 30.361 | −0.944 | −1550.721 | — | — |
| 8 | 4.254 | 32.321 | −2.378 | ∞ | 1.553 | 56.0 |
| 9 | 4.491 | 38.023 | −2.378 | ∞ | — | — |
| 10 | 3.837 | 41.909 | −3.227 | ∞ | — | — |

TABLE 35

Example 15 Aspherical Surface Data

| Si Surface No. | k Conic Constant | A4 | A6 | A8 |
|---|---|---|---|---|
| 6 | 1.850E+00 | −5.838E−06 | 6.687E−09 | −8.245E−12 |
| 7 | 2.562E+03 | −8.251E−07 | 2.478E−10 | 3.438E−11 |

TABLE 36

Example 15 Free-Form Surface Data

| Si Surface No. | r Normalized Radius | $x^1y^0$ | $x^0y^1$ | $x^2y^0$ | $x^1y^1$ | $x^0y^2$ |
|---|---|---|---|---|---|---|
| 8 | 1.000 | — | 1.548E−01 | 4.670E−03 | — | 6.268E−03 |
| 9 | 1.000 | — | −6.431E−02 | −1.923E−03 | — | 1.242E−02 |

| Si Surface No. | $x^2y^1$ | $x^1y^2$ | $x^0y^3$ | $x^2y^1$ |
|---|---|---|---|---|
| 8 | — | −1.907E−04 | — | −1.304E−04 |
| 9 | — | 3.233E−04 | — | 2.805E−04 |

FIG. 55 illustrates a lens cross-section of an eyepiece according to Example 15. FIGS. 56 to 57 illustrate various aberrations of the eyepiece according to Example 15.

As can be appreciated from each of the aberration diagrams, it is obvious that the eyepiece according to Example 15 has favorable optical performance.

Example 16

Table 37 exhibits basic lens data of an eyepiece according to Example 16. In addition, Table 38 exhibits aspherical surface data. In addition, Table 39 exhibits data of polynomials representing a free-form surface.

TABLE 37

Example 16 Lens Data

| Si Surface No. | Yi Y-Coordinate | Zi Z-Coordinate | θi Rotational Amount | Ri Curvature Radius | Ndi Refractive Index | νdi Abbe's Number |
|---|---|---|---|---|---|---|
| 1 (STO) | — | — | — | ∞ | — | — |
| 2 | 2.790 | 13.000 | 0.000 | 578.888 | 1.963 | 24.1 |
| 3 | 2.790 | 18.871 | 0.000 | −42.153 | — | — |
| 4 | 5.246 | 19.821 | 0.872 | 40.177 | 1.877 | 40.8 |
| 5 | 5.159 | 25.484 | 0.872 | 143.830 | — | — |
| 6 | 2.405 | 26.420 | −6.425 | 41.863 | 1.661 | 20.4 |
| 7 | 3.237 | 33.809 | −6.425 | −5175.045 | — | — |
| 8 | 5.871 | 35.498 | −5.818 | ∞ | 1.553 | 56.0 |
| 9 | 6.385 | 40.546 | −5.818 | ∞ | — | — |
| 10 | 5.842 | 44.244 | −5.784 | ∞ | — | — |

TABLE 38

Example 16 Aspherical Surface Data

| Si Surface No. | k Conic Constant | A4 | A6 | A8 |
|---|---|---|---|---|
| 6 | 1.850E+00 | −5.793E−06 | 8.399E−09 | 1.067E−13 |
| 7 | 2.562E+03 | 1.475E−06 | −7.980E−10 | 2.903E−11 |

TABLE 39

Example 16 Free-Form Surface Data

| Si Surface No. | r Normalized Radius | $x^1y^0$ | $x^0y^1$ | $x^2y^0$ | $x^1y^1$ | $x^0y^2$ |
|---|---|---|---|---|---|---|
| 8 | 1.000 | — | 2.506E−01 | 9.750E−03 | — | 1.356E−02 |
| 9 | 1.000 | — | −5.628E−02 | −9.366E−04 | — | 1.135E−02 |

| Si Surface No. | $x^2y^1$ | $x^1y^2$ | $x^0y^3$ | $x^2y^1$ |
|---|---|---|---|---|
| 8 | — | −7.832E−04 | — | −3.009E−04 |
| 9 | — | 8.495E−06 | — | 2.416E−04 |

FIG. 58 illustrates a lens cross-section of the eyepiece according to Example 16. FIGS. 59 to 60 illustrate various aberrations of the eyepiece according to Example 16.

As can be appreciated from each of the aberration diagrams, it is obvious that the eyepiece according to Example 16 has favorable optical performance.

Example 17

Table 40 exhibits basic lens data of an eyepiece according to Example 17. In addition, Table 41 exhibits aspherical surface data. In addition, Table 42 exhibits data of polynomials representing a free-form surface.

TABLE 40

Example 17 Lens Data

| Si Surface No. | Yi Y-Coordinate | Zi Z-Coordinate | θi Rotational Amount | Ri Curvature Radius | Ndi Refractive Index | νdi Abbe's Number |
|---|---|---|---|---|---|---|
| 1 (STO) | — | — | — | ∞ | — | — |
| 2 | 5.185 | 15.000 | 0.000 | 557.103 | 1.963 | 24.1 |
| 3 | 5.185 | 21.270 | 0.000 | −40.615 | — | — |
| 4 | 5.028 | 22.124 | −5.413 | 43.200 | 1.877 | 40.8 |
| 5 | 5.584 | 27.997 | −5.413 | 149.594 | — | — |
| 6 | 3.304 | 29.127 | −7.184 | 43.600 | 1.661 | 20.4 |
| 7 | 4.293 | 36.972 | −7.184 | −4816.589 | — | — |
| 8 | 7.311 | 38.472 | −3.044 | ∞ | 1.553 | 56.0 |
| 9 | 7.657 | 44.989 | −3.044 | ∞ | — | — |
| 10 | 7.129 | 47.436 | −3.274 | ∞ | — | — |

TABLE 41

Example 17 Aspherical Surface Data

| Si Surface No. | k Conic Constant | A4 | A6 | A8 |
|---|---|---|---|---|
| 6 | 1.850E+00 | −5.045E−06 | 7.511E−09 | 1.795E−12 |
| 7 | 2.562E+03 | 1.443E−06 | −1.285E−09 | 2.200E−11 |

TABLE 42

Example 17 Free-Form Surface Data

| Si Surface No. | r Normalized Radius | $x^1y^0$ | $x^0y^1$ | $x^2y^0$ | $x^1y^1$ | $x^0y^2$ |
|---|---|---|---|---|---|---|
| 8 | 1.000 | — | 1.823E−01 | 1.328E−02 | — | 1.502E−02 |
| 9 | 1.000 | — | −6.807E−02 | −7.354E−04 | — | 5.839E−03 |

| Si Surface No. | $x^3y^0$ | $x^2y^1$ | $x^1y^2$ | $x^0y^3$ |
|---|---|---|---|---|
| 8 | — | −1.386E−03 | — | −1.642E−04 |
| 9 | — | 1.369E−04 | — | 2.677E−04 |

FIG. 61 illustrates a lens cross-section of the eyepiece according to Example 17. FIGS. 62 to 63 illustrate various aberrations of the eyepiece according to Example 17.

As can be appreciated from each of the aberration diagrams, it is obvious that the eyepiece according to Example 17 has favorable optical performance.

Example 18

Table 43 exhibits basic lens data of an eyepiece according to Example 18. In addition, Table 44 exhibits aspherical surface data. In addition, Table 45 exhibits data of polynomials representing a free-form surface.

TABLE 43

Example 18 Lens Data

| Si Surface No. | $Y_i$ Y-Coordinate | $Z_i$ Z-Coordinate | $\theta_i$ Rotational Amount | $R_i$ Curvature Radius | $N_{di}$ Refractive Index | $\nu_{di}$ Abbe's Number |
|---|---|---|---|---|---|---|
| 1 (STO) | — | — | — | ∞ | — | — |
| 2 | 4.896 | 11.000 | 0.000 | 281.221 | 1.963 | 24.1 |
| 3 | 4.896 | 14.803 | 0.000 | −58.856 | — | — |
| 4 | 4.174 | 15.778 | −4.345 | 56.119 | 1.877 | 40.8 |
| 5 | 4.496 | 20.017 | −4.345 | 428.654 | — | — |
| 6 | 3.437 | 21.013 | −8.382 | 54.419 | 1.661 | 20.4 |
| 7 | 4.437 | 27.803 | −8.382 | 582.994 | — | — |
| 8 | 8.779 | 29.095 | −0.069 | ∞ | 1.553 | 56.0 |
| 9 | 8.791 | 39.060 | −0.069 | ∞ | — | — |
| 10 | 6.469 | 41.991 | −3.042 | ∞ | — | — |

TABLE 44

Example 18 Aspherical Surface Data

| Si Surface No. | k Conic Constant | A4 | A6 | A8 |
|---|---|---|---|---|
| 6 | −7.069E−01 | 1.108E−05 | −7.547E−09 | −5.249E−12 |
| 7 | 3.135E+02 | −4.413E−06 | 3.499E−09 | 6.237E−13 |

TABLE 45

Example 18 Free-Form Surface Data

| Si Surface No. | r Normalized Radius | $x^1y^0$ | $x^0y^1$ | $x^2y^0$ | $x^1y^1$ | $x^0y^2$ |
|---|---|---|---|---|---|---|
| 8 | 1.000 | — | 2.326E−01 | 1.694E−02 | — | 2.289E−02 |
| 9 | 1.000 | — | −5.781E−02 | −2.073E−03 | — | 6.542E−03 |

| Si Surface No. | $x^3y^0$ | $x^2y^1$ | $x^1y^2$ | $x^0y^3$ |
|---|---|---|---|---|
| 8 | — | −1.505E−03 | — | −1.749E−04 |
| 9 | — | 8.705E−05 | — | 1.936E−04 |

FIG. 64 illustrates a lens cross-section of the eyepiece according to Example 18. FIGS. 65 to 66 illustrate various aberrations of the eyepiece according to Example 18.

As can be appreciated from each of the aberration diagrams, it is obvious that the eyepiece according to Example 18 has favorable optical performance.

Example 19

Table 46 exhibits basic lens data of an eyepiece according to Example 19. In addition, Table 47 exhibits aspherical surface data. In addition, Table 48 exhibits data of polynomials representing a free-form surface.

TABLE 46

Example 19 Lens Data

| Si Surface No. | Yi Y-Coordinate | Zi Z-Coordinate | θi Rotational Amount | Ri Curvature Radius | Ndi Refractive Index | vdi Abbe's Number |
|---|---|---|---|---|---|---|
| 1 (STO) | — | — | — | ∞ | — | — |
| 2 | 2.824 | 13.000 | 0.000 | 1458.068 | 1.963 | 24.1 |
| 3 | 2.824 | 19.686 | 0.000 | −41.251 | | |
| 4 | 3.432 | 20.542 | −8.457 | 42.599 | 1.877 | 40.8 |
| 5 | 4.546 | 28.034 | −8.457 | 1022.287 | | |
| 6 | 5.438 | 28.759 | −7.315 | 47.384 | 1.661 | 20.4 |
| 7 | 5.993 | 33.083 | −7.315 | 94.137 | | |
| 8 | 16.390 | 33.599 | 6.027 | ∞ | 1.553 | 56.0 |
| 9 | 15.615 | 40.943 | 6.027 | ∞ | | |
| 10 | 6.307 | 46.038 | −3.390 | ∞ | | |

TABLE 47

Example 19 Aspherical Surface Data

| Si Surface No. | k Conic Constant | A4 | A6 | A8 |
|---|---|---|---|---|
| 6 | 2.626E−01 | −3.222E−07 | −2.402E−09 | −4.110E−12 |
| 7 | −1.311E+02 | 4.817E−07 | 1.209E−09 | 6.360E−12 |

TABLE 48

Example 19 Free-Form Surface Data

| Si Surface No. | r Normalized Radius | $x^1y^0$ | $x^0y^1$ | $x^2y^0$ | $x^1y^1$ | $x^0y^2$ |
|---|---|---|---|---|---|---|
| 8 | 1.000 | — | 2.144E−02 | 2.507E−03 | — | 6.629E−03 |
| 9 | 1.000 | — | −2.778E−01 | −5.116E−03 | — | 2.479E−04 |

| Si Surface No. | $x^3y^0$ | $x^2y^1$ | $x^1y^2$ | $x^0y^3$ |
|---|---|---|---|---|
| 8 | — | −9.579E−04 | — | −2.197E−04 |
| 9 | — | −6.130E−06 | — | 1.300E−04 |

FIG. 67 illustrates a lens cross-section of the eyepiece according to Example 19. FIGS. 68 to 69 illustrate various aberrations of the eyepiece according to Example 19.

As can be appreciated from each of the aberration diagrams, it is obvious that the eyepiece according to Example 19 has favorable optical performance.

Example 20

Table 49 exhibits basic lens data of an eyepiece according to Example 20. In addition, Table 50 exhibits aspherical surface data. In addition, Table 51 exhibits data of polynomials representing a free-form surface.

TABLE 49

Example 20 Lens Data

| Si Surface No. | Yi Y-Coordinate | Zi Z-Coordinate | θi Rotational Amount | Ri Curvature Radius | Ndi Refractive Index | vdi Abbe's Number |
|---|---|---|---|---|---|---|
| 1 (STO) | — | — | — | ∞ | — | — |
| 2 | 3.410 | 15.000 | 0.000 | 6044.561 | 1.963 | 24.1 |
| 3 | 3.410 | 23.219 | 0.000 | −40.250 | — | — |
| 4 | 2.840 | 24.160 | −11.471 | 46.586 | 1.877 | 40.8 |
| 5 | 4.463 | 32.162 | −11.471 | 423.115 | — | — |
| 6 | 4.644 | 33.023 | −2.076 | 31.090 | 1.661 | 20.4 |
| 7 | 4.983 | 42.391 | −2.076 | 42.129 | — | — |
| 8 | 20.477 | 43.948 | 2.522 | ∞ | 1.553 | 56.0 |
| 9 | 20.181 | 50.668 | 2.522 | ∞ | — | — |
| 10 | 6.431 | 51.705 | −0.185 | ∞ | — | — |

TABLE 50

Example 20 Aspherical Surface Data

| Si Surface No. | k Conic Constant | A4 | A6 | A8 |
|---|---|---|---|---|
| 6 | −1.376E−01 | 5.512E−06 | −2.299E−10 | −8.308E−13 |
| 7 | −1.369E+02 | 3.107E−07 | 1.663E−09 | 1.522E−12 |

TABLE 51

Example 20 Free-Form Surface Data

| Si Surface No. | r Normalized Radius | $x^1y^0$ | $x^0y^1$ | $x^2y^0$ | $x^1y^1$ |
|---|---|---|---|---|---|
| 8 | 1.000 | — | 5.397E−02 | −3.073E−03 | — |
| 9 | 1.000 | — | 1.141E−02 | −2.527E−03 | — |

| Si Surface No. | $x^0y^2$ | $x^3y^0$ | $x^2y^1$ | $x^1y^2$ | $x^0y^3$ |
|---|---|---|---|---|---|
| 8 | 4.286E−03 | — | −1.122E−03 | — | −3.694E−05 |
| 9 | 7.135E−04 | — | −3.558E−04 | — | −1.284E−05 |

FIG. 70 illustrates a lens cross-section of the eyepiece according to Example 20. FIGS. 71 to 72 illustrate various aberrations of the eyepiece according to Example 20.

As can be appreciated from each of the aberration diagrams, it is obvious that the eyepiece according to Example 20 has favorable optical performance.

Example 21

Table 52 exhibits basic lens data of an eyepiece according to Example 21. In addition, Table 53 exhibits aspherical surface data. In addition, Table 54 exhibits data of polynomials representing a free-form surface.

TABLE 52

Example 21 Lens Data

| Si Surface No. | Yi Y-Coordinate | Zi Z-Coordinate | θi Rotational Amount | Ri Curvature Radius | Ndi Refractive Index | vdi Abbe's Number |
|---|---|---|---|---|---|---|
| 1 (STO) | — | — | — | ∞ | — | — |
| 2 | 1.589 | 11.000 | 0.000 | ∞ | 1.963 | 24.1 |
| 3 | 1.589 | 15.517 | 0.000 | −34.853 | — | — |
| 4 | 1.584 | 16.467 | −4.849 | 30.907 | 1.877 | 40.8 |
| 5 | 2.134 | 22.954 | −4.849 | 60.290 | — | — |
| 6 | 2.629 | 25.033 | −1.816 | 52.112 | 1.661 | 20.4 |
| 7 | 2.884 | 33.081 | −1.816 | 12228.557 | — | — |
| 8 | 3.335 | 35.594 | −3.883 | ∞ | 1.553 | 56.0 |
| 9 | 3.591 | 39.364 | −3.883 | ∞ | — | — |
| 10 | 3.220 | 41.727 | −4.575 | ∞ | — | — |

TABLE 53

Example 21 Aspherical Surface Data

| Si Surface No. | k Conic Constant | A4 | A6 | A8 |
|---|---|---|---|---|
| 6 | −4.107E+00 | −3.198E−07 | −3.725E−09 | 1.044E−13 |
| 7 | 3.012E+05 | −4.862E−06 | 1.626E−09 | 1.324E−11 |

TABLE 54

Example 21 Free-Form Surface Data

| Si Surface No. | r Normalized Radius | $x^1y^0$ | $x^0y^1$ | $x^2y^0$ | $x^1y^1$ |
|---|---|---|---|---|---|
| 8 | 1.000 | — | 1.430E−01 | 1.853E−03 | — |
| 9 | 1.000 | — | −7.058E−02 | −5.334E−03 | — |

TABLE 54-continued

Example 21 Free-Form Surface Data

| Si Surface No. | $x^0y^2$ | $x^3y^0$ | $x^2y^1$ | $x^1y^2$ | $x^0y^3$ |
|---|---|---|---|---|---|
| 8 | 2.786E−03 | — | −6.715E−04 | — | −1.506E−04 |
| 9 | 2.031E−03 | — | −6.952E−05 | — | 5.811E−04 |

FIG. 73 illustrates a lens cross-section of the eyepiece according to Example 21. FIGS. 74 to 75 illustrate various aberrations of the eyepiece according to Example 21.

As can be appreciated from each of the aberration diagrams, it is obvious that the eyepiece according to Example 21 has favorable optical performance.

Example 22

Table 55 exhibits basic lens data of an eyepiece according to Example 22. In addition, Table 56 exhibits data of polynomials representing a free-form surface.

TABLE 55

Example 22 Lens Data

| Si Surface No. | Yi Y-Coordinate | Zi Z-Coordinate | θi Rotational Amount | Ri Curvature Radius | Ndi Refractive Index | vdi Abbe's Number |
|---|---|---|---|---|---|---|
| 1 (STO) | — | — | — | ∞ | — | — |
| 2 | 1.498 | 11.000 | 0.000 | 134.500 | 1.963 | 24.1 |
| 3 | 1.498 | 16.309 | 0.000 | −43.316 | — | — |
| 4 | 1.121 | 17.302 | −7.602 | ∞ | 1.553 | 56.0 |
| 5 | 1.952 | 23.531 | −7.602 | ∞ | — | — |
| 6 | 2.738 | 26.111 | −4.629 | ∞ | 1.553 | 56.0 |
| 7 | 3.248 | 32.409 | −4.629 | ∞ | — | — |
| 8 | 3.986 | 34.397 | −3.950 | ∞ | 1.553 | 56.0 |
| 9 | 4.298 | 38.914 | −3.950 | ∞ | — | — |
| 10 | 3.637 | 41.093 | −4.019 | ∞ | — | — |

TABLE 56

Example 22 Free-Form Surface Data

| Si Surface No. | r Normalized Radius | $x^1y^0$ | $x^0y^1$ | $x^2y^0$ | $x^1y^1$ |
|---|---|---|---|---|---|
| 4 | 1.000 | — | −4.042E−02 | 1.208E−02 | — |
| 5 | 1.000 | — | −2.014E−02 | −2.971E−03 | — |
| 6 | 1.000 | — | 7.422E−02 | 1.356E−02 | — |
| 7 | 1.000 | — | −9.236E−02 | −1.514E−03 | — |
| 8 | 1.000 | — | −1.032E−01 | 5.241E−03 | — |
| 9 | 1.000 | — | 6.426E−02 | 5.089E−03 | — |

| Si Surface No. | $x^0y^2$ | $x^3y^0$ | $x^2y^1$ | $x^1y^2$ | $x^0y^3$ |
|---|---|---|---|---|---|
| 4 | 1.979E−02 | — | −1.678E−04 | — | −4.433E−05 |
| 5 | 3.780E−03 | — | 1.312E−05 | — | −5.897E−05 |
| 6 | 6.226E−03 | — | 4.724E−04 | — | 2.984E−05 |
| 7 | −5.977E−03 | — | −4.038E−04 | — | 3.334E−04 |
| 8 | −1.446E−03 | — | −2.939E−04 | — | −2.939E−04 |
| 9 | 1.406E−04 | — | −2.838E−04 | — | −2.838E−04 |

FIG. 76 illustrates a lens cross-section of the eyepiece according to Example 22. FIGS. 77 to 78 illustrate various aberrations of the eyepiece according to Example 22.

As can be appreciated from each of the aberration diagrams, it is obvious that the eyepiece according to Example 22 has favorable optical performance.

Example 23

Table 57 illustrates basic lens data of an eyepiece according to Example 23. In addition, Table 58 exhibits aspherical surface data. In addition, Table 59 exhibits data of polynomials representing a free-form surface. The eyepiece according to Example 23 is configured to allow the optical axis AX (L1) of the first lens L1 to be non-parallel, instead of parallel, to the reference optical axis AX (E.P.), which employs the eye point E.P. as a reference. In addition, a lens surface of the first lens L1 on the image side (side opposite to the eye point E.P.) is a Fresnel lens surface. In addition, a lens surface of the second lens L2 on the side of the eye point E.P. is a Fresnel lens surface. It is to be noted here that data of the Fresnel lens surface are exhibited as aspherical surface data.

TABLE 57

Example 23 Lens Data

| Si Surface No. | Yi Y-Coordinate | Zi Z-Coordinate | θi Rotational Amount | Ri Curvature Radius | Ndi Refractive Index | vdi Abbe's Number |
|---|---|---|---|---|---|---|
| 1 (STO) | — | — | — | ∞ | — | — |
| 2 | 3.532 | 10.270 | −8.234 | 25.886 | 1.535 | 55.6 |
| 3 | 4.249 | 15.219 | −8.234 | −32.792 | — | — |
| 4 | 4.277 | 15.417 | −8.234 | 47.291 | 1.535 | 55.6 |
| 5 | 5.168 | 21.571 | −8.234 | 93.522 | — | — |
| 6 | 8.923 | 24.476 | −9.574 | ∞ | 1.535 | 55.6 |
| 7 | 9.988 | 30.792 | −9.574 | ∞ | — | — |
| 8 | 7.746 | 37.273 | −10.566 | ∞ | — | — |

TABLE 58

Example 23 Aspherical Surface Data

| Si Surface No. | k Conic Constant | A3 | A4 | A5 |
|---|---|---|---|---|
| 2 | −6.731 | 1.481E−04 | −7.834E−06 | −3.819E−07 |
| 3 | −4.281 | — | −1.311E−05 | — |
| 4 | 1.819 | — | 2.092E−05 | — |
| 5 | 1.872 | −1.525E−04 | −3.551E−06 | −8.483E−08 |

| Si Surface No. | A6 | A7 | A8 | A9 |
|---|---|---|---|---|
| 2 | −1.427E−08 | −3.503E−10 | −6.812E−13 | 6.227E−13 |
| 3 | −1.787E−08 | — | −3.355E−11 | — |
| 4 | 5.356E−10 | — | −2.941E−12 | — |
| 5 | −4.233E−10 | 1.145E−10 | 5.700E−12 | 1.980E−13 |

| Si Surface No. | A10 | A11 | A12 |
|---|---|---|---|
| 2 | 4.291E−14 | 1.321E−15 | −5.131E−17 |
| 3 | 8.207E−14 | — | — |
| 4 | −1.872E−14 | — | — |
| 5 | 3.836E−15 | −1.107E−16 | −1.682E−17 |

TABLE 59

Example 23 Free-Form Surface Data

| Si Surface No. | r Normalized Radius | $x^1y^0$ | $x^0y^1$ | $x^2y^0$ | $x^1y^1$ | $x^0y^2$ |
|---|---|---|---|---|---|---|
| 6 | 1.000 | — | 1.479E−01 | 2.348E−02 | — | 1.495E−02 |
| 7 | 1.000 | — | 1.566E−03 | 1.236E−02 | — | 2.061E−03 |

| Si Surface No. | $x^3y^0$ | $x^2y^1$ | $x^1y^2$ | $x^0y^3$ | $x^4y^0$ | $x^3y^1$ |
|---|---|---|---|---|---|---|
| 6 | — | −8.875E−04 | — | −5.738E−04 | −3.572E−05 | — |
| 7 | — | −1.289E−03 | — | −7.640E−06 | −1.012E−05 | — |

| Si Surface No. | $x^2y^2$ | $x^1y^3$ | $x^0y^4$ | $x^5y^0$ | $x^4y^1$ | $x^3y^2$ |
|---|---|---|---|---|---|---|
| 6 | −1.096E−04 | — | 4.633E−07 | — | −2.517E−07 | — |
| 7 | −9.719E−05 | — | 3.036E−05 | — | 2.643E−06 | — |

| Si Surface No. | $x^2y^3$ | $x^1y^4$ | $x^0y^5$ | $x^6y^0$ | $x^5y^1$ | $x^4y^2$ |
|---|---|---|---|---|---|---|
| 6 | −2.203E−06 | — | 1.536E−06 | −5.008E−08 | — | 8.406E−08 |
| 7 | −5.058E−06 | — | 6.434E−07 | −1.876E−07 | — | 5.710E−08 |

| Si Surface No. | $x^3y^3$ | $x^2y^4$ | $x^1y^5$ | $x^0y^6$ |
|---|---|---|---|---|
| 6 | — | 7.830E−09 | — | 2.894E−08 |
| 7 | — | 1.090E−09 | — | 8.062E−08 |

FIG. 79 illustrates a lens cross-section of the eyepiece according to Example 23. FIGS. 80 to 81 illustrate various aberrations of the eyepiece according to Example 23.

As can be appreciated from each of the aberration diagrams, it is obvious that the eyepiece according to Example 23 has favorable optical performance.

Example 24

Table 60 exhibits basic lens data of an eyepiece according to Example 24. In addition, Table 61 exhibits aspherical surface data. In addition, Table 62 exhibits data of polynomials representing a free-form surface. The eyepiece according to Example 24 is configured to allow the optical axis AX (L1) of the first lens L1 to be non-parallel, instead of parallel, to the reference optical axis AX (E.P.), which employs the eye point E.P. as a reference. In addition, a lens surface of the first lens L1 on the image side (side opposite to the eye point E.P.) is a Fresnel lens surface. In addition, a lens surface of the second lens L2 on the side of the eye point E.P. is a Fresnel lens surface. It is to be noted here that data of the Fresnel lens surface are exhibited as aspherical surface data.

TABLE 60

Example 24 Lens Data

| Si Surface No. | Yi Y-Coordinate | Zi Z-Coordinate | θi Rotational Amount | Ri Curvature Radius | Ndi Refractive Index | vdi Abbe's Number |
|---|---|---|---|---|---|---|
| 1 (STO) | — | — | — | ∞ | — | — |
| 2 | 5.512 | 11.450 | −10.580 | 45.805 | 1.535 | 55.6 |
| 3 | 6.430 | 16.365 | −10.580 | −32.568 | — | — |
| 4 | 6.467 | 16.562 | −10.580 | 33.853 | 1.535 | 55.6 |
| 5 | 6.781 | 18.244 | −10.580 | −165.977 | — | — |
| 6 | 8.260 | 20.494 | −11.358 | ∞ | 1.535 | 55.6 |
| 7 | 9.443 | 26.382 | −11.358 | ∞ | — | — |
| 8 | 11.736 | 27.950 | −13.213 | ∞ | 1.535 | 55.6 |
| 9 | 12.955 | 33.141 | −13.213 | ∞ | — | — |
| 10 | 11.219 | 40.537 | −14.691 | ∞ | — | — |

TABLE 61

Example 24 Aspherical Surface Data

| Si Surface No. | k Conic Constant | A3 | A4 | A5 |
|---|---|---|---|---|
| 2 | −11.300 | 1.253E−04 | −6.493E−06 | −7.018E−08 |
| 3 | 0.179 | — | −3.760E−07 | — |
| 4 | −0.215 | — | 1.040E−05 | — |
| 5 | −213.619 | 3.656E−05 | 2.800E−06 | 6.890E−08 |

| Si Surface No. | A6 | A7 | A8 | A9 |
|---|---|---|---|---|
| 2 | −1.976E−09 | −1.484E−11 | −4.463E−13 | −1.718E−14 |
| 3 | 7.928E−09 | — | −2.142E−11 | — |
| 4 | 3.388E−09 | — | 1.925E−12 | — |
| 5 | 2.004E−09 | −5.067E−11 | −1.799E−13 | 1.025E−13 |

| Si Surface No. | A10 | A11 | A12 |
|---|---|---|---|
| 2 | −8.827E−16 | −5.470E−17 | −2.480E−18 |
| 3 | −9.065E−15 | — | — |
| 4 | −1.200E−15 | — | — |
| 5 | 4.129E−15 | 7.352E−18 | −8.332E−18 |

TABLE 62

Example 24 Free-Form Surface Data

| Si Surface No. | r Normalized Radius | $x^1y^0$ | $x^0y^1$ | $x^2y^0$ | $x^1y^1$ | $x^0y^2$ |
|---|---|---|---|---|---|---|
| 6 | 1.000 | — | 4.051E−02 | 1.051E−03 | — | 8.132E−04 |
| 7 | 1.000 | — | −1.804E−02 | 2.333E−03 | — | −3.040E−04 |
| 8 | 1.000 | — | 3.400E−02 | 7.580E−03 | — | 1.639E−03 |
| 9 | 1.000 | — | −6.424E−02 | 7.580E−03 | — | 1.639E−03 |

| Si Surface No. | $x^3y^0$ | $x^2y^1$ | $x^1y^2$ | $x^0y^3$ | $x^4y^0$ | $x^3y^1$ |
|---|---|---|---|---|---|---|
| 6 | — | −4.301E−05 | — | −1.413E−05 | 5.153E−07 | — |
| 7 | — | 4.797E−05 | — | −1.249E−05 | 7.397E−07 | — |
| 8 | — | 1.001E−04 | — | −4.812E−05 | −2.219E−06 | — |
| 9 | — | 1.001E−04 | — | −4.812E−05 | −2.219E−06 | — |

| Si Surface No. | $x^2y^2$ | $x^1y^3$ | $x^0y^4$ | $x^5y^0$ | $x^4y^1$ | $x^3y^2$ |
|---|---|---|---|---|---|---|
| 6 | −2.180E−06 | — | 9.997E−08 | — | −1.795E−07 | — |
| 7 | −2.133E−06 | — | −6.975E−08 | — | −8.531E−08 | — |
| 8 | 2.364E−06 | — | 2.418E−07 | — | 7.312E−07 | — |
| 9 | −1.890E−06 | — | −2.055E−08 | — | −2.145E−07 | — |

TABLE 62-continued

Example 24 Free-Form Surface Data

| Si Surface No. | $x^2y^3$ | $x^1y^4$ | $x^0y^5$ | $x^6y^0$ | $x^5y^1$ | $x^4y^2$ |
|---|---|---|---|---|---|---|
| 6 | −8.093E−08 | — | 2.733E−09 | 4.402E−09 | — | 1.616E−09 |
| 7 | 1.256E−08 | — | 1.393E−09 | 8.804E−09 | — | 1.965E−08 |
| 8 | 4.954E−08 | — | −4.832E−09 | 1.551E−08 | — | 4.886E−08 |
| 9 | −1.190E−06 | — | 1.180E−08 | 6.141E−08 | — | 5.534E−08 |

| Si Surface No. | $x^3y^3$ | $x^2y^4$ | $x^1y^5$ | $x^0y^6$ |
|---|---|---|---|---|
| 6 | — | 3.506E−09 | — | −1.921E−11 |
| 7 | — | 5.536E−09 | — | 1.020E−10 |
| 8 | — | 4.551E−09 | — | 1.694E−10 |
| 9 | — | 4.905E−08 | — | 7.974E−11 |

FIG. 82 illustrates a lens cross-section of the eyepiece according to Example 24. FIGS. 83 to 84 illustrate various aberrations of the eyepiece according to Example 24.

As can be appreciated from each of the aberration diagrams, it is obvious that the eyepiece according to Example 24 has favorable optical performance.

Example 25

Tables 63 and 64 illustrate basic lens data of an eyepiece according to Example 25. Table 63 exhibits data at a visual acuity of 1.0, and Table 64 exhibits data at a visual acuity of 0.2. In addition, Table 65 exhibits aspherical surface data. In addition, Table 66 exhibits data of polynomials representing a free-form surface.

FIGS. 86 and 87 each illustrate a lens cross-section of the eyepiece according to Example 25. FIG. 86 illustrates a lens cross-section at a visual acuity of 1.0, and FIG. 87 illustrates a lens cross-section at a visual acuity of 0.2.

The eyepiece according to Example 25 includes the eccentric lens group G1 and the varifocal lens group G2 in order from the side of the eye point E.P. toward the image side. The eccentric lens group G1 has a configuration in which the first lens L1, the second lens L2, and the third lens L3 are arranged in order from the side of the eye point E.P. toward the image side. The varifocal lens group G2 has a configuration in which the fourth lens L4 and a fifth lens L5 are arranged in order from the side of the eye point E.P. toward the image side. The fourth lens L4 and the fifth lens L5 are each an Alvarez lens, and move mutually in directions opposite to each other and in directions different from the reference optical axis AX (E.P.), which employs the eye point E.P. as a reference, to thereby change a focal length. In addition, a lens surface of the first lens L1 on the image side (side opposite to the eye point E.P.) is a Fresnel lens surface. In addition, a lens surface of the second lens L2 on the side of the eye point E.P. is a Fresnel lens surface. It is to be noted here that data of the Fresnel lens surface are exhibited as aspherical surface data.

TABLE 63

Example 25 Lens Data (at VISUAL ACUITY of 1.0)

| Si Surface No. | Yi Y-Coordinate | Zi Z-Coordinate | θi Rotational Amount | Ri Curvature Radius | Ndi Refractive Index | vdi Abbe's Number |
|---|---|---|---|---|---|---|
| 1 (STO) | — | — | — | ∞ | — | — |
| 2 | 3.532 | 10.270 | −8.234 | 25.886 | 1.535 | 55.6 |
| 3 | 4.249 | 15.219 | −8.234 | −32.792 | — | — |
| 4 | 4.277 | 15.417 | −8.234 | 47.291 | 1.535 | 55.6 |
| 5 | 5.168 | 21.571 | −8.234 | 93.522 | — | — |
| 6 | 7.803 | 24.638 | −4.671 | ∞ | 1.535 | 55.6 |
| 7 | 8.325 | 31.022 | −4.671 | ∞ | — | — |
| 8 | 3.586 | 34.419 | −4.671 | ∞ | 1.535 | 55.6 |
| 9 | 3.708 | 35.914 | −4.671 | ∞ | — | — |
| 10 | 13.691 | 35.299 | −4.671 | ∞ | 1.535 | 55.6 |
| 11 | 13.813 | 36.794 | −4.671 | ∞ | — | — |
| 12 | 8.193 | 39.059 | −5.521 | ∞ | — | — |

TABLE 64

Example 25 Lens Data (at VISUAL ACUITY of 0.2)

| Si Surface No. | Yi Y-Coordinate | Zi Z-Coordinate | θi Rotational Amount | Ri Curvature Radius | Ndi Refractive Index | vdi Abbe's Number |
|---|---|---|---|---|---|---|
| 1 (STO) | — | — | — | ∞ | — | — |
| 2 | 3.532 | 10.270 | −8.234 | 25.886 | 1.535 | 55.6 |
| 3 | 4.249 | 15.219 | −8.234 | −32.792 | — | — |
| 4 | 4.277 | 15.417 | −8.234 | 47.291 | 1.535 | 55.6 |
| 5 | 5.168 | 21.571 | −8.234 | 93.522 | — | — |
| 6 | 7.803 | 24.638 | −4.671 | ∞ | 1.535 | 55.6 |
| 7 | 8.325 | 31.022 | −4.671 | ∞ | — | — |
| 8 | 13.558 | 33.604 | −4.671 | ∞ | 1.535 | 55.6 |
| 9 | 13.680 | 35.099 | −4.671 | ∞ | — | — |
| 10 | 3.719 | 36.114 | −4.671 | ∞ | 1.535 | 55.6 |
| 11 | 3.841 | 37.609 | −4.671 | ∞ | — | — |
| 12 | 8.193 | 39.059 | −5.521 | ∞ | — | — |

TABLE 65

Example 25 Aspherical Surface Data

| Si Surface No. | k Conic Constant | A3 | A4 | A5 |
|---|---|---|---|---|
| 2 | −6.731 | 8.131E−06 | 2.585E−06 | −4.901E−07 |
| 3 | −4.281 | — | −1.311E−05 | — |
| 4 | 1.819 | — | 2.092E−05 | — |
| 5 | 1.872 | −3.676E−04 | 2.007E−05 | −3.493E−07 |

| Si Surface No. | A6 | A7 | A8 | A9 |
|---|---|---|---|---|
| 2 | −2.285E−08 | −2.995E−10 | 8.844E−12 | 7.727E−13 |
| 3 | −1.787E−08 | — | −3.355E−11 | — |
| 4 | 5.356E−10 | — | −2.941E−12 | — |
| 5 | −1.095E−08 | −1.639E−10 | 9.240E−12 | 7.331E−13 |

| Si Surface No. | A10 | A11 | A12 |
|---|---|---|---|
| 2 | 4.191E−14 | 1.368E−15 | −6.812E−17 |
| 3 | 8.207E−14 | — | — |
| 4 | −1.872E−14 | — | — |
| 5 | 2.512E−14 | 5.250E−17 | −6.437E−17 |

TABLE 66

Example 25 Free-Form Surface Data

| Si Surface No. | r Normalized Radius | $x^1y^0$ | $x^0y^1$ | $x^2y^0$ | $x^1y^1$ | $x^0y^2$ |
|---|---|---|---|---|---|---|
| 6 | 1.000 | — | 1.187E−01 | 7.011E−03 | — | 7.175E−03 |
| 7 | 1.000 | — | −8.173E−02 | −1.245E−02 | — | −4.657E−03 |
| 8 | 1.000 | — | 1.747E−02 | — | — | — |
| 11 | 1.000 | — | 1.747E−02 | — | — | — |

| Si Surface No. | $x^3y^0$ | $x^2y^1$ | $x^1y^2$ | $x^0y^3$ | $x^4y^0$ | $x^3y^1$ |
|---|---|---|---|---|---|---|
| 6 | — | −1.079E−03 | — | −6.305E−04 | −4.676E−05 | — |
| 7 | — | 1.714E−05 | — | 1.349E−04 | −8.275E−07 | — |
| 8 | — | −5.739E−05 | — | −1.672E−04 | — | — |
| 11 | — | −5.739E−05 | — | −1.672E−04 | — | — |

| Si Surface No. | $x^2y^2$ | $x^1y^3$ | $x^0y^4$ | $x^5y^0$ | $x^4y^1$ | $x^3y^2$ |
|---|---|---|---|---|---|---|
| 6 | −9.503E−05 | — | −9.184E−06 | — | 3.179E−06 | — |
| 7 | −1.273E−05 | — | 2.746E−05 | — | 2.129E−06 | — |
| 8 | — | — | — | — | −7.204E−07 | — |
| 11 | — | — | — | — | −7.204E−07 | — |

| Si Surface No. | $x^2y^3$ | $x^1y^4$ | $x^0y^5$ | $x^6y^0$ | $x^5y^1$ | $x^4y^2$ |
|---|---|---|---|---|---|---|
| 6 | 5.334E−07 | — | 1.613E−06 | 2.596E−07 | — | 2.706E−07 |
| 7 | −4.830E−06 | — | 7.559E−07 | 4.553E−07 | — | 8.710E−09 |
| 8 | 1.388E−07 | — | 2.302E−07 | — | — | — |
| 11 | 1.388E−07 | — | 2.302E−07 | — | — | — |

| Si Surface No. | $x^3y^3$ | $x^2y^4$ | $x^1y^5$ | $x^0y^6$ |
|---|---|---|---|---|
| 6 | — | 2.387E−07 | — | 5.132E−08 |
| 7 | — | 3.036E−07 | — | 5.935E−09 |
| 8 | — | — | — | — |
| 11 | — | — | — | — |

FIGS. 88 to 91 illustrate various aberrations of the eyepiece according to Example 25. FIGS. 88 to 89 illustrate various aberrations at a visual acuity of 1.0, and FIGS. 90 to 91 illustrate various aberrations at a visual acuity of 0.2.

As can be appreciated from each of the aberration diagrams, it is obvious that the eyepiece according to Example 25 has favorable optical performance.

Other Numerical Data of Respective Examples

Tables 67 and 68 exhibit, in a summarized manner for respective examples, specifications of the eyepieces according to the respective examples and values of other numerical data (such as values concerning conditional expressions) satisfied by the eyepieces according to the respective examples. It is to be noted that L denotes a total length (a distance from the eye point E.P. to the image (image display device 100)). As can be appreciated from Tables 67 and 68, desired configurations are satisfied for the respective examples. As exhibited in Tables 67 and 68, the image magnification My of each of the examples is twice or more. In addition, in each of the examples, a refractive index of the first lens L1 with respect to the d-line is 1.439 or more. In addition, in each of the examples, relationships of the conditional expressions (1) and (2) concerning the eccentric amount $s_{i,max}$ and the rotational amount $\theta_{i,max}$ are satisfied.

TABLE 67

|  | Example 1 | Example 2 | Example 3 | Example 4 | Example 5 | Example 6 |
|---|---|---|---|---|---|---|
| Lens Configuration | 3-Group 3-Lens | 3-Group 3-Lens | 3-Group 3-Lens | 3-Group 3-Lens | 3-Group 3-Lens | 3-Group 3-Lens |
| L [mm] | 44.133 | 46.98 | 46.421 | 43.683 | 43.728 | 48.477 |
| Mv | 2.747 | 2.911 | 2.879 | 2.845 | 2.848 | 3.133 |
| Refractive Index of L1 | 1.439 | 1.963 | 1.963 | 1.963 | 1.963 | 1.963 |
| Shape of L1 on E.P. Side | Convex | Convex | Convex | Convex | Convex | Convex |
| Relationship between L1 and Virtual Image Plane | Parallel | Parallel | Parallel | Parallel | Parallel | Parallel |
| $s_{i,max}$ [mm] | 5.336 | 9.610 | 7.064 | 10.305 | 7.796 | 8.108 |
| $\theta_{i,max}$ [degree] | 16.931 | 21.124 | 20.433 | 22.975 | 24.657 | 15.548 |
|  | Example 7 | Example 8 | Example 9 | Example 10 | Example 11 | Example 23 |
| Lens Configuration | 3-Group 3-Lens | 3-Group 3-Lens | 3-Group 3-Lens | 3-Group 3-Lens | 3-Group 3-Lens | 3-Group 3-Lens |
| L [mm] | 41.528 | 45.036 | 47.901 | 44.822 | 43.297 | 37.273 |
| Mv | 2.835 | 3.054 | 3.233 | 3.040 | 2.945 | 2.357 |
| Refractive Index of L1 | 1.963 | 1.963 | 1.963 | 1.883 | 1.883 | 1.535 |
| Shape of L1 on E.P. Side | Convex | Convex | Convex | Flat | Convex | Convex |
| Relationship between L1 and Virtual Image Plane | Parallel | Parallel | Parallel | Parallel | Parallel | Non-Parallel |
| $s_{i,max}$ [mm] | 8.164 | 8.727 | 9.190 | 4.968 | 5.430 | 9.988 |
| $\theta_{i,max}$ [degree] | 22.859 | 16.363 | 9.970 | 13.673 | 5.411 | 10.566 |

TABLE 68

|  | Example 12 | Example 13 | Example 14 | Example 15 | Example 16 |
| --- | --- | --- | --- | --- | --- |
| Lens Configuration | 4-Group 4-Lens | 4-Group 4-Lens | 4-Group 4-Lens | 4-Group 4-Lens | 4-Group 4-Lens |
| L [mm] | 45.982 | 46.374 | 48.077 | 41.909 | 44.244 |
| Mv | 2.853 | 2.876 | 2.974 | 2.739 | 2.879 |
| Refractive Index of L1 | 1.439 | 1.963 | 1.963 | 1.963 | 1.963 |
| Shape of L1 on E.P. Side | Convex | Convex | Convex | Convex | Convex |
| Relationship between L1 and Virtual Image Plane | Parallel | Parallel | Parallel | Parallel | Parallel |
| si,max [mm] | 4.009 | 3.496 | 6.499 | 4.491 | 6.385 |
| θi,max [degree] | 6.359 | 4.315 | 7.004 | 3.227 | 6.425 |

|  | Example 17 | Example 18 | Example 19 | Example 20 |
| --- | --- | --- | --- | --- |
| Lens Configuration | 4-Group 4-Lens | 4-Group 4-Lens | 4-Group 4-Lens | 4-Group 4-Lens |
| L [mm] | 47.436 | 41.991 | 46.038 | 51.705 |
| Mv | 3.071 | 2.863 | 3.116 | 3.473 |
| Refractive Index of L1 | 1.963 | 1.963 | 1.963 | 1.963 |
| Shape of L1 on E.P. Side | Convex | Convex | Convex | Convex |
| Relationship between L1 and Virtual Image Plane | Parallel | Parallel | Parallel | Parallel |
| si,max [mm] | 7.657 | 8.791 | 16.390 | 20.477 |
| θi,max [degree] | 7.184 | 8.382 | 8.457 | 11.471 |

|  | Example 21 | Example 22 | Example 24 | Example 25 |
| --- | --- | --- | --- | --- |
| Lens Configuration | 4-Group 4-Lens | 4-Group 4-Lens | 4-Group 4-Lens | 5-Group 5-Lens |
| L [mm] | 41.727 | 41.093 | 40.537 | 39.059 |
| Mv | 2.847 | 2.808 | 2.532 | 2.458 |
| Refractive Index of L1 | 1.963 | 1.963 | 1.535 | 1.535 |
| Shape of L1 on E.P. Side | Flat | Convex | Convex | Convex |
| Relationship between L1 and Virtual Image Plane | Parallel | Parallel | Non-Parallel | Non-Parallel |
| si,max [mm] | 3.591 | 4.298 | 12.955 | 13.813 |
| θi,max [degree] | 4.849 | 7.602 | 14.691 | 8.234 |

5. Other Embodiments

The technique according to the present disclosure is not limited to the description of the foregoing embodiments and examples, and may be modified and worked in a wide variety of ways.

For example, shapes and numerical values of the respective parts illustrated in each of the above numerical examples are each a mere example of implementation of the present technology, and the technical scope of the present technology should not be construed as being limited by these examples.

In addition, although the description has been given, in the foregoing embodiments and examples, of the configuration substantially including three or four lenses, a configuration may be employed that further includes a lens having no substantial refractive power.

In addition, a surface forming an aspherical surface or a free-form surface is not limited to the lens surfaces exhibited in the respective examples; a surface other than the lens surfaces exhibited in the respective examples may be an aspherical surface or a free-form surface.

In addition, for example, the present technology may have the following configurations.

According to the present technology having the following configurations, the configuration of the lenses is optimized that configure the left eyepiece optical system and the right eyepiece optical system, and the non-overlap image region is included in the left-eye display image and the right-eye display image. This makes it possible to achieve a lighter weight and a wider angle of view upon observation by both eyes without causing a concern about generation of stray light and to provide high-definition beauty of an image.

[1]

A display apparatus including:

a left eyepiece display unit including a left-eye image display device and a left eyepiece optical system that guides a left-eye display image displayed on the left-eye image display device to a left eye; and a right eyepiece display unit including a right-eye image display device and a right eyepiece optical system that guides a right-eye display image displayed on the right-eye image display device to a right eye, an image magnification upon observation by both eyes being twice or more, the left eyepiece optical system and the right eyepiece optical system each including a plurality of single lenses, at least one of the plurality of single lenses including a free-form surface lens including a resin material, at least one of the plurality of single lenses being arranged in at least one of an eccentric state or a rotated state with respect to an optical axis of the left-eye image display device or the right-eye image display device, and the left-eye display image and the right-eye display image each including an overlap image region and a non-overlap image region, the overlap image region including a mutually common image part, the non-overlap image region including a mutually different image part and being a region outside the overlap image region.

[2]

The display apparatus according to [1], in which the left eyepiece optical system and the right eyepiece optical system each include an eyepiece of a three-group three-lens configuration in which a first lens, a second lens, and a third lens are arranged as the plurality of single lenses in order from side of an eye point toward image side.

[3]

The display apparatus according to [2], in which the first lens includes a spherical lens having a positive refractive power including a material of a refractive index of 1.439 or more with respect to a d-line, and a lens surface of the first lens on the side of the eye point has a convex shape or a planar shape.

[4]

The display apparatus according to [2] or [3], in which an optical axis of the first lens is parallel to a reference optical axis which employs the eye point as a reference.

[5]

The display apparatus according to any one of [2] to [4], in which at least one of the second lens or the third lens includes a free-form surface lens.

[6]
The display apparatus according to any one of [2] to [5], in which
at least one of the first lens, the second lens, or the third lens is arranged in at least one of the eccentric state or the rotated state with respect to the reference optical axis which employs the eye point as a reference, and
the following expressions:

$$si,\max<25 \text{ (mm)} \quad (1)$$

$$\theta i,\max<25(°) \quad (2)$$

are satisfied, where
si,max denotes a maximum absolute value of an eccentric amount of each of respective optical axes of the first lens, the second lens, and the third lens with respect to the reference optical axis in a direction orthogonal to the reference optical axis, and
θi,max denotes a maximum absolute value of a rotational amount of each of the respective optical axes of the first lens, the second lens, and the third lens with respect to the reference optical axis.
[7]
The display apparatus according to any one of [2], [5], and [6], in which the optical axis of the first lens is non-parallel to the reference optical axis which employs the eye point as a reference.
[8]
The display apparatus according to any one of [2] and [5] to [7], in which the first lens includes a Fresnel lens.
[9]
The display apparatus according to [1], in which the left eyepiece optical system and the right eyepiece optical system each include an eyepiece of a four-group four-lens configuration in which a first lens, a second lens, a third lens, and a fourth lens are arranged as the plurality of single lenses in order from side of an eye point toward image side.
[10]
The display apparatus according to [9], in which
the first lens includes a spherical lens having a positive refractive power including a material of a refractive index of 1.439 or more with respect to a d-line, and
a lens surface of the first lens on the side of the eye point has a convex shape or a planar shape.
[11]
The display apparatus according to [9] or [10], in which an optical axis of the first lens is parallel to a reference optical axis which employs the eye point as a reference.
[12]
The display apparatus according to any one of [9] to [11], in which at least one of the second lens, the third lens, or the fourth lens includes a free-form surface lens.
[13]
The display apparatus according to any one of [9] to [12], in which
at least one of the first lens, the second lens, the third lens, or the fourth lens is arranged in at least one of the eccentric state or the rotated state with respect to the reference optical axis which employs the eye point as a reference, and
the following expressions:

$$si,\max<25 \text{ (mm)} \quad (1)$$

$$\theta i,\max<25(°) \quad (2)$$

are satisfied, where
si,max denotes a maximum absolute value of an eccentric amount of each of respective optical axes of the first lens, the second lens, the third lens, and the fourth lens with respect to the reference optical axis in a direction orthogonal to the reference optical axis, and
θi,max denotes a maximum absolute value of a rotational amount of each of the respective optical axes of the first lens, the second lens, the third lens, and the fourth lens with respect to the reference optical axis.
[14]
The display apparatus according to any one of [9], [12], and [13], in which the optical axis of the first lens is non-parallel to the reference optical axis which employs the eye point as a reference.
[15]
The display apparatus according to any one of [9] and [12] to [14], in which the first lens includes a Fresnel lens.
[16]
The display apparatus according to [1], in which, in each of the left eyepiece optical system and the right eyepiece optical system, the plurality of single lenses includes a varifocal lens group.
[17]
The display apparatus according to [16], in which, in each of the left eyepiece optical system and the right eyepiece optical system, the plurality of single lenses includes an eccentric lens group and the varifocal lens group in order from side of an eye point toward image side.
[18]
The display apparatus according to any one of [1] to [17], in which
the non-overlap image region is a region on outer left side of the overlap image region in the left-eye display image, and
the non-overlap image region is a region on outer right side of the overlap image region in the right-eye display image.

This application claims the benefits of Japanese priority Patent Application JP2018-143854 filed with the Japan Patent Office on Jul. 31, 2018, and Japanese priority Patent Application JP2019-032308 filed with the Japan Patent Office on Feb. 26, 2019, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:
1. A display apparatus comprising:
a left eyepiece display unit including a left-eye image display device and a left eyepiece optical system that guides a left-eye display image displayed on the left-eye image display device to a left eye; and
a right eyepiece display unit including a right-eye image display device and a right eyepiece optical system that guides a right-eye display image displayed on the right-eye image display device to a right eye,
an image magnification upon observation by both eyes being twice or more,
the left eyepiece optical system and the right eyepiece optical system each including a plurality of single lenses,
at least one of the plurality of single lenses comprising a free-form surface lens including a resin material,
at least one of the plurality of single lenses being arranged in at least one of an eccentric state or a rotated state with respect to an optical axis of the left-eye image display device or the right-eye image display device, and the left-eye display image and the right-eye display image each including an overlap image region and a non-overlap image region, the overlap image region including a mutually common image part, the non-overlap image region including a mutually different image part and being a region outside the overlap image region, wherein the left eyepiece optical system and the right eyepiece optical system each include an eyepiece of a three-group three-lens configuration in which a first lens, a second lens, and a third lens are arranged as the plurality of single lenses in order from side of an eye point toward image side, and at least one of the first lens, the second lens, or the third lens is arranged in at least one of the eccentric state or the rotated state with respect to a reference optical axis which employs the eye point as a reference, and the following expressions:

$$si,\max<25 \text{ (mm)} \quad (1)$$

$$\theta i,\max<25(°) \quad (2)$$

are satisfied, where si,max denotes a maximum absolute value of an eccentric amount of each of respective optical axes of the first lens, the second lens, and the third lens with respect to the reference optical axis in a direction orthogonal to the reference optical axis, and θi,max denotes a maximum absolute value of a rotational amount of each of the respective optical axes of the first lens, the second lens, and the third lens with respect to the reference optical axis.

2. The display apparatus according to claim 1, wherein the first lens comprises a spherical lens having a positive refractive power including a material of a refractive index of 1.439 or more with respect to a d-line, and a lens surface of the first lens on the side of the eye point has a convex shape or a planar shape.

3. The display apparatus according to claim 1, wherein an optical axis of the first lens is parallel to the reference optical axis which employs the eye point as the reference.

4. The display apparatus according to claim 1, wherein at least one of the second lens or the third lens comprises a free-form surface lens.

5. The display apparatus according to claim 1, wherein an optical axis of the first lens is non-parallel to a reference optical axis which employs the eye point as a reference.

6. The display apparatus according to claim 1, wherein the first lens comprises a Fresnel lens.

7. The display apparatus according to claim 1, wherein the left eyepiece optical system and the right eyepiece optical system each include an eyepiece of a four-group four-lens configuration in which a first lens, a second lens, a third lens, and a fourth lens are arranged as the plurality of single lenses in order from side of an eye point toward image side.

8. The display apparatus according to claim 7, wherein the first lens comprises a spherical lens having a positive refractive power including a material of a refractive index of 1.439 or more with respect to a d-line, and a lens surface of the first lens on the side of the eye point has a convex shape or a planar shape.

9. The display apparatus according to claim 7, wherein an optical axis of the first lens is parallel to a reference optical axis which employs the eye point as a reference.

10. The display apparatus according to claim 7, wherein at least one of the second lens, the third lens, or the fourth lens comprises a free-form surface lens.

11. The display apparatus according to claim 7, wherein at least one of the first lens, the second lens, the third lens, or the fourth lens is arranged in at least one of the eccentric state or the rotated state with respect to a reference optical axis which employs the eye point as a reference, and the following expressions:

$$si,\max<25 \text{ (mm)} \quad (1)$$

$$\theta i,\max<25(°) \quad (2)$$

are satisfied, where si,max denotes a maximum absolute value of an eccentric amount of each of respective optical axes of the first lens, the second lens, and the third lens with respect to the reference optical axis in a direction orthogonal to the reference optical axis, and θi,max denotes a maximum absolute value of a rotational amount of each of the respective optical axes of the first lens, the second lens, and the third lens with respect to the reference optical axis.

12. The display apparatus according to claim 7, wherein an optical axis of the first lens is non-parallel to a reference optical axis which employs the eye point as a reference.

13. The display apparatus according to claim 7, wherein the first lens comprises a Fresnel lens.

14. The display apparatus according to claim 1, wherein, in each of the left eyepiece optical system and the right eyepiece optical system, the plurality of single lenses includes a varifocal lens group.

15. The display apparatus according to claim 14, wherein, in each of the left eyepiece optical system and the right eyepiece optical system, the plurality of single lenses includes an eccentric lens group and the varifocal lens group in order from side of an eye point toward image side.

16. The display apparatus according to claim 1, wherein the non-overlap image region is a region on an outer left side of the overlap image region in the left-eye display image, and the non-overlap image region is a region on an outer right side of the overlap image region in the right-eye display image.

* * * * *